(12) United States Patent
Olsson

(10) Patent No.: US 12,360,251 B2
(45) Date of Patent: Jul. 15, 2025

(54) GNSS POSITIONING METHODS AND DEVICES USING PPP-RTK, RTK, SSR, OR LIKE CORRECTION DATA

(71) Applicant: SeeScan, Inc., San Diego, CA (US)

(72) Inventor: Mark S. Olsson, La Jolla, CA (US)

(73) Assignee: SeeScan, Inc., San Diego, CA (US)

(*) Notice: Subject to any disclaimer, the term of this patent is extended or adjusted under 35 U.S.C. 154(b) by 362 days.

(21) Appl. No.: 17/930,029

(22) Filed: Sep. 6, 2022

(65) Prior Publication Data

US 2023/0176233 A1 Jun. 8, 2023

Related U.S. Application Data

(60) Provisional application No. 63/241,489, filed on Sep. 7, 2021.

(51) Int. Cl.
| | |
|---|---|
| G01S 19/25 | (2010.01) |
| G01S 19/43 | (2010.01) |
| G01S 19/49 | (2010.01) |
| G01V 3/08 | (2006.01) |

(52) U.S. Cl.
CPC ............ *G01S 19/256* (2013.01); *G01S 19/43* (2013.01); *G01S 19/49* (2013.01); *G01V 3/081* (2013.01)

(58) Field of Classification Search
CPC ........ G01S 19/05; G01S 19/07; G01S 19/071; G01S 19/23; G01S 19/256; G01S 19/258; G01S 19/40; G01S 19/41; G01S 19/43; G01S 19/47; G01S 19/49; G01V 3/081; G01V 3/083; G01V 2003/084; G01V 2003/085; G01V 2003/086
See application file for complete search history.

(56) References Cited

U.S. PATENT DOCUMENTS

| | | | |
|---|---|---|---|
| 2014/0152493 A1 | 6/2014 | Scherzinger | |
| 2014/0253375 A1 | 9/2014 | Rudrow et al. | |
| 2017/0254901 A1* | 9/2017 | Kim | ......................... G01S 19/43 |
| 2019/0302272 A1* | 10/2019 | Balog | ...................... G01S 19/49 |

FOREIGN PATENT DOCUMENTS

| | | |
|---|---|---|
| EP | 1154281 | 11/2001 |
| JP | 2007 064853 | 3/2007 |
| WO | WO2019/136390 | 7/2019 |

OTHER PUBLICATIONS

IEEE Standard for Inertial Systems Terminology, IEEE Std 1559™-2009, IEEE Aerospace and Electronics Systems Society (Year: 2009).*

(Continued)

*Primary Examiner* — Vladimir Magloire
*Assistant Examiner* — Fred H Mull
(74) *Attorney, Agent, or Firm* — Steven C. Tietsworth, Esq.; Michael J. Pennington, Esq.

(57) ABSTRACT

The present application relates to PPP-RTK, RTK, SSR, or like correction data based devices and methods to produce geolocation solutions with improved accuracy. Further, such devices and methods may be further employed in various related utility locator devices, utility locating transmitters, and other utility locating and mapping devices.

16 Claims, 21 Drawing Sheets

(56) References Cited

OTHER PUBLICATIONS

P.D. Groves, Principles of GNSS, Inertial, and Multisensor Integrated Navigation Systems, Artech House, p. 137-253 (Year: 2013).*
A. Broumandan et al., Spoofing Detection Using GNSS/INS/Odometer Coupling for Vehicular Navigation, Sensors, vol. 18(1305), 18 oages (Year: 2018).*
International Searching Authority, "Written Opinion of the International Searching Authority" for PCT Patent Application No. PCT/US2022/076000, Mar. 16, 2023, European Patent Office, Munich.

* cited by examiner

GNSS POSITIONING METHODS AND DEVICES USING PPP-RTK, RTK, SSR, OR LIKE CORRECTION DATA

CROSS-REFERENCE TO RELATED APPLICATIONS

This application claims priority under 35 U.S.C. § 119(e) to U.S. Provisional Patent Application Ser. No. 63/241,489, entitled GNSS POSITIONING METHODS AND DEVICES USING PPP-RTK/SSR OR LIKE CORRECTION DATA, filed on Sep. 7, 2021, the content of which is hereby incorporated by reference herein in its entirety for all purpose.

FIELD

This disclosure relates generally to methods and devices for determining precise geolocations utilizing global navigation satellite systems (GNSS) and state space representation (SSR) or precise point positioning real-time kinematics (PPP-RTK) or real-time kinematics (RTK) or like correction data. More specifically, but not exclusively, the disclosure relates to methods and devices for determining precise geolocations utilizing GNSS and SSR, PPP-RTK, RTK, or like correction data which may be employed in utility locating and mapping.

BACKGROUND

Global navigation satellite systems (GNSS) are used in many different applications and technologies for positioning or determining of geolocations in a world frame. For instance, GNSS may often be used in vehicle navigation systems, hand-held devices for navigating hiking trails, in smartphones to enable various functions, and the like. In many such applications, positioning to within a few meters (e.g., plus or minus 5 meters) may suffice. Whereas a lack of precision may be acceptable for some applications, such imprecision may prove to be disastrous in other applications. For instance, autonomous vehicles may require extremely precise positioning (e.g., plus or minus 30 centimeters or better) to safely navigate spaces that could otherwise result in the harming of humans and/or the destruction of property. Likewise, the excavation of gas, electric, water, and/or other utility lines may be hazardous for humans and property where imprecise mapping and locating of such utilities is not been achieved.

There are a variety of technologies and associated methods that may improve the precision of GNSS such as real time kinematics (RTK), precise point positioning real time kinematic (PPP-RTK), state space representation (SSR), and/or others that incorporate correction data to more accurately resolve geolocations. Such correction data may, for instance, include corrections for satellite orbit errors, clock or timing errors, atmospheric corrections, and the like that may be communicated to the GNSS device via a base station, virtual reference station (VRS), or other network or "reference element" as referred to in the present disclosure. Whereas the positioning from such technologies/methods may enhance geolocation accuracy, degradation of accuracy may still occur due to multipathing, full or partial occlusion of one or more satellites may cause cycle slip in the phase tracking on the GNSS receiver, receiver clock errors or other carrier phase observation errors, and/or other problems.

Accordingly, there is a need in the art to address the above-described as well as other problems related to improved GNSS position accuracy and associated systems that use correction data.

SUMMARY

The disclosure relates generally to methods and devices for determining precise geolocations utilizing global navigation satellite systems (GNSS) and state space representation (SSR) or precise point positioning real-time kinematics (PPP-RTK) or real-time kinematics (RTK) or like correction data. More specifically, but not exclusively, the disclosure relates to methods and devices for determining precise geolocations utilizing GNSS and SSR, PPP-RTK, RTK, or like correction data which may be employed in utility locating and mapping.

In one aspect, the present disclosure relates to a GNSS and INS based positioning device configured to execute methods disclosed herein related to finding geolocation solutions. The GNSS and INS based positioning device may include one or more GNSS antennas wherein each GNSS antenna receives navigation signals from GNSS satellites and outputs associated navigation signals. The GNSS and INS based positioning device may include a communication element to receive SSR, PPP-RTK, RTK or like correction data wherein time corrections may be parsed from the correction data. Further, the GNSS and INS based positioning device may include one or more GNSS receiver elements coupled at each GNSS antenna to each receive output navigation signals from GNSS antennas and correction data from the communication element and further generate GNSS geolocation estimates associated with each GNSS antenna. In some embodiments, such processing may also or alternatively occur in a separate processing element in the positioning device and/or one or more external devices (e.g., a computer, tablet, smart phone, remote cloud computer, utility locator device, or the like). For instance, such a GNSS receiver element may be or include GNSS receivers configured for SSR, PPP-RTK, RTK, or like correction data wherein the time corrections may be parsed from the correction data. Likewise, such GNSS receivers may be configured to receive navigation signals from one or more navigation satellite constellations (e.g., GPS, GLONASS, BDS, QZSS, Galileo, and/or other satellite navigation systems) which may operate on one or more bands (e.g., the lower L-band, upper-L band, or the like). The GNSS and INS based positioning device may include an inertial navigation system (INS) including one or more inertial sensors or arrays of sensors to estimate movements and orientation associated with each GNSS antenna and/or GNSS device associated with the GNSS antennas. Further, the GNSS and INS based positioning device may include a memory element having one or more non-transitory memories to store instructions, results, and other information relating to methods of present disclosure in determining geolocation solutions. A processing element may be included having one or more processors operatively coupled to the memory element, GNSS receiver(s), and INS that may be programmed to execute methods relating to generating geolocation solutions by adjusting time corrections associated with navigation signals to best align the GNSS second geolocation estimates with corresponding INS second geolocation estimates. In some embodiments, such processing may also or alternatively occur in a separate processing element in one or more external devices (e.g., a computer, tablet, smart phone, remote cloud computer, utility locator device, or the like). A power element may be included for provisioning of electrical power to the various powered elements of the GNSS and INS based positioning device.

In another aspect, the present disclosure relates to a method for determining geolocation solutions via a GNSS and INS based positioning device of the present disclosure. The method may include a step moving a GNSS and INS based positioning device from a first known geolocation to a second geolocation. It should be noted that in some embodiments the distinction between "first geolocation(s)" and "second geolocation(s)" as used herein may describe a physical difference in position/geolocation. In other embodiments, the distinction between "first geolocation(s)" and "second geolocation(s)" herein may describe measurements that occur at different epochs in time where no physical difference in position/geolocation occurs. In some embodiments, the distinction between "first geolocation(s)" and "second geolocation(s)" may describe both a difference in position/geolocation as well as measurements that occur at different epochs in time. In yet further embodiments, the distinction between "first geolocation(s)" and "second geolocation(s)" used herein may describe measurements between different GNSS antennas in embodiments having an array of GNSS antennas (e.g., the multi-antenna positioning devices of the present disclosure). The GNSS and INS based positioning device may include one or more GNSS receivers, one or more associated GNSS antennas, a communication element for receiving SSR or PPP-RTK or RTK or correction data from reference element/station(s) and wherein time corrections may be parsed from the correction data, and an INS to generate inertial data between geolocations. In some method embodiments, the time adjustments from an individual GNSS receiver may have all the same offsets. Such time corrections may be done separately from all time related data for each GNSS receiver separately. The INS data may, for instance, include data regarding orientation, pose, movements, and/or other inertial data that may be generated via an accelerometer, an accelerometer and compass, and or an array of sensors and mechanisms including but not limited to gyroscopic sensors, accelerometers, compass sensors, altimeters, LiDAR, ground tracking mechanism, cameras, ground-penetrating radar (GPR), radar, and the like. In another step, the method may include estimating one or more GNSS based first and second geolocation estimates based on GNSS navigation signals and corrections data corresponding to each GNSS antenna. The method may further include a step estimating an INS based second geolocation estimate associated with each GNSS antenna at the second geolocation in the world frame based on inertial data generated by the INS. In another step, the method may include adjusting the time correction for each received navigation signal such that the corresponding GNSS based second geolocation(s) best align with the INS based second geolocation estimate for each GNSS antenna. For instance, the internal clock associated with each GNSS receiver used to receive and process navigation signals may be incrementally changed to make adjustments in improving positioning accuracy. The geolocation solution(s) and estimate(s), associated information, and/or instructions related to associated methods may be stored in a memory element having one or more non-transitory memories.

In another aspect, the present disclosure relates to a multi-antenna positioning device configured to execute methods disclosed herein related to finding geolocation solutions. The multi-antenna positioning device may include a plurality of GNSS antennas wherein each GNSS antenna receives navigation signals from GNSS satellites and reference element(s) and outputs associated navigation signals. A communication element may be included to receive SSR, PPP-RTK, RTK, or like correction data wherein time corrections may be parsed from the correction data. The multi-antenna positioning device may further include one or more GNSS receiver elements coupled at each GNSS antenna to each receive output navigation signals from GNSS antennas and correction data from the communication element and further generate GNSS geolocation estimates associated with each GNSS antenna. For instance, the GNSS receiver(s) may be configured for SSR, PPP-RTK, RTK, or like correction data wherein time corrections which may be parsed from the correction data. Likewise, such GNSS receivers may be configured to receive navigation signals from one or more navigation satellite constellations (e.g., GPS, GLONASS, BDS, QZSS, Galileo, and/or other satellite navigation systems) which may operate on one or more bands (e.g., the lower L-band, upper-L band, or the like). A memory element having one or more non-transitory memories may be included to store instructions, results, and other information relating to methods of present disclosure determining geolocation solutions. Further the multi-antenna positioning device may include a processing element operatively coupled to the memory element and GNSS receiver(s) and may be programmed to execute methods relating to generating geolocation solutions by adjusting time corrections of navigation signals associated with each GNSS geolocation estimate to best align the GNSS geolocation estimates with known spatial relationship of GNSS antennas and/or other methods disclosed herein. In some embodiments, such processing may also or alternatively occur in a separate processing element in one or more external devices (e.g., a computer, tablet, smart phone, remote cloud computer, utility locator device, or the like). The multi-antenna positioning device may also include a power element for provisioning of electrical power to the various powered elements of the multi-antenna positioning device.

In another aspect, the present disclosure relates to a method for determining geolocation solutions via a multi-antenna positioning device of the present disclosure. The method may include a step receiving navigation signals from a plurality of GNSS satellites at each GNSS antennas in a multi-antenna positioning device of the present disclosure. The multi-antenna GNSS device may have a plurality of GNSS antennas in a known spatial relationship to one another, one or more GNSS receivers coupled to each GNSS antenna, and a communication element for receiving SSR or PPP-RTK or RTK or other correction data from reference element/station(s) and wherein time corrections may be parsed from the correction data (e.g., satellite clock correction data). In some method embodiments, the time adjustments from an individual GNSS receiver may have all the same offsets. Such time corrections may be done separately from all time related data for each GNSS receiver separately. In another step, the method may include receiving correction data from reference element(s) via the communication element that includes time corrections which may be parsed from the correction data. In another step, the method may include generating a geolocation estimate associated with each GNSS antenna from the received navigation signals and correction data. In another step, the method may include comparing the spatial relationship of geolocation estimates for the plurality of GNSS antennas to the known spatial relationship of the GNSS antenna array. In another aspect, the method may include adjusting the time correction for each received navigation signal such that the corresponding second geolocation estimate for each GNSS antenna best fits with the known spatial relationship of the GNSS antenna array to generate geolocation solutions for each GNSS antenna. For instance, the internal clock associated with each GNSS receiver used to receive and process navigation signals may be incrementally changed to make adjustments in improving positioning accuracy. In another step, the method may include storing the geolocation solutions and estimates and/or associated information in a memory element having one or more non-transitory memories.

In another aspect, the present disclosure relates to another method for determining geolocation solutions via a GNSS and INS based positioning device of the present disclosure. The method may include a step calculating a plurality of geolocation estimates using different combinations of GNSS satellite constellations and/or reference satellites/elements in each constellation associated with each GNSS antenna to generate GNSS based first geolocation estimates and GNSS based second geolocation estimates via a GNSS and INS based position device of the present disclosure at a first geolocation and a second geolocation. An INS based second geolocation estimate may be generated based on inertial data from the INS element. The INS data may be or include orientation, pose, movements, and/or other inertial data that may be generated via an accelerometer, an accelerometer and compass, and or an array of sensors and mechanisms including but not limited to gyroscopic sensors, accelerometers, compass sensors, altimeters, LiDAR, ground tracking mechanism, cameras, ground-penetrating radar (GPR), radar, and the like. In another step, the method may include comparing GNSS based second geolocation estimates and INS based second geolocation estimates. The method may further include a step selecting geolocation solutions based on GNSS based second geolocation estimates that best align with INS based second geolocation estimates associated with each GNSS antenna or array of GNSS antennas. In another step, the method may include storing the geolocation solutions and geolocation estimates and/or associated information in a memory element having one or more non-transitory memories.

In another aspect, the present disclosure relates to another method for determining geolocation solutions via a multi-antenna positioning device of the present disclosure. The method may include a step receiving navigation signals from a plurality of GNSS satellites across a plurality of GNSS satellite constellations at a GNSS antenna array multi-antenna positioning device of the present disclosure having a known spatial relationship between GNSS antennas. In another step, the method may include calculating a plurality of geolocation estimates associated with each GNSS antenna using different combinations of reference satellites and/or GNSS satellite constellations. In another step, the method may include comparing spatial relationship of geolocation estimates to the known spatial relationship of the GNSS antennas. The method may further include a step selecting geolocation solutions based on the geolocation estimates or sets of geolocation estimates that best align with known spatial relationship of the GNSS antennas. In another step, the method may include storing the geolocation solutions and estimates and/or associated information in a memory element having one or more non-transitory memories.

In another aspect, the present disclosure may include a method for identifying carrier phase observation errors in GNSS navigation signal. Such a method may optionally be used to produce geolocation solutions that exclude navigation signals associated with carrier phase observation errors. In one step, the method may include receiving navigation signals from a plurality of GNSS satellites at each GNSS antenna in a GNSS based positioning device of the present disclosure that includes one or more GNSS antennas. In another step, the orientation and distance of each GNSS antenna relative to each GNSS satellites may be determined. Further, the carrier phase for each received navigation signal from each GNSS satellite at each GNSS antenna based on orientation and distance of each GNSS antenna relative to each GNSS satellites may be determined in generating geolocation solutions. The method may further include a step identifying carrier phase observation errors in navigation signal(s) that fall outside a predetermined acceptable range of corresponding predicted carrier phase. Information relating to navigation signals, corresponding carrier phase information, identified carrier phase observation errors, and associated geolocation solutions may further be stored in a memory element including one or more non-transitory memories.

Various additional aspects, features, and functionality are further described below in conjunction with the appended Drawings.

BRIEF DESCRIPTION OF THE DRAWINGS

The present disclosure may be more fully appreciated in connection with the following detailed description taken in conjunction with the accompanying Drawings, wherein.

DETAILED DESCRIPTION OF EMBODIMENTS

Overview

Figure 1A:
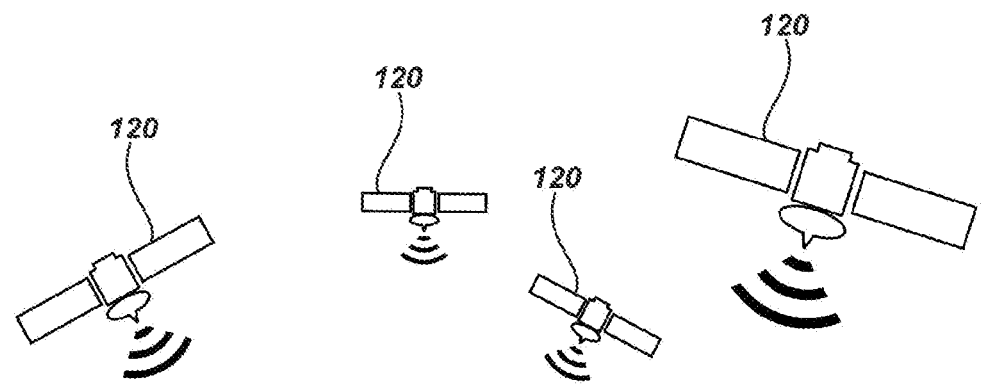
FIG. 1A is a drawing of a GNSS and INS based positioning device.
Figure 1A:
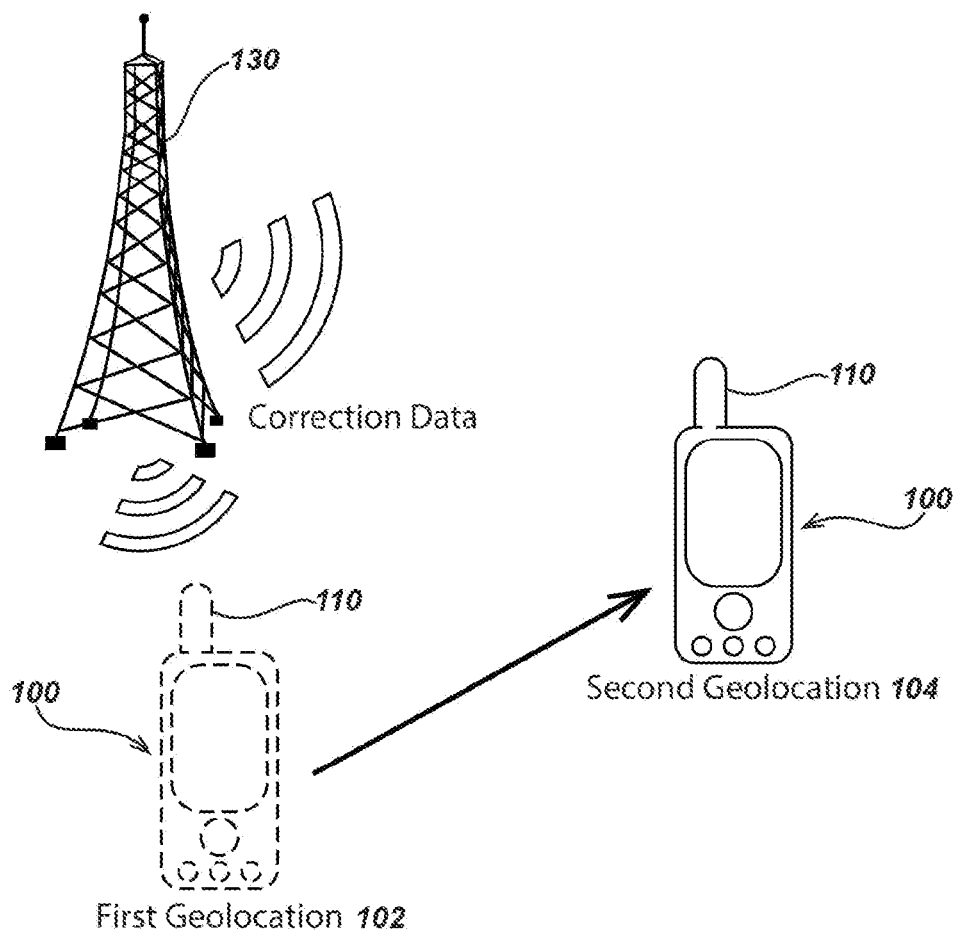

The disclosure relates generally to methods and devices for determining precise geolocations utilizing global navigation satellite systems (GNSS) and state space representation (SSR) or precise point positioning real-time kinematics (PPP-RTK) or real-time kinematics (RTK) or like correction data. More specifically, but not exclusively, the disclosure relates to methods and devices for determining precise geolocations utilizing GNSS and SSR, PPP-RTK, RTK, or like correction data which may be employed in utility locating and mapping.

In one aspect, the present disclosure relates to a GNSS and INS based positioning device configured to execute methods disclosed herein related to finding geolocation solutions. The GNSS and INS based positioning device may include one or more GNSS antennas wherein each GNSS antenna may receive navigation signals from GNSS satellites and output associated navigation signals. The GNSS and INS based positioning device may include a communication element to receive SSR, PPP-RTK, RTK, or like correction data wherein time corrections may be parsed from the correction data. Further, the GNSS and INS based positioning device may include one or more GNSS receiver elements coupled at each GNSS antenna to each receive output navigation signals from GNSS antennas and correction data from the communication element and further generate GNSS geolocation estimates associated with each GNSS antenna. For instance, such a GNSS receiver element may be or include GNSS receivers configured for SSR, PPP-RTK, RTK, or like correction data wherein time corrections may be parsed from the correction data. Likewise, such GNSS receivers may be configured to receive navigation signals from one or more navigation satellite constellations (e.g., GPS, GLONASS, BDS, QZSS, Galileo, and/or other satellite navigation systems) which may operate on one or more bands (e.g., the lower L-band, upper-L band, or the like). In some embodiments, such processing may also or alternatively occur in a separate processing element in the positioning device and/or one or more external devices (e.g., a computer, tablet, smart phone, remote cloud computer, utility locator device, or the like). The GNSS and INS based positioning device may include an INS including one or more inertial sensors or arrays of sensors to estimate movements and orientation associated with each GNSS antenna and/or device associated with the GNSS antenna(s). For instance, such INS data may include orientation, pose, movements, and/or other inertial data that may be generated via an accelerometer, an accelerometer and compass, and or an array of sensors and mechanisms including but not limited to gyroscopic sensors, accelerometers, compass sensors, altimeters, LiDAR, ground tracking mechanism, cameras, ground-penetrating radar (GPR), radar, and the like. In some embodiments where the GNSS and INS based positioning device is employed in a utility locator device or otherwise included in a system that includes information relating to magnetic signal(s) from utility lines which may be sensed via a utility locator device, the information relating to the magnetic signal(s) may be included in the inertial data. Further, the GNSS and INS based positioning device may include a memory element having one or more non-transitory memories to store instructions, results, and other information relating to methods of present disclosure in determining geolocation solutions as well as the resulting geolocation solutions. A processing element may be included having one or more processors operatively coupled to the memory element, GNSS receiver(s), and INS that may be programmed to execute methods relating to generating geolocation solutions by adjusting time corrections associated with navigation signals to best align the GNSS second geolocation estimates with corresponding INS second geolocation estimates and/or other methods disclosed herein. For instance, the internal clock associated with each GNSS receiver used to receive and process navigation signals may be incrementally changed to make adjustments in improving positioning accuracy. In some embodiments, such processing may also or alternatively occur in a separate processing element in one or more external devices (e.g., a computer, tablet, smart phone, remote cloud computer, utility locator device, or the like). A power element may be included for provisioning of electrical power to the various powered elements of the GNSS and INS based positioning device.

In another aspect, some GNSS and INS based positioning device embodiments may be included in a utility locator device which may further determine the locations of and map utility lines which may be buried in the ground. Such a utility locator device may include a GNSS and INS based positioning device of the present disclosure and a locator subsystem having one or more antennas and associated receiver circuitry to receive magnetic signals emitted by utility lines and/or RFID type markers which may be buried in the ground. The utility locator device embodiments may further include a user interface and input element to receive input commands from a user and further communicate data relating to utility line positions, geolocation solutions/estimates, and/or other mapping information to a user. A processing element operatively coupled to the GNSS and INS based positioning device, locator subsystem, and user interface and input element may be included in the utility locator device embodiment that may be programmed to locate and map utility lines from received magnetic signals. The processing element may further be programmed to execute methods relating to adjusting time corrections associated with navigation signals to best align GNSS second geolocation estimates with INS second geolocation estimates and further correlating and mapping resulting geolocation solutions with utility line positions and/or other methods disclosed herein. For instance, the internal clock associated with each GNSS receiver used to receive and process navigation signals may be incrementally changed to make adjustments in improving positioning accuracy that may further be correlated with utility line positions. The utility locator device embodiments may further include a memory element having one or more non-transitory memories to store instructions relating to methods of the present disclosure in determining geolocation solutions and resulting geolocation solutions as well as for correlating utility locating information and methods and a power element for portioning of electrical power to the various powered elements. In some embodiments, such a utility locator device may instead be a ground penetrating radar (GPR) or include GPR in the magnetic utility locator device disclosed or referenced herein to determine and/or map utility line positions that may be buried in the ground.

In another aspect, some GNSS and INS based positioning device embodiments may be included in a utility locating transmitter which may further couple electromagnetic current to one or more utility lines for the purposes of locating and mapping utility lines via a utility locator device. Such a utility locating transmitter may include a GNSS and INS based positioning device of the present disclosure. A current generation element for generating electromagnetic current at one or more known frequencies may be included for detection by a utility locator device when emitted by one or more utility lines. An output current element may be included in utility locating transmitter embodiments for coupling the electromagnetic current(s) to one or more utility lines. The utility locating transmitter may include a power element for portioning of electrical power to the various powered elements. In some embodiments, the utility locating transmitter may include a communication element for communicating geolocation solutions to utility locator device(s) and/or other GNSS based position device(s). In some such embodiments, the utility locating transmitter may be a non-moving base reference station/reference element or configured to act as a virtual reference station (VRS) for communicating correction data to utility locator device(s) and/or other GNSS based positioning device(s).

In another aspect, the present disclosure relates to a method for determining geolocation solutions via a GNSS and INS based positioning device of the present disclosure. The method may include a step moving a GNSS and INS based positioning device from a first known geolocation to a second geolocation. It should be noted that in some embodiments the distinction between "first geolocation(s)" and "second geolocation(s)" as used herein may describe a physical difference in position/geolocation. In other embodiments, the distinction between "first geolocation(s)" and "second geolocation(s)" herein may describe measurements that occur at different epochs in time where no physical difference in position/geolocation occurs. In some embodiments, the distinction between "first geolocation(s)" and "second geolocation(s)" may describe both a difference in position/geolocation as well as measurements that occur at different epochs in time. In yet further embodiments, the distinction between "first geolocation(s)" and "second geolocation(s)" used herein may describe measurements between different GNSS antennas in embodiments having an array of GNSS antennas (e.g., the multi-antenna positioning devices of the present disclosure). The GNSS and INS based positioning device may include one or more GNSS receivers, one or more associated GNSS antennas, a communication element for receiving SSR or PPP-RTK or RTK or other correction data from reference element/station(s) and wherein time corrections may be parsed from correction data, and an INS to generate inertial data between geolocations. For instance, such INS data may be or include data regarding orientation, pose, movements, and/or other inertial data that may be generated via an accelerometer, an accelerometer and compass, and or an array of sensors and mechanisms including but not limited to gyroscopic sensors, accelerometers, compass sensors, altimeters, LiDAR, ground tracking mechanism, cameras, ground-penetrating radar (GPR), radar, and the like. In some method embodiments, the time adjustments from an individual GNSS receiver may have all the same offsets. Such time corrections may be done separately from all time related data for each GNSS receiver separately. In embodiments where the GNSS and INS based positioning device is employed in a utility locator device or otherwise included in a system that includes information relating to magnetic signal(s) from one or more utility lines which may be sensed via a utility locator device, the information relating to magnetic signal(s) may be included in the inertial data. In another step, the method may include estimating one or more GNSS based first and second geolocation estimates based on GNSS navigation signals and corrections data corresponding to each GNSS antenna. The method may further include a step estimating an INS based second geolocation estimate associated with each GNSS antenna in the world frame based on inertial data generated by the INS. In another step, the method may include adjusting the time correction for each received navigation signal such that the corresponding GNSS based second geolocation(s) best align with the INS based second geolocation estimate for each GNSS antenna. In some method embodiments, the time adjustments from an individual GNSS receiver may have all the same offsets. Such time corrections may be done separately from all time related data for each GNSS receiver separately. In some method embodiments, the geolocation solution(s) may be correlated with mapped positions of utility lines determined by a utility locator device. The geolocation solution(s) and estimate(s), associated information, and/or instructions related to associated methods may be stored in a memory element having one or more non-transitory memories.

In another aspect, some method embodiments for determining geolocation via a GNSS and INS based positioning device may further include generating a plurality of geolocation solutions each associated with a GNSS antenna in an array of GNSS antennas having a known spatial relationship to one another. In some such embodiments, a step may be included wherein the known spatial relationship of GNSS antennas may improve and/or verify geolocation estimates and/or geolocation solutions.

In another aspect, some method embodiments for determining geolocation solutions via a GNSS and INS based positioning device may further include a step correlating mapped positions of utility lines determined by a utility locator device. Such a step may, for instance, happen in real-time, near real-time, and/or in post processing on a utility locator device or other device.

In another aspect, the present disclosure relates to a multi-antenna positioning device configured to execute methods disclosed herein related to finding geolocation solutions. The multi-antenna positioning device may include a plurality of GNSS antennas wherein each GNSS antenna receives navigation signals from GNSS satellites and reference element(s) and outputs associated navigation signals. A communication element may be included to receive SSR, PPP-RTK, RTK, or like correction data wherein time corrections may be parsed from the correction data. For instance, the internal clock associated with each GNSS receiver used to receive and process navigation signals may be incrementally changed to make adjustments in improving positioning accuracy. The multi-antenna positioning device may further include one or more GNSS receiver elements coupled at each GNSS antenna to each receive output navigation signals from GNSS antennas and correction data from the communication element and further generate GNSS geolocation estimates associated with each GNSS antenna. For instance, the GNSS receiver(s) may be configured for SSR, PPP-RTK, RTK, or correction data wherein time corrections may be parsed from the correction data. In some method embodiments, the time adjustments from an individual GNSS receiver may have all the same offsets. Such time corrections may be done separately from all time related data for each GNSS receiver separately. Likewise, such GNSS receivers may be configured to receive navigation signals from one or more navigation satellite constellations (e.g., GPS, GLONASS, BDS, QZSS, Galileo, and/or other satellite navigation systems) which may operate on one or more bands (e.g., the lower L-band, upper-L band, or the like). A memory element having one or more non-transitory memories may be included to store instructions, results, and other information relating to methods of the present disclosure determining geolocation solutions as well as the resulting geolocation solutions. Further the multi-antenna positioning device may include a processing element having one or more processors operatively coupled to the memory element and GNSS receiver(s) wherein the processing element may be programmed to execute methods relating to generating geolocation solutions by adjusting time corrections of navigation signals associated with each GNSS geolocation estimate to best align the GNSS geolocation estimates with known spatial relationship of GNSS antennas and/or other methods disclosed herein. In some embodiments, such processing may also or alternatively occur in a separate processing element in one or more external devices (e.g., a computer, tablet, smart phone, remote cloud computer, utility locator device, or the like) in real-time, near real-time, or in post processing. Optionally, an INS element having one or more inertial navigation sensors or arrays of sensors may be included coupled to the processing element for measuring movements of the multi-antenna GNSS device embodiments. For instance, such INS data may be or include data regarding orientation, pose, movements, and/or other inertial data that may be generated via an accelerometer, an accelerometer and compass, and or an array of sensors and mechanisms including but not limited to gyroscopic sensors, accelerometers, compass sensors, altimeters, LiDAR, ground tracking mechanism, cameras, ground-penetrating radar (GPR), radar, and the like. The multi-antenna positioning device may also include a power element for provisioning of electrical power to the various powered elements of the multi-antenna positioning device.

In another aspect, the multi-antenna positioning device embodiments may be employed in a utility locator device which may determine the location of and map utility lines. Such a utility locator device may include a multi-antenna positioning device of the present disclosure and a locator subsystem having one or more antennas and associated receiver circuitry to receive magnetic signals emitted by utility lines or RFID type markers which may be buried in the ground. The utility locator device embodiment may further include a user interface and input element to receive input commands from a user and further communicate data relating to utility line positions, geolocation solutions/estimates, and/or other mapping information to a user. A processing element, operatively coupled to the multi-antenna GNSS device, locator subsystem, and a memory element, may be included in the utility locator device embodiment that may be programmed to locate and map utility lines from received magnetic signals, methods relating to adjusting time corrections associated with navigation signals to best align GNSS second geolocation estimates with known spatial relationships of GNSS antennas and further correlating and mapping resulting geolocation solutions with utility line positions. In some method embodiments, the time adjustments from an individual GNSS receiver may have all the same offsets. Such time corrections may be done separately from all time related data for each GNSS receiver separately. The memory element may have one or more non-transitory memories to store instructions relating to methods of present disclosure in determining geolocation solutions and resulting geolocation solutions as well as for correlated utility locating information and methods. A power element may be included for portioning of electrical power to the various powered elements.

In another aspect, the multi-antenna positioning device embodiments may be employed in a utility locating transmitter further used for coupling electromagnetic current to one or more utility lines for the purposes of locating and mapping utility lines via a utility locator device. The utility locating transmitter embodiment may include a multi-antenna positioning device of the present disclosure. A current generation element for generating electromagnetic current at one or more known frequencies may be included for detection by a utility locator device when emitted by one or more utility lines. An output current element may be included in utility locating transmitter embodiments for coupling the electromagnetic current(s) to one or more utility lines. The utility locating transmitter may include a power element for portioning of electrical power to the various powered elements. In some embodiments, the utility locating transmitter may include a communication element for communicating geolocation solutions to utility locator device(s) and/or other GNSS based position device(s). In some such embodiments, the utility locating transmitter may be a non-moving base reference station/reference element or configured to act as a virtual reference station (VRS) for communicating correction data to utility locator device(s) and/or other GNSS based positioning device(s).

In another aspect, the present disclosure relates to a method for determining geolocation solutions via a multi-antenna positioning device of the present disclosure. The method may include a step receiving navigation signals from a plurality of GNSS satellites at each GNSS antenna in a multi-antenna positioning device of the present disclosure. The multi-antenna GNSS device may have a plurality of GNSS antennas in a known spatial relationship to one another, one or more GNSS receivers coupled to each GNSS antenna, and a communication element for receiving SSR or PPP-RTK or RTK or other correction data from reference element/station(s) and wherein time corrections may be parsed from the correction data. For instance, the internal clock associated with each GNSS receiver used to receive and process navigation signals may be incrementally changed to make adjustments in improving positioning accuracy. In some method embodiments, the time adjustments from an individual GNSS receiver may have all the same offsets. Such time corrections may be done separately from all time related data for each GNSS receiver separately. In another step, the method may include receiving correction data from reference element/station(s) via the communication element that includes time corrections parsed from the correction data. In another step, the method may include generating a geolocation estimate associated with each GNSS antenna from the received navigation signals and correction data. In another step, the method may include comparing the spatial relationship of geolocation estimates for the plurality of GNSS antennas to the known spatial relationship of the GNSS antenna array. In another aspect, the method may include adjusting the time correction for each received navigation signal such that the corresponding second geolocation estimate for each GNSS antenna best fits with the known spatial relationship of the GNSS antenna array to generate geolocation solutions for each GNSS antenna. In some method embodiments, the geolocation solution(s) may be correlated with mapped positions of utility lines determined by a utility locator device. The method may also include an optional step whereby INS data may be generated by the multi-antenna positioning device to improve and/or verify geolocation estimates and/or geolocation solutions. Such INS data may, for example, be or include data regarding orientation, pose, movements, and/or other inertial data that may be generated via an accelerometer, an accelerometer and compass, and or an array of sensors and mechanisms including but not limited to gyroscopic sensors, accelerometers, compass sensors, altimeters, LiDAR, ground tracking mechanism, cameras, ground-penetrating radar (GPR), radar, and the like. In another step, the method may include storing the geolocation solutions and estimates and/or associated information in a memory element having one or more non-transitory memories.

In another aspect, the present disclosure relates to another method for determining geolocation solutions via a GNSS and INS based positioning device of the present disclosure. The method may include a step calculating a plurality of geolocation estimates using different combinations of GNSS satellite constellations and/or reference satellites/elements in each constellation associated with GNSS antenna(s) to generate GNSS based first geolocation estimates and GNSS based second geolocation estimates via a GNSS and INS based position device of the present disclosure at a first geolocation and a second geolocation. An INS based second geolocation estimate may be generated based on inertial data from the INS element. The INS data may be or include data regarding orientation, pose, movements, and/or other inertial data that may be generated via an accelerometer, an accelerometer and compass, and or an array of sensors and mechanisms including but not limited to gyroscopic sensors, accelerometers, compass sensors, altimeters, LiDAR, ground tracking mechanism, cameras, ground-penetrating radar (GPR), radar, and the like. In another step, the method may include comparing GNSS based second geolocation estimates and INS based second geolocation estimates. The method may further include a step selecting geolocation solutions based on GNSS based second geolocation estimates that best align with INS based second geolocation estimates associated with each GNSS antenna or array of GNSS antennas. In another step, the method may include storing the geolocation solutions and geolocation estimates and/or associated information in a memory element having one or more non-transitory memories.

In another aspect, the present disclosure relates to another method for determining geolocation solutions via a multi-antenna positioning device of the present disclosure. The method may include a step receiving navigation signals from a plurality of GNSS satellites across a plurality of GNSS satellite constellations at a GNSS antenna array having known spatial relationship in a multi-antenna positioning device of the present disclosure. In another step, the method may include calculating a plurality of geolocation estimates associated with each GNSS antenna using different combinations of reference satellites and/or GNSS satellite constellations. In another step, the method may include comparing the spatial relationship of geolocation estimates to the known spatial relationship of the GNSS antennas. The method may further include a step selecting geolocation solutions based on geolocation estimates that best align with the known spatial relationship of the GNSS antennas. In another step, the method may include storing the geolocation solutions and estimates and/or associated information in a memory element having one or more non-transitory memories.

In another aspect, the present disclosure may include a method for identifying carrier phase observation errors in GNSS navigation signal. Such a method may optionally be used to produce geolocation solutions that exclude navigation signals associated with carrier phase observation errors. In one step, the method may include receiving navigation signals from a plurality of GNSS satellites at each GNSS antenna in a GNSS antenna array including a plurality of GNSS antennas. In another step, the orientation and distance of each GNSS antenna relative to each GNSS satellite may be determined. Further, the carrier phase for each received navigation signal from each GNSS satellite at each GNSS antenna may be predicted based on orientation and distance or relative distance of each GNSS antenna relative to each GNSS satellites based upon antenna array orientation. The method may further include a step identifying carrier phase observation errors in navigation signal(s) that fall outside a predetermined acceptable range of corresponding predicted carrier phases. Optionally, a step may be included for generating geolocation solution(s) associated with each GNSS antenna where the geolocation solution(s) exclude navigation signals associated with out of range carrier phases. Information relating to navigation signals, corresponding carrier phase information, identified carrier phase observation errors, and associated geolocation solutions may further be stored in a memory element including one or more non-transitory memories.

In another aspect, the present disclosure relates to a method for identifying carrier phase observation errors in GNSS navigation signals. The method may include a step receiving navigation signals from a plurality of GNSS satellites at each GNSS antenna in a GNSS antenna array including a plurality of GNSS antennas. The method may include a step determining the orientation and distance of each GNSS antenna relative to each GNSS satellite. In another step, the method may include predicting the carrier phase for each received navigation signal from each GNSS satellite at each GNSS antenna. In another step, the method may include identifying carrier phase observation errors in navigation signal(s) that fall outside a predetermined acceptable range of corresponding predicted carrier phases. In another step, the method may include storing information relating to navigation signals, corresponding carrier phase information, and identified carrier phase observation errors in a memory element including one or more non-transitory memories. In some method embodiments, an optional step may be included wherein the navigation signal(s) that fall outside a predetermined acceptable range of corresponding predicted carrier phase are excluded in determining geolocation solutions.

In another aspect, the present disclosure relates to another method for determining geolocation via a multi-antenna based positioning device of the present disclosure. The method may include a step receiving navigation signals from a plurality of GNSS satellites across a plurality of GNSS satellite constellations at each GNSS antenna in a GNSS antenna array that includes a plurality of GNSS antennas in a known positional relationship to one another. In another step, the method may include calculating a plurality of geolocation estimates associated with each GNSS antenna using different combinations of reference satellites/elements and GNSS satellite constellations. The method may include a step comparing calculated geolocation estimates with the known spatial relationship of GNSS antennas to determine a geolocation solution having the best fit. The method may include a step storing information relating to the calculated geolocations including geolocations that best fit the known positional relationship of the GNSS antennas. In some method embodiments, an optional step may be included calculating movements via an INS and comparing the calculated geolocation solutions against geolocations determined via INS movements. For instance, such INS data may be or include data regarding orientation, pose, movements, and/or other inertial data that may be generated via an accelerometer, an accelerometer and compass, and or an array of sensors and mechanisms including but not limited to gyroscopic sensors, accelerometers, compass sensors, altimeters, LiDAR, ground tracking mechanism, cameras, ground-penetrating radar (GPR), radar, and the like. The method embodiments may be performed in real-time or near real-time and/or in post processing on a utility locator device or other device.

Details of example devices, systems, and methods that may be combined with the geographic map updating system and method embodiments herein, as well as additional components, methods, and configurations that may be used in conjunction with the embodiments described herein, are disclosed in co-assigned patents and patent applications including: U.S. Pat. No. 7,009,399, issued Mar. 7, 2006, entitled OMNIDIRECTIONAL SONDE AND LINE LOCATOR; U.S. Pat. No. 7,136,765, issued Nov. 14, 2006, entitled A BURIED OBJECT LOCATING AND TRACING METHOD AND SYSTEM EMPLOYING PRINCIPAL COMPONENTS ANALYSIS FOR BLIND SIGNAL DETECTION; U.S. Pat. No. 7,221,136, issued May 22, 2007, entitled SONDES FOR LOCATING UNDERGROUND PIPES AND CONDUITS; U.S. Pat. No. 7,276,910, issued Oct. 2, 2007, entitled A COMPACT SELF-TUNED ELECTRICAL RESONATOR FOR BURIED OBJECT LOCATOR APPLICATIONS; U.S. Pat. No. 7,288,929, issued Oct. 30, 2007, entitled INDUCTIVE CLAMP FOR APPLYING SIGNAL TO BURIED UTILITIES; U.S. Pat. No. 7,298,126, issued Nov. 20, 2007, entitled SONDES FOR LOCATING UNDERGROUND PIPES AND CONDUITS; U.S. Pat. No. 7,332,901, issued Feb. 19, 2008, entitled LOCATOR WITH APPARENT DEPTH INDICATION; U.S. Pat. No. 7,443,154, issued Oct. 28, 2008, entitled MULTI-SENSOR MAPPING OMNIDIRECTIONAL SONDE AND LINE LOCATOR; U.S. Pat. No. 7,498,797, issued Mar. 3, 2009, entitled LOCATOR WITH CURRENT-MEASURING CAPABILITY; U.S. Pat. No. 7,498,816, issued Mar. 3, 2009, entitled OMNIDIRECTIONAL SONDE AND LINE LOCATOR; U.S. Pat. No. 7,336,078, issued Feb. 26, 2008, entitled MULTI-SENSOR MAPPING OMNIDIRECTIONAL SONDE AND LINE LOCATORS; U.S. Pat. No. 7,518,374, issued Apr. 14, 2009, entitled RECONFIGURABLE PORTABLE LOCATOR EMPLOYING MULTIPLE SENSOR ARRAYS HAVING FLEXIBLE NESTED ORTHOGONAL ANTENNAS; U.S. Pat. No. 7,557,559, issued Jul. 7, 2009, entitled COMPACT LINE ILLUMINATOR FOR BURIED PIPES AND CABLES; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. Pat. No. 7,733,077, issued Jun. 8, 2010, entitled MULTI-SENSOR MAPPING OMNIDIRECTIONAL SONDE AND LINE LOCATORS AND TRANSMITTER USED THEREWITH; U.S. Pat. No. 7,741,848, issued Jun. 22, 2010, entitled ADAPTIVE MULTICHANNEL LOCATOR SYSTEM FOR MULTIPLE PROXIMITY DETECTION; U.S. Pat. No. 7,755,360, issued Jul. 13, 2010, entitled PORTABLE LOCATOR SYSTEM WITH JAMMING REDUCTION; U.S. Pat. No. 7,825,647, issued Nov. 2, 2010, entitled METHOD FOR LOCATING BURIED PIPES AND CABLES; U.S. Pat. No. 7,830,149, issued Nov. 9, 2010, entitled AN UNDERGROUND UTILITY LOCATOR WITH A TRANSMITTER, A PAIR OF UPWARDLY OPENING POCKET AND HELICAL COIL TYPE ELECTRICAL CORDS; U.S. Pat. No. 7,864,980, issued Jan. 4, 2011, entitled SONDES FOR LOCATING UNDERGROUND PIPES AND CONDUITS; U.S. Pat. No. 7,948,236, issued May 24, 2011, entitled ADAPTIVE MULTICHANNEL LOCATOR SYSTEM FOR MULTIPLE PROXIMITY DETECTION; U.S. Pat. No. 7,969,151, issued Jun. 28, 2011, entitled PRE-AMPLIFIER AND MIXER CIRCUITRY FOR A LOCATOR ANTENNA; U.S. Pat. No. 7,990,151, issued Aug. 2, 2011, entitled TRI-POD BURIED LOCATOR SYSTEM; U.S. Pat. No. 8,013,610, issued Sep. 6, 2011, entitled HIGH Q SELF-TUNING LOCATING TRANSMITTER; U.S. Pat. No. 8,035,390, issued Oct. 11, 2011, entitled OMNIDIRECTIONAL SONDE AND LINE LOCATOR; U.S. Pat. No. 8,106,660, issued Jan. 31, 2012, entitled SONDE ARRAY FOR USE WITH BURIED LINE LOCATOR; U.S. Pat. No. 8,203,343, issued Jun. 19, 2012, entitled RECONFIGURABLE PORTABLE LOCATOR EMPLOYING MULTIPLE SENSOR ARRAYS HAVING FLEXIBLE NESTED ORTHOGONAL ANTENNAS; U.S. Pat. No. 8,264,226, issued Sep. 11, 2012, entitled SYSTEM AND METHOD FOR LOCATING BURIED PIPES AND CABLES WITH A MAN PORTABLE LOCATOR AND A TRANSMITTER IN A MESH NETWORK; U.S. Pat. No. 8,248,056, issued Aug. 21, 2012, entitled A BURIED OBJECT LOCATOR SYSTEM EMPLOYING AUTOMATED VIRTUAL DEPTH EVENT DETECTION AND SIGNALING; U.S. patent application Ser. No. 13/769,202, filed Feb. 15, 2013, entitled SMART PAINT STICK DEVICES AND METHODS; U.S. patent application Ser. No. 13/793,168, filed Mar. 11, 2013, entitled BURIED OBJECT LOCATORS WITH CONDUCTIVE ANTENNA BOBBINS; U.S. Pat. No. 8,400,154, issued Mar. 19, 2013, entitled LOCATOR ANTENNA WITH CONDUCTIVE BOBBIN; U.S. patent application Ser. No. 14/027,027, filed Sep. 13, 2013, entitled SONDE DEVICES INCLUDING A SECTIONAL FERRITE CORE STRUCTURE; U.S. patent application Ser. No. 14/033,349, filed Sep. 20, 2013, entitled AN UNDERGROUND UTILITY LOCATOR WITH A TRANSMITTER, A PAIR OF UPWARDLY OPENING POCKET AND HELICAL COIL TYPE ELECTRICAL CORDS; U.S. Pat. No. 8,547,428, issued Oct. 1, 2013, entitled PIPE MAPPING SYSTEM; U.S. Pat. No. 8,564,295, issued Oct. 22, 2013, entitled METHOD FOR SIMULTANEOUSLY DETERMINING A PLURALITY OF DIFFERENT LOCATIONS OF THE BURIED OBJECTS AND SIMULTANEOUSLY INDICATING THE DIFFERENT LOCATIONS TO A USER; U.S. patent application Ser. No. 14/148,649, filed Jan. 6, 2014, entitled MAPPING LOCATING SYSTEMS & METHODS; U.S. Pat. No. 8,635,043, issued Jan. 21, 2014, entitled LOCATOR AND TRANSMITTER CALIBRATION SYSTEM; U.S. Pat. No. 8,717,028, issued May 6, 2014, entitled SPRING CLIPS FOR USE WITH LOCATING TRANSMITTERS; U.S. Pat. No. 8,773,133, issued Jul. 8, 2014, entitled ADAPTIVE MULTICHANNEL LOCATOR SYSTEM FOR MULTIPLE PROXIMITY DETECTION; U.S.

Pat. No. 8,841,912, issued Sep. 23, 2014, entitled PREAMPLIFIER AND MIXER CIRCUITRY FOR A LOCATOR ANTENNA; U.S. Pat. No. 9,041,794, issued May 26, 2015, entitled PIPE MAPPING SYSTEMS AND METHODS; U.S. Pat. No. 9,057,754, issued Jun. 16, 2015, entitled ECONOMICAL MAGNETIC LOCATOR APPARATUS AND METHOD; U.S. Pat. No. 9,081,109, issued Jul. 14, 2015, entitled GROUND-TRACKING DEVICES FOR USE WITH A MAPPING LOCATOR; U.S. Pat. No. 9,082,269, issued Jul. 14, 2015, entitled HAPTIC DIRECTIONAL FEEDBACK HANDLES FOR LOCATION DEVICES; U.S. Pat. No. 9,085,007, issued Jul. 21, 2015, entitled MARKING PAINT APPLICATOR FOR PORTABLE LOCATOR; U.S. Pat. No. 9,207,350, issued Dec. 8, 2015, entitled BURIED OBJECT LOCATOR APPARATUS WITH SAFETY LIGHTING ARRAY; U.S. Pat. No. 9,341,740, issued May 17, 2016, entitled OPTICAL GROUND TRACKING APPARATUS, SYSTEMS, AND METHODS; U.S. Pat. No. 9,372,117, issued Jun. 21, 2016, entitled OPTICAL GROUND TRACKING APPARATUS, SYSTEMS, AND METHODS; U.S. patent application Ser. No. 15/187,785, filed Jun. 21, 2016, entitled BURIED UTILITY LOCATOR GROUND TRACKING APPARATUS, SYSTEMS, AND METHODS; U.S. Pat. No. 9,411,066, issued Aug. 9, 2016, entitled SONDES & METHODS FOR USE WITH BURIED LINE LOCATOR SYSTEMS; U.S. Pat. No. 9,411,067, issued Aug. 9, 2016, entitled GROUND-TRACKING SYSTEMS AND APPARATUS; U.S. Pat. No. 9,435,907, issued Sep. 6, 2016, entitled PHASE SYNCHRONIZED BURIED OBJECT LOCATOR APPARATUS, SYSTEMS, AND METHODS; U.S. Pat. No. 9,465,129, issued Oct. 11, 2016, entitled IMAGE-BASED MAPPING LOCATING SYSTEM; U.S. Pat. No. 9,488,747, issued Nov. 8, 2016, entitled GRADIENT ANTENNA COILS AND ARRAYS FOR USE IN LOCATING SYSTEM; U.S. Pat. No. 9,494,706, issued Nov. 15, 2016, entitled OMNI-INDUCER TRANSMITTING DEVICES AND METHODS; U.S. Pat. No. 9,523,788, issued Dec. 20, 2016, entitled MAGNETIC SENSING BURIED OBJECT LOCATOR INCLUDING A CAMERA; U.S. Pat. No. 9,571,326, issued Feb. 14, 2017, entitled METHOD AND APPARATUS FOR HIGH-SPEED DATA TRANSFER EMPLOYING SELF-SYNCHRONIZING QUADRATURE AMPLITUDE MODULATION (QAM); U.S. Pat. No. 9,599,449, issued Mar. 21, 2017, entitled SYSTEMS AND METHODS FOR LOCATING BURIED OR HIDDEN OBJECTS USING SHEET CURRENT FLOW MODELS; U.S. Pat. No. 9,599,740, issued Mar. 21, 2017, entitled USER INTERFACES FOR UTILITY LOCATORS; U.S. Pat. No. 9,625,602, issued Apr. 18, 2017, entitled SMART PERSONAL COMMUNICATION DEVICES AS USER INTERFACES; U.S. Pat. No. 9,632,202, issued Apr. 25, 2017, entitled ECONOMICAL MAGNETIC LOCATOR APPARATUS AND METHODS; U.S. Pat. No. 9,634,878, issued Apr. 25, 2017, entitled SYSTEMS AND METHODS FOR DATA TRANSFER USING SELF-SYNCHRONIZING QUADRATURE AMPLITUDE MODULATION (QAM); United States patent application, filed Apr. 25, 2017, entitled SYSTEMS AND METHODS FOR LOCATING AND/OR MAPPING BURIED UTILITIES USING VEHICLE-MOUNTED LOCATING DEVICES; U.S. Pat. No. 9,638,824, issued May 2, 2017, entitled QUAD-GRADIENT COILS FOR USE IN LOCATING SYSTEMS; United States patent application, filed May 9, 2017, entitled BORING INSPECTION SYSTEMS AND METHODS; U.S. Pat. No. 9,651,711, issued May 16, 2017, entitled HORIZONTAL BORING INSPECTION DEVICE AND METHODS; U.S. Pat. No. 9,684,090, issued Jun. 20, 2017, entitled NULLED-SIGNAL LOCATING DEVICES, SYSTEMS, AND METHODS; U.S. Pat. No. 9,696,447, issued Jul. 4, 2017, entitled BURIED OBJECT LOCATING METHODS AND APPARATUS USING MULTIPLE ELECTROMAGNETIC SIGNALS; U.S. Pat. No. 9,696,448, issued Jul. 4, 2017, entitled GROUND-TRACKING DEVICES AND METHODS FOR USE WITH A UTILITY LOCATOR; U.S. Pat. No. 9,703,002, issued Jun. 11, 2017, entitled UTILITY LOCATOR SYSTEMS & METHODS; U.S. patent application Ser. No. 15/670,845, filed Aug. 7, 2016, entitled HIGH FREQUENCY AC-POWERED DRAIN CLEANING AND INSPECTION APPARATUS & METHODS; U.S. patent application Ser. No. 15/681,250, filed Aug. 18, 2017, entitled ELECTRONIC MARKER DEVICES AND SYSTEMS; U.S. patent application Ser. No. 15/681,409, filed Aug. 20, 2017, entitled WIRELESS BURIED PIPE & CABLE LOCATING SYSTEMS; U.S. Pat. No. 9,746,572, issued Aug. 29, 2017, entitled ELECTRONIC MARKER DEVICES AND SYSTEMS; U.S. Pat. No. 9,746,573, issued Aug. 29, 2017, entitled WIRELESS BURIED PIPE AND CABLE LOCATING SYSTEMS; U.S. Pat. No. 9,784,837, issued Oct. 10, 2017, entitled OPTICAL GROUND TRACKING APPARATUS, SYSTEMS & METHODS; U.S. patent application Ser. No. 15/811,361, filed Nov. 13, 2017, entitled OPTICAL GROUND-TRACKING APPARATUS, SYSTEMS, AND METHODS; U.S. Pat. No. 9,841,503, issued Dec. 12, 2017, entitled OPTICAL GROUND-TRACKING APPARATUS, SYSTEMS, AND METHODS; U.S. patent application Ser. No. 15/846,102, filed Dec. 18, 2017, entitled SYSTEMS AND METHOD FOR ELECTRONICALLY MARKING, LOCATING AND VIRTUALLY DISPLAYING BURIED UTILITIES; U.S. patent application Ser. No. 15/866,360, filed Jan. 9, 2018, entitled TRACKED DISTANCE MEASURING DEVICES, SYSTEMS, AND METHODS; U.S. Pat. No. 9,891,337, issued Feb. 13, 2018, entitled UTILITY LOCATOR TRANSMITTER DEVICES, SYSTEMS, and METHODS WITH DOCKABLE APPARATUS; U.S. Pat. No. 9,914,157, issued Mar. 13, 2018, entitled METHODS AND APPARATUS FOR CLEARING OBSTRUCTIONS WITH A JETTER PUSH-CABLE APPARATUS; U.S. patent application Ser. No. 15/925,643, issued Mar. 19, 2018, entitled PHASE-SYNCHRONIZED BURIED OBJECT TRANSMITTER AND LOCATOR METHODS AND APPARATUS; U.S. patent application Ser. No. 15/925,671, issued Mar. 19, 2018, entitled MULTI-FREQUENCY LOCATING SYSTEMS AND METHODS; U.S. patent application Ser. No. 15/936,250, filed Mar. 26, 2018, entitled GROUND TRACKING APPARATUS, SYSTEMS, AND METHODS; U.S. Pat. No. 9,927,545, issued Mar. 27, 2018, entitled MULTI-FREQUENCY LOCATING SYSTEMS & METHODS; U.S. Pat. No. 9,928,613, issued Mar. 27, 2018, entitled GROUND TRACKING APPARATUS, SYSTEMS, AND METHODS; U.S. patent application Ser. No. 15/250,666, filed Mar. 27, 2018, entitled PHASE-SYNCHRONIZED BURIED OBJECT TRANSMITTER AND LOCATOR METHODS AND APPARATUS; U.S. Pat. No. 9,880,309, issued Mar. 28, 2018, entitled UTILITY LOCATOR TRANSMITTER APPARATUS & METHODS; U.S. patent application Ser. No. 15/954,486, filed Apr. 16, 2018, entitled UTILITY LOCATOR APPARATUS, SYSTEMS, AND METHODS; U.S. Pat. No. 9,945,976, issued Apr. 17, 2018, entitled UTILITY LOCATOR APPARATUS, SYSTEMS, AND METHODS; U.S. Pat. No. 9,989,662, issued Jun. 5, 2018, entitled BURIED OBJECT LOCATING DEVICE WITH A PLURALITY OF SPHERICAL SENSOR BALLS THAT INCLUDE A PLURALITY OF ORTHOGONAL ANTENNAE; U.S. patent application Ser. No. 16/036,713, issued Jul. 16, 2018, entitled UTILITY LOCATOR APPARATUS AND SYSTEMS; U.S. Pat. No. 10,024,994, issued Jul. 17, 2018, entitled WEARABLE MAGNETIC FIELD UTILITY LOCATOR SYSTEM WITH SOUND FIELD GENERATION; U.S. Pat. No. 10,031,253, issued Jul. 24, 2018, entitled GRADIENT ANTENNA COILS AND ARRAYS FOR USE IN LOCATING SYSTEMS; U.S. Pat. No. 10,042,072, issued Aug. 7, 2018, entitled OMNI-INDUCER TRANSMITTING DEVICES AND METHODS; U.S. Pat. No. 10,059,504, issued Aug. 28, 2018, entitled MARKING PAINT APPLICATOR FOR USE WITH PORTABLE UTILITY LOCATOR; U.S. patent application Ser. No. 16/049,699, filed Jul. 30, 2018, entitled OMNI-INDUCER TRANSMITTING DEVICES AND METHODS; U.S. Pat. No. 10,069,667, issued Sep. 4, 2018, entitled SYSTEMS AND METHODS FOR DATA TRANSFER USING SELF-SYNCHRONIZING QUADRATURE AMPLITUDE MODULATION (QAM); U.S. patent application Ser. No. 16/121,379, filed Sep. 4, 2018, entitled KEYED CURRENT SIGNAL UTILITY LOCATING SYSTEMS AND METHODS; U.S. patent application Ser. No. 16/125,768, filed Sep. 10, 2018, entitled BURIED OBJECT LOCATOR APPARATUS AND METHODS; U.S. Pat. No. 10,073,186, issued Sep. 11, 2018, entitled KEYED CURRENT SIGNAL UTILITY LOCATING SYSTEMS AND METHODS; U.S. patent application Ser. No. 16/133,642, issued Sep. 17, 2018, entitled MAGNETIC UTILITY LOCATOR DEVICES AND METHODS; U.S. Pat. No. 10,078,149, issued Sep. 18, 2018, entitled BURIED OBJECT LOCATORS WITH DODECAHEDRAL ANTENNA NODES; U.S. Pat. No. 10,082,591, issued Sep. 25, 2018, entitled MAGNETIC UTILITY LOCATOR DEVICES & METHODS; U.S. Pat. No. 10,082,599, issued Sep. 25, 2018, entitled MAGNETIC SENSING BURIED OBJECT LOCATOR INCLUDING A CAMERA; U.S. Pat. No. 10,090,498, issued Oct. 2, 2018, entitled MODULAR BATTERY PACK APPARATUS, SYSTEMS, AND METHODS INCLUDING VIRAL DATA AND/OR CODE TRANSFER; U.S. patent application Ser. No. 16/160,874, filed Oct. 15, 2018, entitled TRACKABLE DIPOLE DEVICES, METHODS, AND SYSTEMS FOR USE WITH MARKING PAINT STICKS; U.S. patent application Ser. No. 16/222,994, filed Dec. 17, 2018, entitled UTILITY LOCATORS WITH RETRACTABLE SUPPORT STRUCTURES AND APPLICATIONS THEREOF; U.S. Pat. No. 10,105,723, issued Oct. 23, 2018, entitled TRACKABLE DIPOLE DEVICES, METHODS, AND SYSTEMS FOR USE WITH MARKING PAINT STICKS; U.S. Pat. No. 10,162,074, issued Dec. 25, 2018, entitled UTILITY LOCATORS WITH RETRACTABLE SUPPORT STRUCTURES AND APPLICATIONS THEREOF; U.S. patent application Ser. No. 16/241,864, filed Jan. 7, 2019, entitled TRACKED DISTANCE MEASURING DEVICES, SYSTEMS, AND METHODS; U.S. patent application Ser. No. 16/255,524, filed Jan. 23, 2019, entitled RECHARGEABLE BATTERY PACK ONBOARD CHARGE STATE INDICATION METHODS AND APPARATUS; U.S. Pat. No. 10,247,845, issued Apr. 2, 2019, entitled UTILITY LOCATOR TRANSMITTER APPARATUS AND METHODS; U.S. patent application Ser. No. 16/382,136, filed Apr. 11, 2019, entitled GEOGRAPHIC MAP UPDATING METHODS AND SYSTEMS; U.S. Pat. No. 10,274,632, issued Apr. 20, 2019, entitled UTILITY LOCATING SYSTEMS WITH MOBILE BASE STATION; U.S. patent application Ser. No. 16/390,967, filed Apr. 22, 2019, entitled UTILITY LOCATING SYSTEMS WITH MOBILE BASE STATION; U.S. patent application Ser. No. 29/692,937, filed May 29, 2019, entitled BURIED OBJECT LOCATOR; U.S. patent application Ser. No. 16/436,903, filed Jun. 10, 2019, entitled OPTICAL GROUND TRACKING APPARATUS, SYSTEMS, AND METHODS FOR USE WITH BURIED UTILITY LOCATORS; U.S. Pat. No. 10,317,559, issued Jun. 11, 2019, entitled GROUND-TRACKING DEVICES AND METHODS FOR USE WITH A UTILITY LOCATOR; U.S. patent application Ser. No. 16/449,187, filed Jun. 21, 2019, entitled ELECTROMAGNETIC MARKER DEVICES FOR BURIED OR HIDDEN USE; U.S. patent application Ser. No. 16/455,491, filed Jun. 27, 2019, entitled SELF-STANDING MULTI-LEG ATTACHMENT DEVICES FOR USE WITH UTILITY LOCATORS; U.S. Pat. No. 10,353,103, issued Jul. 16, 2019, entitled SELF-STANDING MULTI-LEG ATTACHMENT DEVICES FOR USE WITH UTILITY LOCATORS; U.S. patent application Ser. No. 16/551,653, filed Aug. 26, 2019, entitled BURIED UTILITY MARKER DEVICES, SYSTEMS, AND METHODS; U.S. Pat. No. 10,401,526, issued Sep. 3, 2019, entitled BURIED UTILITY MARKER DEVICES, SYSTEMS, AND METHODS; U.S. Pat. No. 10,324,188, issued Oct. 9, 2019, entitled OPTICAL GROUND TRACKING APPARATUS, SYSTEMS, AND METHODS FOR USE WITH BURIED UTILITY LOCATORS; U.S. patent application Ser. No. 16/446,456, filed Jun. 19, 2019, entitled DOCKABLE TRIPODAL CAMERA CONTROL UNIT; U.S. patent application Ser. No. 16/520,248, filed Jul. 23, 2019, entitled MODULAR BATTERY PACK APPARATUS, SYSTEMS, AND METHODS; U.S. Pat. No. 10,371,305, issued Aug. 6, 2019, entitled DOCKABLE TRIPODAL CAMERA CONTROL UNIT; U.S. Pat. No. 10,490,908, issued Nov. 26, 2019, entitled DUAL ANTENNA SYSTEMS WITH VARIABLE POLARIZATION; U.S. patent application Ser. No. 16/701,085, filed Dec. 2, 2019, entitled MAP GENERATION BASED ON UTILITY LINE POSITION AND ORIENTATION ESTIMATES; U.S. Pat. No. 10,534,105, issued Jan. 14, 2020, entitled UTILITY LOCATING TRANSMITTER APPARATUS AND METHODS; U.S. patent application Ser. No. 16/773,952, filed Jan. 27, 2020, entitled MAGNETIC FIELD CANCELING AUDIO DEVICES; U.S. patent application Ser. No. 16/780,813, filed Feb. 3, 2020, entitled RESILIENTLY DEFORMABLE MAGNETIC FIELD CORE APPARATUS AND APPLICATIONS; U.S. Pat. No. 10,555,086, issued Feb. 4, 2020, entitled MAGNETIC FIELD CANCELING AUDIO SPEAKERS FOR USE WITH BURIED UTILITY LOCATORS OR OTHER DEVICES; U.S. patent application Ser. No. 16/786,935, filed Feb. 10, 2020, entitled SYSTEMS AND METHODS FOR UNIQUELY IDENTIFYING BURIED UTILITIES IN A MULTI-UTILITY ENVIRONMENT; U.S. Pat. No. 10,557,824, issued Feb. 11, 2020, entitled RESILIENTLY DEFORMABLE MAGNETIC FIELD TRANSMITTER CORES FOR USE WITH UTILITY LOCATING DEVICES AND SYSTEMS; U.S. patent application Ser. No. 16/791,979, issued Feb. 14, 2020, entitled MARKING PAINT APPLICATOR APPARATUS; U.S. patent application Ser. No. 16/792,047, filed Feb. 14, 2020, entitled SATELLITE AND MAGNETIC FIELD SONDE APPARATUS AND METHODS; U.S. Pat. No. 10,564,309, issued Feb. 18, 2020, entitled SYSTEMS AND METHODS FOR UNIQUELY IDENTIFYING BURIED UTILITIES IN A MULTI-UTILITY ENVIRONMENT; U.S. Pat. No. 10,571,594, issued Feb. 25, 2020, entitled UTILITY LOCATOR DEVICES, SYSTEMS, AND METHODS WITH SATELLITE AND MAGNETIC FIELD SONDE ANTENNA SYSTEMS; U.S.

Pat. No. 10,569,952, issued Feb. 25, 2020, entitled MARKING PAINT APPLICATOR FOR USE WITH PORTABLE UTILITY LOCATOR; U.S. patent application Ser. No. 16/810,788, filed Mar. 5, 2019, entitled MAGNETICALLY RETAINED DEVICE HANDLES; U.S. patent application Ser. No. 16/827,672, filed Mar. 23, 2020, entitled DUAL ANTENNA SYSTEMS WITH VARIABLE POLARIZATION; U.S. patent application Ser. No. 16/833,426, filed Mar. 27, 2020, entitled LOW COST, HIGH PERFORMANCE SIGNAL PROCESSING IN A MAGNETIC-FIELD SENSING BURIED UTILITY LOCATOR SYSTEM; U.S. Pat. No. 10,608,348, issued Mar. 31, 2020, entitled DUAL ANTENNA SYSTEMS WITH VARIABLE POLARIZATION; U.S. patent application Ser. No. 16/837,923, filed Apr. 1, 2020, entitled MODULAR BATTERY PACK APPARATUS, SYSTEMS, AND METHODS INCLUDING VIRAL DATA AND/OR CODE TRANSFER; U.S. patent application Ser. No. 17/235,507, filed Apr. 20, 2021, entitled UTILITY LOCATING DEVICES EMPLOYING MULTIPLE SPACED APART GNSS ANTENNAS; U.S. Provisional Patent Application 63/015,692, filed Apr. 27, 2020, entitled SPATIALLY AND PROCESSING-BASED DIVERSE REDUNDANCY FOR RTK POSITIONING; U.S. patent application Ser. No. 16/872,362, filed May 11, 2020, entitled BURIED LOCATOR SYSTEMS AND METHODS; U.S. patent application Ser. No. 16/882,719, filed May 25, 2020, entitled UTILITY LOCATING SYSTEMS, DEVICES, AND METHODS USING RADIO BROADCAST SIGNALS; U.S. Pat. No. 10,670,766, issued Jun. 2, 2020, entitled UTILITY LOCATING SYSTEMS, DEVICES, AND METHODS USING RADIO BROADCAST SIGNALS; U.S. Pat. No. 10,677,820, issued Jun. 9, 2020, entitled BURIED LOCATOR SYSTEMS AND METHODS; U.S. patent application Ser. No. 16/902,245, filed Jun. 15, 2020, entitled LOCATING DEVICES, SYSTEMS, AND METHODS USING FREQUENCY SUITES FOR UTILITY DETECTION; U.S. patent application Ser. No. 16/902,249, filed Jun. 15, 2020, entitled USER INTERFACES FOR UTILITY LOCATORS; U.S. Pat. No. 10,690,795, issued Jun. 23, 2020, entitled LOCATING DEVICES, SYSTEMS, AND METHODS USING FREQUENCY SUITES FOR UTILITY DETECTION; U.S. patent application Ser. No. 16/908,625, filed Jun. 22, 2020, entitled ELECTROMAGNETIC MARKER DEVICES WITH SEPARATE RECEIVE AND TRANSMIT ANTENNA ELEMENTS; U.S. Pat. No. 10,690,796, issued Jun. 23, 2020, entitled USER INTERFACES FOR UTILITY LOCATORS; U.S. patent application Ser. No. 16/921,775, filed Jul. 6, 2020, entitled AUTO-TUNING CIRCUIT APPARATUS AND METHODS; U.S. Provisional Patent Application 63/055,278, filed Jul. 22, 2020, entitled VEHICLE-BASED UTILITY LOCATING USING PRINCIPAL COMPONENTS; U.S. patent application Ser. No. 16/995,801, filed Aug. 17, 2020, entitled UTILITY LOCATOR TRANSMITTER DEVICES, SYSTEMS, AND METHODS; U.S. patent application Ser. No. 17/001,200, filed Aug. 24, 2020, entitled MAGNETIC SENSING BURIED UTILITY LOCATOR INCLUDING A CAMERA; U.S. patent Ser. No. 16/995,793, filed Aug. 17, 2020, entitled UTILITY LOCATOR APPARATUS AND METHODS; U.S. Pat. No. 10,753,722, issued Aug. 25, 2020, entitled SYSTEMS AND METHODS FOR LOCATING BURIED OR HIDDEN OBJECTS USING SHEET CURRENT FLOW MODELS; U.S. Pat. No. 10,754,053, issued Aug. 25, 2020, entitled UTILITY LOCATOR TRANSMITTER DEVICES, SYSTEMS, AND METHODS WITH DOCKABLE APPARATUS; U.S. Pat. No. 10,761,233, issued Sep. 1, 2020, entitled SONDES AND METHODS FOR USE WITH BURIED LINE LOCATOR SYSTEMS; U.S. Pat. No. 10,761,239, issued Sep. 1, 2020, entitled MAGNETIC SENSING BURIED UTILITY LOCATOR INCLUDING A CAMERA; U.S. patent application Ser. No. 17/013,831, filed Sep. 7, 2020, entitled MULTIFUNCTION BURIED UTILITY LOCATING CLIPS; U.S. Pat. No. 10,777,919, issued Sep. 15, 2020, entitled MULTIFUNCTION BURIED UTILITY LOCATING CLIPS; U.S. patent application Ser. No. 17/020,487, filed Sep. 14, 2020, entitled ANTENNA SYSTEMS FOR CIRCULARLY POLARIZED RADIO SIGNALS; U.S. patent application Ser. No. 17/068,156, filed Oct. 12, 2020, entitled DUAL SENSED LOCATING SYSTEMS AND METHODS; U.S. Provisional Patent Application 63/091,67, filed Oct. 14, 2020, entitled ELECTRONIC MARKER-BASED NAVIGATION SYSTEMS AND METHODS FOR USE IN GNSS-DEPRIVED ENVIRONMENTS; U.S. Pat. No. 10,809,408, issued Oct. 20, 2020, entitled DUAL SENSED LOCATING SYSTEMS AND METHODS; U.S. Pat. No. 10,845,497, issued Nov. 24, 2020, entitled PHASE-SYNCHRONIZED BURIED OBJECT TRANSMITTER AND LOCATOR METHODS AND APPARATUS; U.S. Pat. No. 10,859,727, issued Dec. 8, 2020, entitled ELECTRONIC MARKER DEVICES AND SYSTEMS; U.S. Pat. No. 10,908,311, issued Feb. 2, 2021, entitled SELF-STANDING MULTI-LEG ATTACHMENT DEVICES FOR USE WITH UTILITY LOCATORS; U.S. Pat. No. 10,928,538, issued Feb. 23, 2021, entitled KEYED CURRENT SIGNAL LOCATING SYSTEMS AND METHODS; U.S. Pat. No. 10,935,686, issued Mar. 2, 2021, entitled UTILITY LOCATING SYSTEM WITH MOBILE BASE STATION; U.S. Pat. No. 10,955,583, issued Mar. 23, 2021, entitled BORING INSPECTION SYSTEMS AND METHODS; U.S. Pat. No. 10,983,239, issued Apr. 20, 2021, entitled MULTI-FREQUENCY LOCATING SYSTEMS AND METHODS; U.S. Pat. No. 10,983,240, issued Apr. 20, 2021, entitled MAGNETIC UTILITY LOCATOR DEVICE AND METHOD; U.S. Pat. No. 10,989,830, issued Apr. 27, 2021, entitled UTILITY LOCATOR APPARATUS AND SYSTEMS; U.S. Pat. No. 11,014,734, issued May 25, 2021, entitled MARKING PAINT APPLICATOR APPARATUS; U.S. Pat. No. 11,029,439, issued Jun. 8, 2021, entitled UTILITY LOCATOR APPARATUS, SYSTEMS, AND METHODS; U.S. Provisional Patent Application 63/212,713, filed Jun. 20, 2021, entitled DAYLIGHT VISIBLE AND MULTI-SPECTRAL LASER RANGEFINDERS AND ASSOCIATED METHODS AND UTILITY LOCATOR DEVICES; U.S. Pat. D922,885, issued Jun. 22, 2021, entitled BURIED UTILITY LOCATOR; U.S. patent application Ser. No. 17/379,867, filed Jul. 19, 2021, entitled LOCATING DEVICES, SYSTEMS, AND METHODS USING FREQUENCY SUITES FOR UTILITY DETECTION; U.S. patent application Ser. No. 17/382,040, filed Jul. 21, 2021, entitled VEHICLE-BASED UTILITY LOCATING USING PRINCIPAL COMPONENTS; U.S. Pat. No. 11,073,632, issued Jul. 27, 2021, entitled LOCATING DEVICES, SYSTEMS, AND METHODS USING FREQUENCY SUITES FOR UTILITY DETECTION; U.S. Pat. No. 11,092,712, issued Aug. 17, 2021, entitled UTILITY LOCATING SYSTEMS, DEVICES, AND METHODS USING RADIO BROADCAST SIGNALS; U.S. patent application Ser. No. 17/461,833, filed Aug. 30, 2021, entitled COMBINED SATELLITE NAVIGATION AND RADIO TRANSCEIVER ANTENNA DEVICES; U.S. patent application Ser. No. 17/467,435, filed Sep. 6, 2021, entitled TRACKABLE DIPOLE DEVICES, METHODS, AND SYSTEMS FOR USE WITH MARKING PAINT STICKS; U.S. patent application Ser. No. 17/467,438, filed Sep. 6, 2021, entitled SATELLITE AND MAGNETIC FIELD SONDE APPARATUS AND METHODS; U.S. Pat. No. 11,137,513, issued Oct. 5, 2021, entitled INDUCTIVE CLAMP DEVICES, SYSTEMS, AND METHODS; U.S. Pat. No. 11,146,892, issued Oct. 12, 2021, entitled MAGNETIC FIELD CANCELING AUDIO DEVICES; U.S. patent application Ser. No. 17/501,670, filed Oct. 14, 2021, entitled ELECTRONIC MARKER-BASED NAVIGATION SYSTEMS AND METHODS FOR USE IN GNSS-DEPRIVED ENVIRONMENTS; U.S. Pat. No. 11,156,737, issued Oct. 26, 2021, entitled BURIED OBJECT LOCATOR APPARATUS AND METHODS; U.S. Pat. No. 11,171,369, issued Nov. 9, 2021, entitled MODULAR BATTERY PACK APPARATUS, SYSTEMS, AND METHODS; U.S. patent application Ser. No. 17/522,857, filed Nov. 9, 2021, entitled WIRELESS BURIED PIPE AND CABLE LOCATING SYSTEMS; U.S. patent application Ser. No. 17/523,857, filed Nov. 10, 2021, entitled SONDE DEVICES INCLUDING A SECTIONAL FERRITE CORE STRUCTURE; U.S. Pat. No. 11,175,427, issued Nov. 16, 2021, entitled BURIED UTILITY LOCATING SYSTEMS WITH OPTIMIZED WIRELESS DATA COMMUNICATION; U.S. patent application Ser. No. 17/531,533, filed Nov. 19, 2021, entitled INPUT MULTIPLEXED SIGNAL PROCESSING APPARATUS AND METHODS; U.S. patent application Ser. No. 17/540,239, filed Dec. 1, 2021, entitled DUAL SENSED LOCATING SYSTEMS AND METHODS; U.S. patent application Ser. No. 17/541,057, filed Dec. 2, 2021, entitled COLOR-INDEPENDENT MARKER DEVICE APPARATUS, SYSTEMS, AND METHODS; U.S. patent application Ser. No. 17/540,231, filed Dec. 2, 2021, entitled AUTO-TUNING CIRCUIT APPARATUS AND METHODS; U.S. Pat. No. 11,193,767, issued Dec. 7, 2021, entitled SMART PAINT STICK DEVICES AND METHODS; U.S. Pat. No. 11,199,521, issued Dec. 14, 2021, entitled RESILIENTLY DEFORMABLE MAGNETIC FIELD CORE APPARATUS AND APPLICATIONS; U.S. Pat. No. 11,204,246, issued Dec. 21, 2021, entitled DUAL SENSED LOCATING SYSTEMS AND METHODS; U.S. Provisional Patent Application 63/293,828, filed Dec. 26, 2021, entitled MODULAR BATTERY SYSTEMS INCLUDING BATTERY INTERFACE APPARATUS; U.S. patent application Ser. No. 17/563,049, filed Dec. 28, 2021, entitled SONDE DEVICES WITH A SECTIONAL FERRITE CORE; U.S. Provisional Patent Application 63/306,088, filed Feb. 2, 2022, entitled UTILITY LOCATING SYSTEMS AND METHODS WITH FILTER TUNING FOR POWER GRID FLUCTUATIONS; U.S. patent application Ser. No. 17/687,538, filed Mar. 4, 2022, entitled ANTENNAS, MULTI-ANTENNA APPARATUS, AND ANTENNA HOUSINGS; U.S. patent application Ser. No. 17/694,640, filed Mar. 14, 2022, entitled UTILITY LOCATORS WITH RETRACTABLE SUPPORT STRUCTURES AND APPLICATIONS THEREOF; U.S. patent application Ser. No. 17/694,656, filed Mar. 14, 2022, entitled ELECTROMAGNETIC MARKER DEVICES FOR BURIED OR HIDDEN USE; U.S. Pat. No. 11,280,934, issued Mar. 22, 2022, entitled ELECTROMAGNETIC MARKER DEVICES FOR BURIED OR HIDDEN USE; U.S. Pat. No. 11,300,597, issued Apr. 12, 2022, entitled SYSTEMS AND METHODS FOR LOCATING AND/OR MAPPING BURIED UTILITIES USING VEHICLE-MOUNTED LOCATING DEVICES; U.S. Pat. No. 11,300,700, issued Apr. 12, 2022, entitled SYSTEMS AND METHODS OF USING A SONDE DEVICE WITH A SECTIONAL FERRITE CORE STRUCTURE; U.S. Pat. No. 11,300,701, issued Apr. 12, 2022, entitled UTILITY LOCATORS WITH RETRACTABLE SUPPORT STRUCTURES; U.S. patent application Ser. No. 17/728,949, filed Apr. 25, 2022, entitled BURIED UTILITY LOCATOR GROUND TRACKING APPARATUS, SYSTEMS, AND METHODS; U.S. patent application Ser. No. 17/731,579, filed Apr. 28, 2022, entitled BURIED UTILITY MARKER DEVICES, SYSTEMS, AND METHODS; U.S. Pat. No. 11,333,786, issued May 17, 2022, entitled BURIED UTILITY MARKER DEVICES, SYSTEMS, AND METHODS; U.S. patent application Ser. No. 17/833,799, filed Jun. 6, 2022, entitled TRACKED DISTANCE MEASURING DEVICES, SYSTEMS, AND METHODS; U.S. patent application Ser. No. 17/845,290, filed Jun. 21, 2022, entitled DAYLIGHT VISIBLE AND MULTI-SPECTRAL LASER RANGEFINDERS AND ASSOCIATED SYSTEMS AND METHODS AND UTILITY LOCATOR DEVICES; U.S. Pat. No. 11,366,245, issued Jun. 21, 2022, entitled BURIED UTILITY LOCATOR GROUND TRACKING APPARATUS, SYSTEMS, AND METHODS; U.S. Pat. No. 11,397,274, issued Jul. 26, 2022, entitled TRACKED DISTANCE MEASURING DEVICES, SYSTEMS, AND METHODS; and U.S. Pat. No. 11,428,814, filed Aug. 30, 2022, entitled OPTICAL GROUND TRACKING APPARATUS, SYSTEMS, AND METHODS FOR USE WITH BURIED UTILITY LOCATORS. The content of each of the above-described patents and applications is incorporated by reference herein in its entirety. The above applications may be collectively denoted herein as the "co-assigned applications" or "incorporated applications."

The following exemplary embodiments are provided for the purpose of illustrating examples of various aspects, details, and functions of the present disclosure; however, the described embodiments are not intended to be in any way limiting. It will be apparent to one of ordinary skill in the art that various aspects may be implemented in other embodiments within the spirit and scope of the present disclosure. As used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

Various additional aspects, features, and functionality are further described below in conjunction with the appended Drawings.

Terminology

As used herein, the term "GNSS" (global navigation satellite system) refers to any satellite navigation systems including, but not limited to, global positioning system (GPS), global navigation satellite system (GLONASS), BeiDou (BDS), Quasi-Zenith Satellite Systems (QZSS), and Galileo. The GNSS devices, systems, and methods described herein may operate on both the lower L-band and upper-L band that may include the L1, L2, and L5 bands. The GNSS devices and methods described herein may further include precise point positioning real time kinematics (PPP-RTK), state space representation (SSR), real-time kinematics (RTK), and/or other like corrections or "correction data." In various methods, such correction data may include clock or timing corrections which may be parsed from the correction data.

Such correction data may be communicated from one or more "reference elements" that may be or include reference stations, base stations, virtual reference stations (VRS), and/or other network devices for communicating correction data.

Some GNSS antennas of the present disclosure may have or include an antenna array having a known "spatial relationship(s)" referring to a measure of distance and direction and/or other mapping of known spacing between the individual antennas of the array.

"Inertial navigation system" or "INS" sensors may refer to, but should not be limited to, one or more accelerometers, gyroscopes, compass/magnetometers, altimeters, inertial measurement units (IMU), ground tracking apparatuses, and/or other sensors or apparatus for determining motion/rotation. In some embodiments where the positioning device is employed in a utility locator device or otherwise included in a system that includes information relating to magnetic signal(s) from utility lines which may be sensed via a utility locator device, the information relating to magnetic signal(s) may be included in the inertial data. For instance, assuming that the utility lines are generally stationary, the associated information relating to magnetic signal(s) from one or more utility lines may be used to correct for drift in inertial data gathered by various INS sensors. Further, the term "INS data" as used herein may include information not traditionally included in an INS such as the information relating to magnetic signal(s) emitted by utility line(s) and sensed by a utility locator device. It should be noted that INS data may be or include data regarding orientation, pose, movements, and/or other inertial data. In some such embodiments the INS may be one or more accelerometer. In further embodiments, an INS may be one or more accelerometers and compass sensors. In yet further embodiments, an INS 1260 may be or include an array of different sensors and mechanisms to determine orientation, pose, movements, and/or other inertial data (e.g., gyroscopic sensors, accelerometers, compass sensors, altimeters, LiDAR, ground tracking mechanism, cameras, ground-penetrating radar (GPR), radar, and the like).

The "utility locator devices" of the present disclosure may, for instance, be carried by a user traversing an area to measure magnetic signals in order to determine the positions of and map utility lines which may generally be buried underground. In some uses, a "utility locating transmitter" may be used to couple current onto one or more utility lines for the purpose of generating the magnetic signals sensed by utility locator devices in order to determine the positions and map utility lines. Additional disclosure regarding utility locator devices and utility locating transmitters may be found in the incorporated patents and patent applications herein. In some embodiments, a "utility locator devices" of the present disclosure may be a ground penetrating radar (GPR) that a user may traverse an area with to determine the presents or absence of buried utility lines or other objects via radar. In yet further embodiments, a "utility locator devices" of the present disclosure may measure magnetic signals as well as include GPR in order to determine and/or map the positions of and map utility lines which may generally be buried underground.

The term "positioning device" may refer to any GNSS based device that may be configured to determine positions via GNSS. Some "positioning devices" may be "GNSS and INS based positioning devices" having at least one GNSS antenna/receiver and INS to execute methods relating to find geolocation solutions disclosed herein. In other embodiments, "positioning devices" may be "multi-antenna positioning devices" having a plurality of GNSS antennas/receivers in a known configuration with a known spatial relationship. In some embodiments, a positioning device may be both a GNSS and INS based positioning device and a multi-antenna positioning device. Further, the term "GNSS based positioning device" may refer to any device embodiments described herein for determining geolocation solutions. There are a variety of devices that may be or include GNSS based positioning devices of the present disclosure such as, but not limited to, the disclosed utility locator devices and the utility locating transmitters. The GNSS based positioning devices in keeping with the present disclosure may, for instance, further be employed in a variety of utility locating and other devices/systems not explicitly described herein. Likewise, positioning device embodiments of the present disclosure could be employed in self-driving vehicles, vehicle-mounted locating devices, hand-held GPS or GNSS, and so on.

The term "geolocation" may refer to a physical position in the world frame. Such a geolocation or geolocations may further include information regarding pose, orientation, and compass direction toward north, heading, and the like. In some methods and devices, the geolocations may be estimated via GNSS and be referred to herein as "GNSS based" geolocations. Likewise, some methods and devices may include geolocation estimations determined by INS referred to herein as "INS based" geolocations.

Description of some methods and devices herein may further include the use of the terms "first geolocation(s)" and "second geolocation(s)." It should be noted that in some embodiments the distinction between "first geolocation(s)" and "second geolocation(s)" as used herein may describe a physical difference in position/geolocation. In other embodiments, the distinction between "first geolocation(s)" and "second geolocation(s)" herein may describe measurements that occur at different epochs in time where no physical difference in position/geolocation occurs. In some embodiments, the distinction between "first geolocation(s)" and "second geolocation(s)" may describe both a difference in position/geolocation as well as measurements that occur at different epochs in time. In yet further embodiments, the distinction between "first geolocation(s)" and "second geolocation(s)" used herein may describe measurements between different GNSS antennas in embodiments having an array of GNSS antennas (e.g., the multi-antenna positioning devices of the present disclosure).

Example Embodiments

Figure 1B:
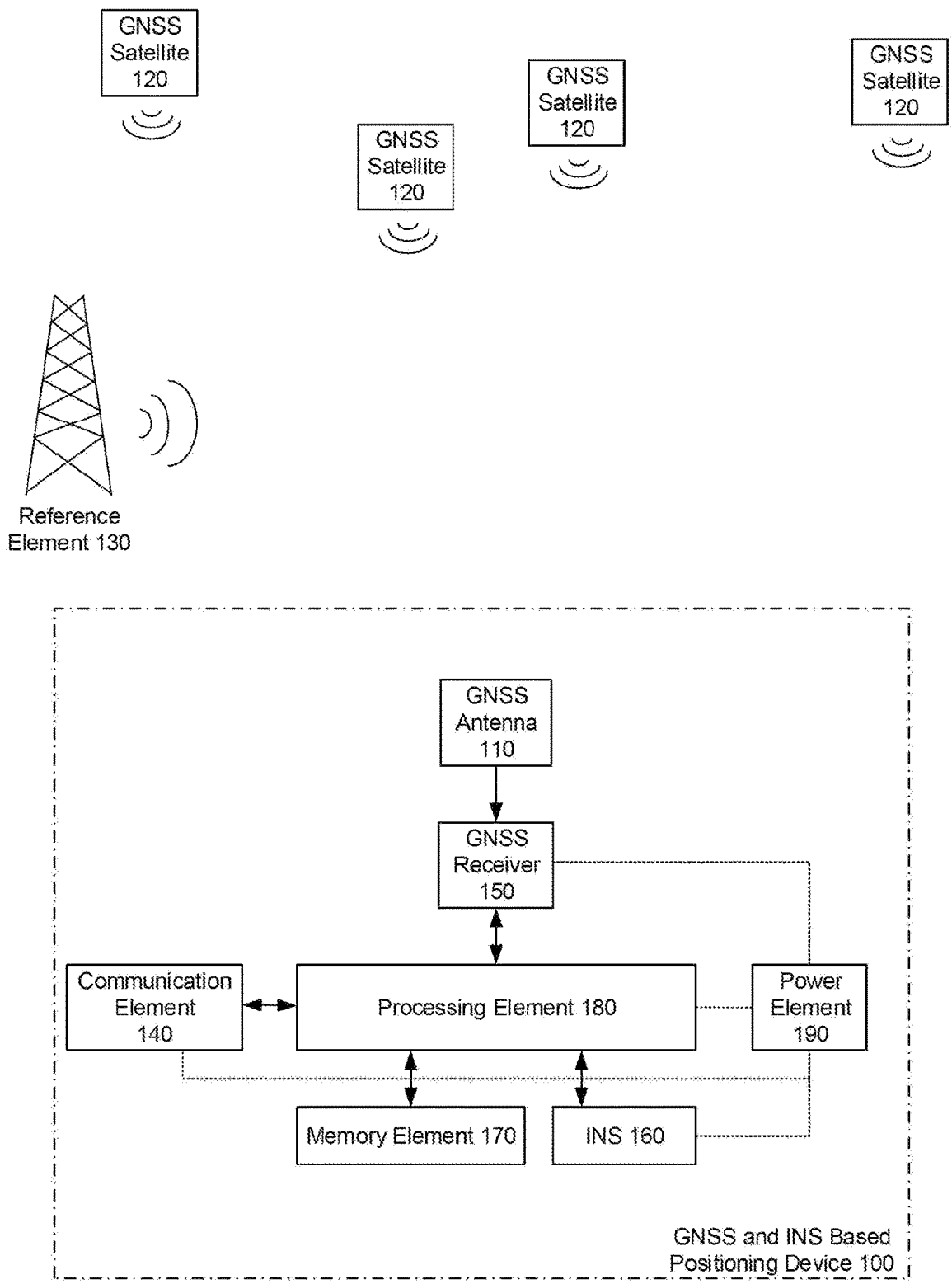
FIG. 1B is a diagram of the GNSS and INS based positioning device from FIG. 1A.

As shown in the FIGS. 1A and 1B, a GNSS and INS based positioning device 100 in keeping with the present disclosure is illustrated. The GNSS and INS based positioning device 100 may include at least one GNSS antenna such as the GNSS antenna 110. The GNSS antenna 110 may receive navigation signals from a plurality of GNSS satellites 120. Likewise, the GNSS and INS based positioning device 100 may receive correction data (e.g., SSR, PPP-RTK, RTK, and/or the like) from one or more reference elements 130 (FIG. 1A) via a communication element 140 (FIG. 1B). The reference element(s) 130 may be or include one or more reference elements (e.g., virtual reference stations (VRS), reference satellites, or the like) for communicating correction data. The correction data from reference element(s) 130 (FIG. 1A) may include time corrections that may be parsed from the correction data.

Further illustrated in FIG. 1B, the GNSS and INS based positioning device 100 may include one or more GNSS receiver elements, such as a GNSS receiver 150, which may be coupled to a corresponding GNSS antenna 110 to receive output navigation signals from GNSS antenna 110 and correction data from the communication element 140 and further generate a geolocation estimate associated with the GNSS antenna 110. The GNSS receiver 150 may, for example, be configured to receive navigation signals from one or more navigation satellite constellations (e.g., GPS, GLONASS, BDS, QZSS, Galileo, and/or other satellite navigation systems) which may operate on one or more bands (e.g., the lower L-band, upper-L band, or the like).

The GNSS and INS based positioning device 100 may further include an INS 160 that includes one or more inertial sensors (e.g., gyroscopic sensors, accelerometers, compass sensors, altimeters, LiDAR, ground tracking mechanism, cameras, ground-penetrating radar (GPR), radar, and the like) or arrays of sensors to estimate movements and orientation associated with the GNSS antenna 110 from a first geolocation 102 (FIG. 1A) to a second geolocation 104 (FIG. 1A). In some embodiments where the GNSS and INS based positioning device 100 is employed in a utility locator device or otherwise included in a system that includes information relating to magnetic signal(s) from one or more utility lines sensed via a utility locator device (e.g., the utility locator device 340 of FIGS. 3A and 3B, the utility locator device 640 of FIGS. 6A and 6B, and the utility locator device 840 of FIGS. 8A and 8B), the information relating to magnetic signals may be included in the inertial data. For instance, assuming that the utility lines are generally stationary, the associated information relating to magnetic signals may be used to correct for drift in inertial data gathered by various INS sensors. For instance, such INS data may be or include data regarding orientation, pose, movements, and/or other inertial data that may be generated via an accelerometer, an accelerometer and compass, and or an array of sensors and mechanisms including but not limited to gyroscopic sensors, accelerometers, compass sensors, altimeters, LiDAR, ground tracking mechanism, cameras, ground-penetrating radar (GPR), radar, and the like.

Referring to FIG. 1A, it should be noted that though the first geolocation 102 and second geolocation 104 are illustrated as having a physical difference in position/geolocation. In other embodiments in keeping with the present disclosure the "first geolocation(s)" and "second geolocation(s)" may describe measurements that occur at different epochs in time where physical difference in position/geolocation may or may not occur. Likewise, in some embodiments, the distinction between "first geolocation(s)" and "second geolocation(s)" may describe measurements between different GNSS antennas in embodiments having an array of GNSS antennas (e.g., the GNSS and INS based positioning device embodiment 200 of FIGS. 2A and 2B, utility locator device 340, multi-antenna positioning device 500 of FIGS. 5A and 5B, the utility locator device 640 or utility locating transmitter 660 of FIGS. 6A and 6B, or the positioning device 800 or utility locator device 840 or utility locating transmitter 860 of FIGS. 8A and 8B).

Referring to FIG. 1B, the GNSS and INS based positioning device 100 may include a memory element 170 having one or more non-transitory memories to store instructions relating to methods of the present disclosure (e.g., method 400 of FIG. 4) in determining geolocation solutions as well as storing the resulting geolocation solutions. A processing element 180 having one or more processors may operatively be coupled to the memory element 170, GNSS receiver 150, and INS 160 that may be programmed to execute methods relating to generating geolocation solutions (e.g., method 400 of FIG. 4) by adjusting time corrections associated with navigation signals to best align the GNSS second geolocation estimates with corresponding INS second geolocation estimates and/or other methods disclosed herein. A power element 190 (e.g., one or more batteries or the like) may be included for supplying of electrical power to the various powered elements of the GNSS and INS based positioning device 100. In other embodiments, such processing may also or alternatively occur in a separate processing element in one or more external devices (e.g., a computer, tablet, smart phone, remote cloud computer, utility locator device, or the like) in real-time, near real-time, or in post processing.

Figure 2A:
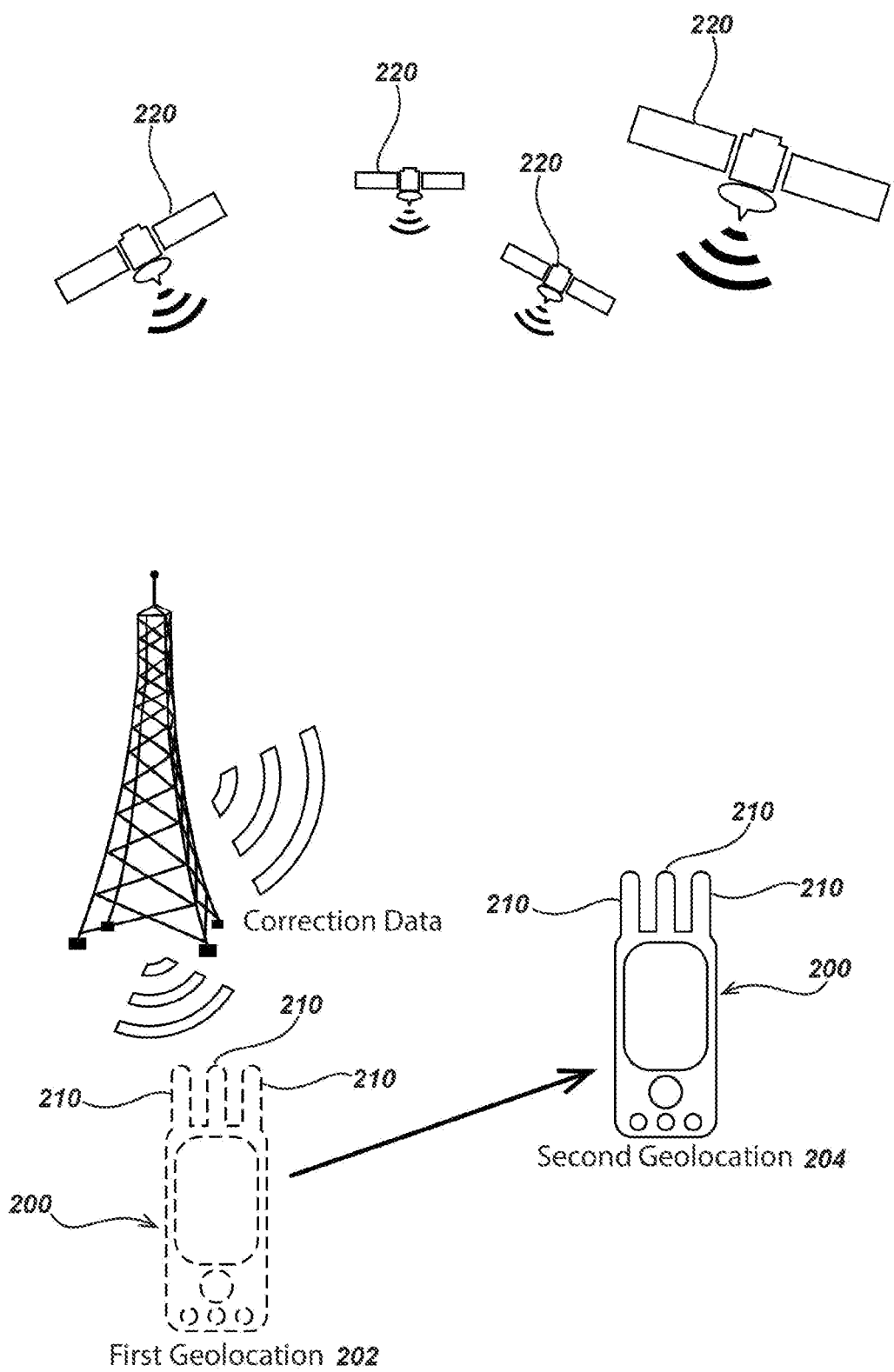
FIG. 2A is a drawing of another GNSS and INS based positioning device having a plurality of GNSS antennas.
Figure 2B:
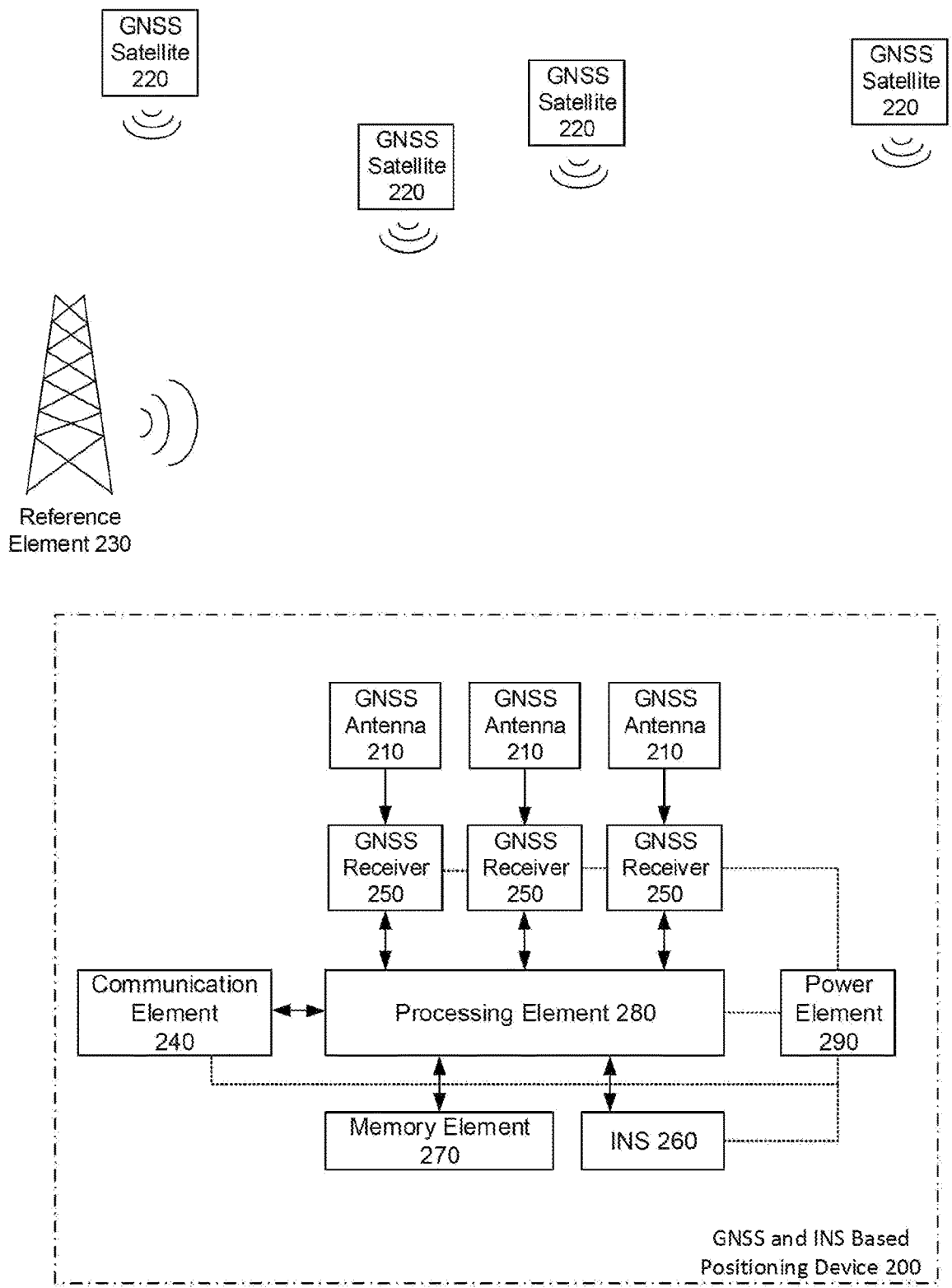
FIG. 2B is a diagram of the GNSS and INS based positioning device from FIG. 2A.

As shown in the FIGS. 2A and 2B, another GNSS and INS based positioning device embodiment 200 in keeping with the present disclosure is illustrated. The GNSS and INS based positioning device 200 may include a plurality of GNSS antennas such as the three GNSS antennas 210 illustrated in FIGS. 2A and 2B. In other embodiments, other numbers of GNSS antennas may be included. The GNSS antennas 210 may receive navigation signals from a plurality of GNSS satellites 220. Likewise, the GNSS and INS based positioning device 200 may receive correction data (e.g., SSR, PPP-RTK, RTK, or the like) from one or more reference elements 230 (e.g., reference station, VRS, reference satellite, or the like) via a communication element 240 (FIG. 2B). The correction data from reference element(s) 230 may include time corrections that may be parsed from the correction data.

Further illustrated in FIG. 2B, the GNSS and INS based positioning device 200 may include one or more GNSS receiver elements, such as GNSS receivers 250, which each may be coupled to one of the GNSS antennas 210 to each receive output navigation signals from GNSS antennas 210 and correction data from the communication element(s) 240 and further generate GNSS geolocation estimates associated with each one of the GNSS antennas 210. The GNSS receivers 250 may, for example, be configured to receive navigation signals from one or more navigation satellite constellations (e.g., GPS, GLONASS, BDS, QZSS, Galileo, and/or other satellite navigation systems) which may operate on one or more bands (e.g., the lower L-band, upper-L band, or the like).

The GNSS and INS based positioning device 200 may further include an INS 260 that includes one or more inertial sensors (e.g., gyroscopic sensors, accelerometers, compass sensors, altimeters, LiDAR, ground tracking mechanism, cameras, ground-penetrating radar (GPR), radar, and the like) or arrays of sensors to estimate movements and orientation associated with each of the GNSS antennas 210 from a first geolocation 202 (FIG. 2A) to a second geolocation 204 (FIG. 2A). For instance, such INS data may be or include data regarding orientation, pose, movements, and/or other inertial data that may be generated via an accelerometer, an accelerometer and compass, and or an array of sensors and mechanisms including but not limited to gyroscopic sensors, accelerometers, compass sensors, altimeters, LiDAR, ground tracking mechanism, cameras, ground-penetrating radar (GPR), radar, and the like. In some embodiments where the GNSS and INS based positioning device 200 is employed in a utility locator device or otherwise included in a system that includes information relating to magnetic signal(s) from utility lines sensed via a utility locator device (e.g., the utility locator device 340 of FIGS. 3A and 3B, the utility locator device 640 of FIGS. 6A and 6B, and the utility locator device 840 of FIGS. 8A and 8B), the information pertaining to magnetic signal(s) may be included in the inertial data. For instance, assuming that the utility lines are generally stationary, the associated information relating to magnetic signals may be used to correct for drift in inertial data gathered by various INS sensors.

Referring to FIG. 2A, it should be noted that though the first geolocation 202 and second geolocation 204 are illustrated as having a physical difference in position/geolocation. In other embodiments in keeping with the present disclosure, the "first geolocation(s)" and "second geolocation(s)" may describe measurements that occur at different epochs in time where physical difference in position/geolocation may or may not occur. Likewise, in some embodiments, the distinction between "first geolocation(s)" and "second geolocation(s)" used herein may describe measurements between different GNSS antennas in embodiments having an array of GNSS antennas such as the different GNSS antennas 210 in the GNSS and INS based positioning device embodiment 200 of FIGS. 2A and 2B.

Referring to FIG. 2B, the GNSS and INS based positioning device 200 may include a memory element 270 having one or more non-transitory memories to store instructions relating to methods of the present disclosure (e.g., method 400 of FIG. 4) in determining geolocation solutions as well as storing the resulting geolocation solutions. A processing element 280 having one or more processors may operatively be coupled to the memory element 270, GNSS receiver(s) 250, and INS 260 that may be programmed to execute methods relating to generating geolocation solutions (e.g., method 400 of FIG. 4) by adjusting time corrections associated with navigation signals to best align the GNSS second geolocation estimates with corresponding INS second geolocation estimates. In other embodiments, such processing may also or alternatively occur in a separate processing element in one or more external devices (e.g., a computer, tablet, smart phone, remote cloud computer, utility locator device, or the like) in real-time, near real-time, or in post processing. A power element 290 (e.g., one or more batteries or the like) may be included for supplying of electrical power to the various powered elements of the GNSS and INS based positioning device 200.

Figure 3A:
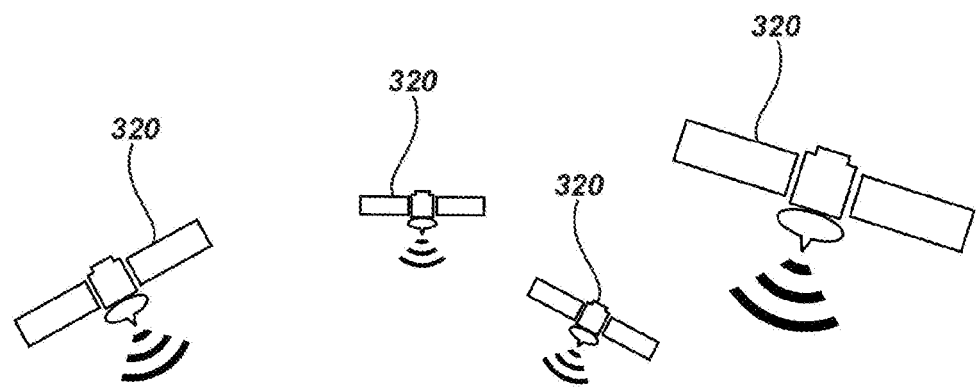
FIG. 3A is a drawing of a GNSS and INS based positioning device disposed in a utility locator device.
Figure 3A:
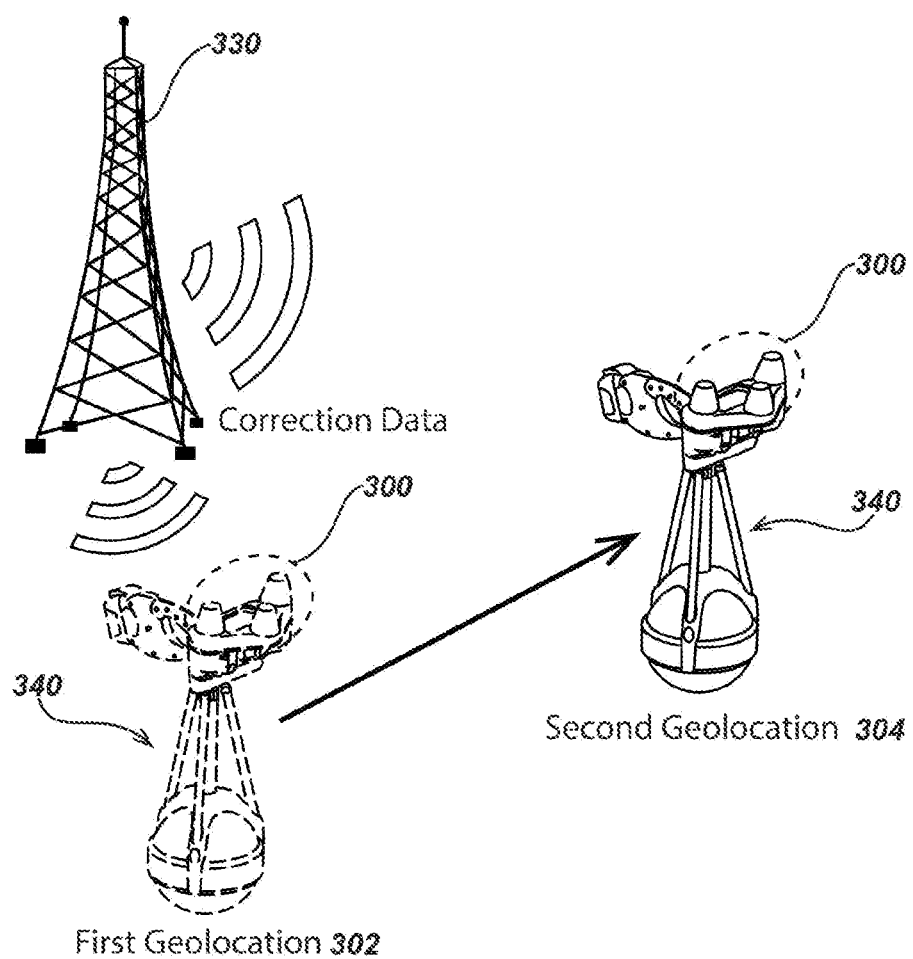
Figure 3B:
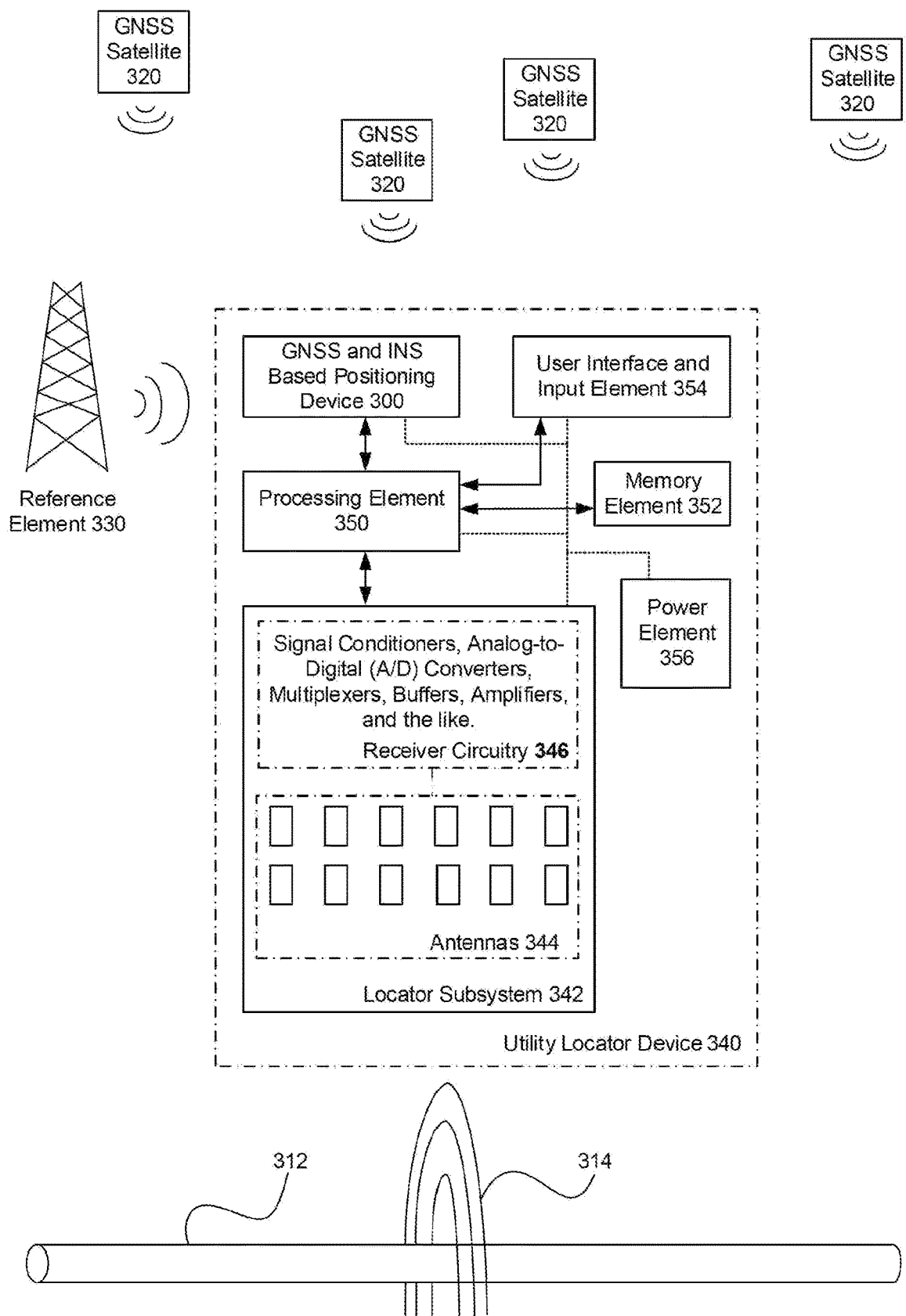
FIG. 3B is a diagram of the utility locator device from FIG. 3A.

Turning to FIGS. 3A and 3B, a GNSS and INS based positioning device 300, which may be or share aspects with the GNSS and INS based positioning device 200 of FIGS. 2A and 2B or with the GNSS and INS based positioning device 100 of FIGS. 1A and 1B as a single GNSS antenna embodiment, may be employed in a utility locator device 340. Likewise, other GNSS and INS based positioning device embodiments having other numbers of GNSS antennas/receivers may be employed in utility locator devices in keeping with the present disclosure. The GNSS and INS based positioning device 300 may be configured to receive navigation signals from a plurality of GNSS satellites 320 and correction data from one or more reference elements 330 and, via the method 400 of FIG. 4, determine precise geolocation solutions. The utility locator device 340 may further be configured to determine the location of utility lines which may be buried underground, such as the utility line 312. The utility locator device 340 and associated methods for locating and mapping utility lines may be or share aspects with UTILITY LOCATING SYSTEMS, DEVICES, AND METHODS USING RADIO BROADCAST SIGNALS, U.S. patent application Ser. No. 16/786,935, filed Feb. 10, 2020, entitled SYSTEMS AND METHODS FOR UTILITY LOCATING IN A MULTI-UTILITY ENVIRONMENT, U.S. Pat. No. 10,564,309, issued Feb. 18, 2020, entitled SYSTEMS AND METHODS FOR UTILITY LOCATING IN A MULTI-UTILITY ENVIRONMENT, U.S. patent application Ser. No. 16/882,719, filed May 25, 2020, entitled UTILITY LOCATING SYSTEMS, DEVICES, AND METHODS USING RADIO BROADCAST SIGNALS, U.S. Utility Pat. No. 10,670,766, issued Jun. 2, 2020, entitled UTILITY LOCATING SYSTEMS, DEVICES, AND METHODS USING RADIO BROADCAST SIGNALS; U.S. patent application Ser. No. 17/235,507, filed Apr. 20, 2021, entitled UTILITY LOCATING DEVICES EMPLOYING MULTIPLE SPACED APART GNSS; and U.S. Pat. No. 11,092,712, issued Aug. 17, 2021, entitled UTILITY LOCATING SYSTEMS, DEVICES, AND METHODS USING RADIO BROADCAST SIGNALS or various other incorporated patents and applications. The precise geolocation solutions generated via the GNSS and INS based positioning device 300 may be correlated with utility line locating information to produce precise utility line geolocations as well as maps containing the precise utility line geolocations. In some embodiments, a utility locator device such as the utility locator device 340 may instead be a GPR or include GPR in the magnetic utility locator device disclosed or referenced herein to determine and/or map utility line positions that may be buried in the ground.

Turning to FIG. 3B, the utility locator device 340, including the GNSS and INS based positioning device 300 of the present disclosure, may further include a locator subsystem 342 having one or more antennas 344 and associated receiver circuitry 346 to receive magnetic signals 314 emitted by the utility line(s) 312 in order to determine positions of one or more utility lines such as utility line 312. The utility locator device antennas 344 may typically be in the form of antenna coils having a wide bandwidth (e.g., from $10s$ of Hz to 500 kHz, or greater). Electronic circuit elements, such as amplifiers, buffers, impedance matching circuits, and/or filters or the like may be coupled to the antennas 344 to condition and amplify the output of antennas 342. Example antennas and associated locator elements and configurations that may be used in various embodiments are described in the incorporated applications.

The receiver circuitry 346, including additional analog and/or digital circuit elements such as filters, signal conditioners, analog-to-digital (A/D) converters, multiplexers, and the like, may condition the output from antennas 344. The output of the receiver circuitry 346 may then be provided to a processing element 350, which may be coupled to a memory element 352.

Figure 4:
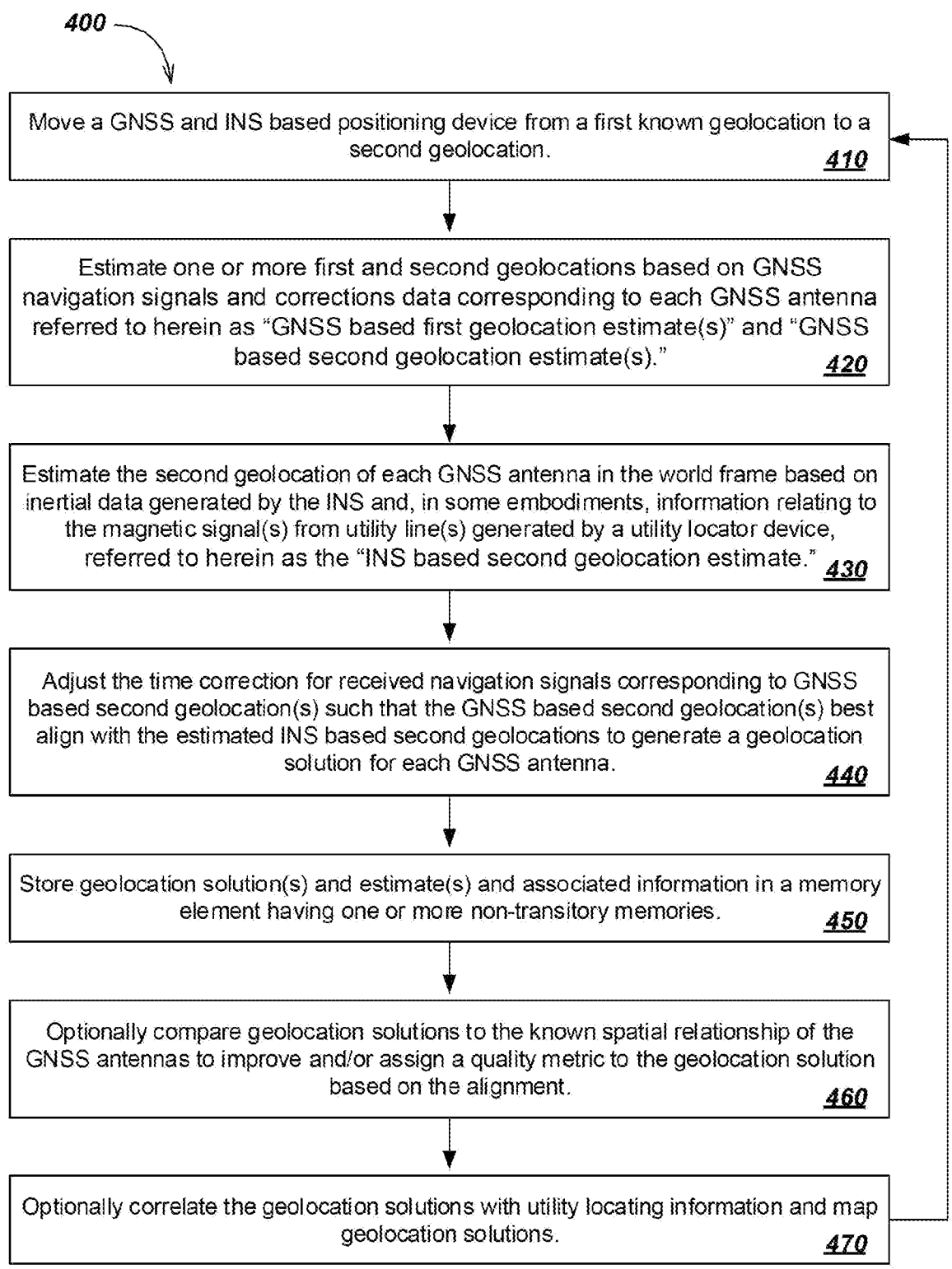
FIG. 4 is a method for determining geolocation solutions via a GNSS and INS based positioning device of the present disclosure.

The utility locator device 340 may further include a user interface and input element 354 to receive input commands from a user and further communicate data relating to the positions of utility lines, such as the utility line 312, geolocation solutions/estimates such as those generated by method 400 of FIG. 4, and/or other mapping information to a user. The processing element 350, including one or more processors, may be operatively coupled to the memory element 352, including one or more non-transitory memories, and the GNSS receiver(s) and INS included in the GNSS and INS based positioning device 300. The processing element 350 may be programmed to locate and map utility lines from received magnetic signals. The processing element 350 may further be programmed to execute methods relating to adjusting time corrections associated with navigation signals to best align GNSS second geolocation estimates with INS second geolocation estimates (e.g., the method 400 of FIG. 4) and further correlating and mapping resulting geolocation solutions with utility line positions and/or other methods disclosed herein. The utility locator device embodiments may further include a power element 356 for portioning of electrical power to the various elements requiring electrical power for functionality. In various utility locator device embodiments in keeping with the present disclosure, the memory element, processing element, and/or power element may be shared by the GNSS and INS based positioning device and utility locator device.

Referring to FIG. 3A, it should be noted that though the first geolocation 302 and second geolocation 304 are illustrated as having a physical difference in position/geolocation. In other embodiments in keeping with the present disclosure the "first geolocation(s)" and "second geolocation(s)" may describe measurements that occur at different epochs in time where physical difference in position/geolocation may or may not occur. Likewise, in some embodiments, the distinction between "first geolocation(s)" and "second geolocation(s)" may describe measurements between different GNSS antennas in embodiments having an array of GNSS antennas.

Turning to FIG. 4, a method 400 for determining geolocation via a GNSS and INS based positioning device of the present disclosure (e.g., GNSS and INS based positioning device 100 of FIGS. 1A and 1B, GNSS and INS based positioning device 200 of FIGS. 2A and 2B, and/or the utility locator device 340 of FIGS. 3A and 3B) is described. The method 400 may include a step 410 moving a GNSS and INS based positioning device from a first known geolocation (e.g. first geolocation 102 of FIG. 1A or first geolocation 202 of FIG. 2A) to a second geolocation (e.g. second geolocation 104 of FIG. 1A or second geolocation 204 of FIG. 2A). In a step 420, the method 400 may include estimating one or more first and second geolocations based on GNSS navigation signals and corrections data corresponding to each GNSS antenna. Such geolocation estimates based on GNSS navigation signals and correction data at each GNSS antenna may be referred to herein as "GNSS based first geolocation estimate(s)" and "GNSS based second geolocation estimate(s)." It should be noted that the correction data may include time correction data parsed from the correction data (e.g., SSR, PPP-RTK, RTK, or the like). In another step 430, the method 400 may include estimating the second geolocation of each GNSS antenna in the world frame based on inertial data which may be generated by the INS. Such geolocation estimates based on inertial data from the INS element may be referred to herein as the "INS based geolocation estimate" or "INS based second geolocation estimate." For instance, such INS data may be or include data regarding orientation, pose, movements, and/or other inertial data that may be generated via an accelerometer, an accelerometer and compass, and or an array of sensors and mechanisms including but not limited to gyroscopic sensors, accelerometers, compass sensors, altimeters, LiDAR, ground tracking mechanism, cameras, ground-penetrating radar (GPR), radar, and the like. In method embodiments, such as those executed via utility locator device or otherwise including information relating to magnetic signal(s) from utility lines as sensed via a utility locator device (e.g., the utility locator device 340 of FIGS. 3A and 3B, the utility locator device 640 of FIGS. 6A and 6B, and the utility locator device 840 of FIGS. 8A and 8B), the information relating to magnetic signals may be included in the inertial data. For instance, assuming that the utility lines are generally stationary, the associated information relating to magnetic signals may be used to correct for drift in inertial data gathered by various INS sensors. For instance, such INS data may be or include data regarding orientation, pose, movements, and/or other inertial data that may be generated via an accelerometer, an accelerometer and compass, and or an array of sensors and mechanisms including but not limited to gyroscopic sensors, accelerometers, compass sensors, altimeters, LiDAR, ground tracking mechanism, cameras, ground-penetrating radar (GPR), radar, and the like. In a step 440, the method 400 may include adjusting the time correction(s) for received navigation signals corresponding to GNSS based second geolocation(s) such that the GNSS based second geolocation(s) best align with the estimated INS based second geolocations to generate a geolocation solution for each GNSS antenna. In a step 450, geolocation solution(s) and estimate(s) and associated information may be stored in a memory element having one or more non-transitory memories. In embodiments having a plurality of GNSS antennas with a known spatial relationship (e.g., the GNSS and INS based positioning device 200 of FIGS. 2A and 2B or the utility locator device 340 of FIGS. 3A and 3B), an optional step 460 may include comparing geolocation solutions to the known spatial relationship of the GNSS antennas. The reliability of the geolocation solutions may be ascertained via the step 460. For instance, wherein geolocation solutions have a spatial relationship to one another that is the same or largely the same as the known spatial relationship of corresponding GNSS antennas, it may be understood that the geolocation solutions are accurate. In contrast, wherein geolocation solutions have a spatial relationship to one another that differs from the known spatial relationship of corresponding GNSS antennas, it may be understood that the geolocation solutions are inaccurate. Accordingly, the step 460 may include improving and/or assigning a quality metric to the geolocation solution based on the alignment to the known spatial relationship of corresponding GNSS antennas. In an optional step 470, the geolocation solutions may be correlated with utility locating information. This step may include mapping of utility line locations. The method 400 may optionally repeat such that the subsequent geolocation may be compared to the prior geolocation solution.

Figure 5A:
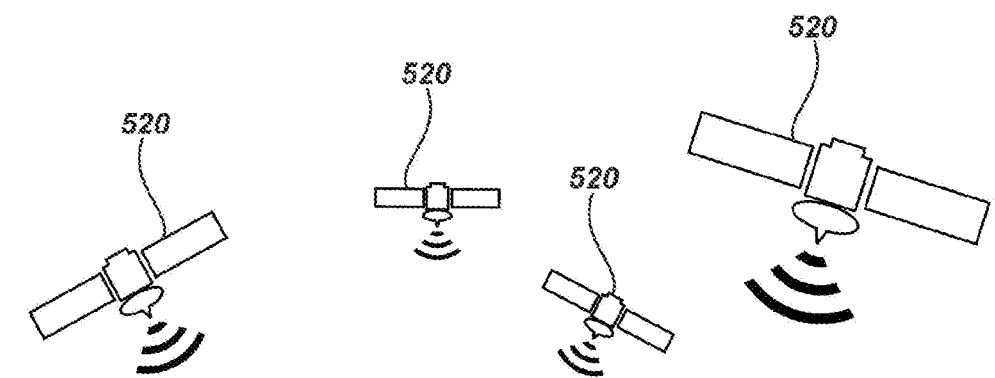
FIG. 5A is a drawing of a multi-antenna positioning device.
Figure 5A:
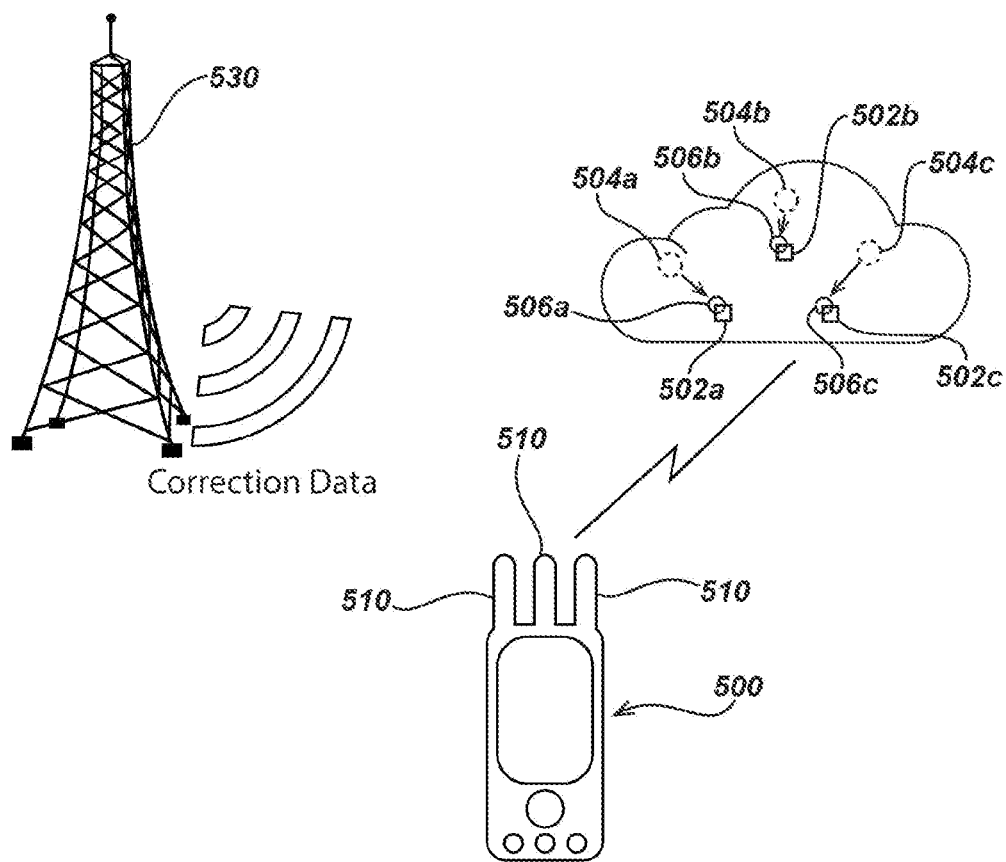
Figure 5B:
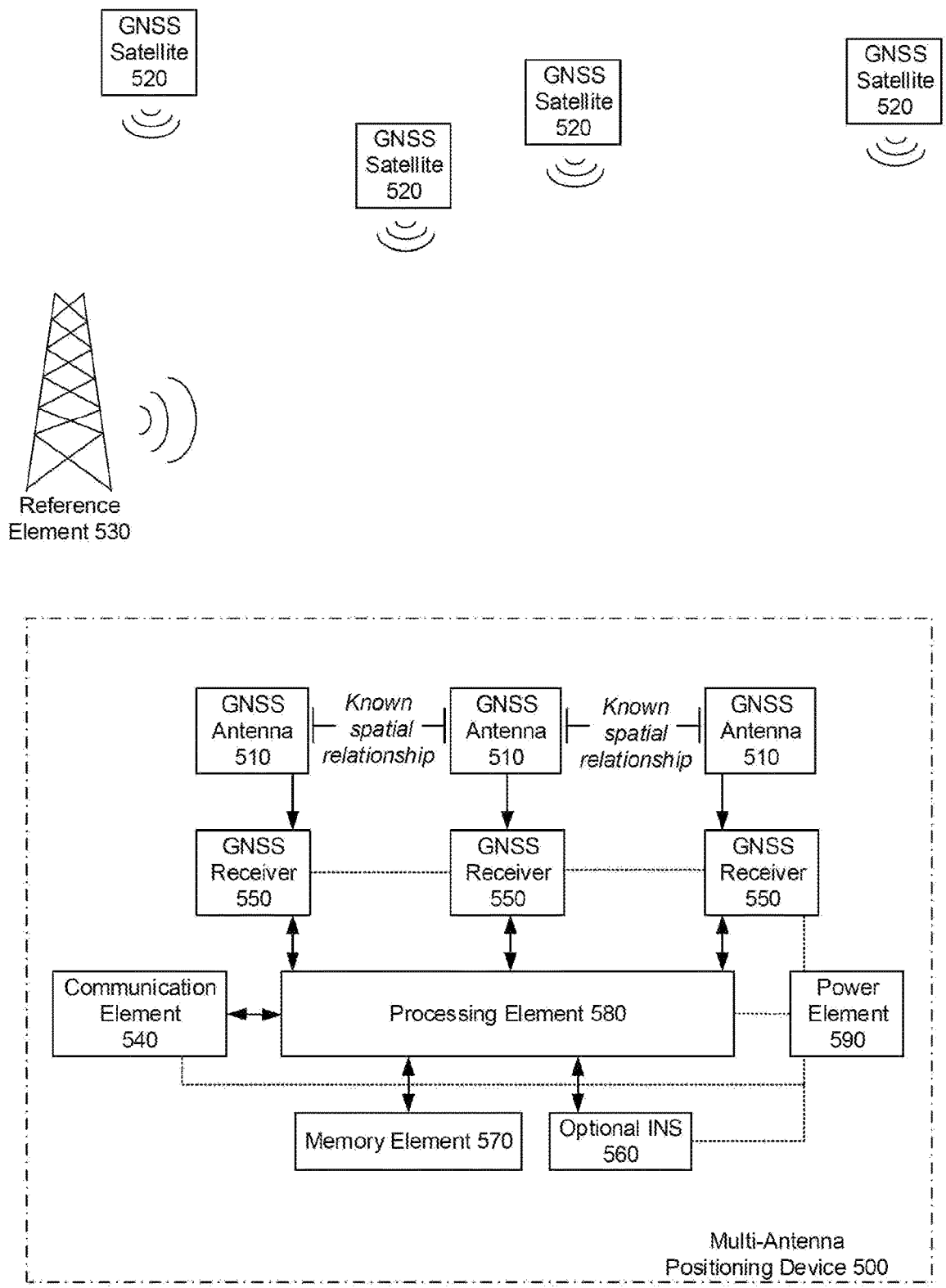
FIG. 5B is a diagram of the multi-antenna positioning device from FIG. 5A.

Turning to FIGS. 5A and 5B, a multi-antenna positioning device 500 in keeping with the present disclosure is illustrated. The multi-antenna positioning device 500 may include a plurality of GNSS antennas, such as the GNSS antennas 510, having a known spatial relationship to one another. It should be noted that though the multi-antenna positioning device embodiment 500 of FIGS. 5A and 5B shows three GNSS antennas 510. Other embodiments in keeping with the present disclosure may have a plurality of GNSS antennas in other quantities. Each of the GNSS antennas 510 may receive navigation signals from a plurality of GNSS satellites 520. Likewise, the multi-antenna positioning device 500 may receive correction data (e.g., SSR, PPP-RTK, RTK, and/or the like) from one or more reference elements 530 (e.g., reference station, VRS, reference satellite, or the like) via a communication element 540 (FIG. 5B). The correction data from reference elements 530 may include time corrections that may be parsed from the correction data.

Turning to FIG. 5B, the multi-antenna positioning device 500 may include GNSS receiver elements 550 having at least one GNSS receiver element 550 coupled at each GNSS antenna 510 to each receive output navigation signals from GNSS antennas 510 and correction data from the communication element 540 and further generate GNSS geolocation estimates associated with each GNSS antenna 510. The GNSS receiver elements 550 may, for example, be configured to receive navigation signals from one or more navigation satellite constellations (e.g., GPS, GLONASS, BDS, QZSS, Galileo, and/or other satellite navigation systems) which may operate on one or more bands (e.g., the lower L-band, upper-L band, or the like).

An optional INS 560 that includes one or more inertial sensors (e.g., gyroscopic sensors, accelerometers, compass sensors, altimeters, LiDAR, ground tracking mechanism, cameras, ground-penetrating radar (GPR), radar, and the like) or arrays of sensors may optionally be included in the multi-antenna positioning device 500. In some embodiments, the INS 560 may be or include one or more accelerometers. In other embodiments, the INS 560 may be or include one or more accelerometers and compass sensors. In yet further embodiments, the INS 560 may be or include one or more sensors and mechanisms including but not limited to gyroscopic sensors, accelerometers, compass sensors, altimeters, LiDAR, ground tracking mechanism, cameras, ground-penetrating radar (GPR), radar, and the like. In some embodiments where the positioning device is employed in a utility locator device or otherwise included in a system that includes information relating to magnetic signal(s) from utility lines which may be sensed via a utility locator device (e.g., the utility locator device 340 of FIGS. 3A and 3B, the utility locator device 640 of FIGS. 6A and 6B, and the utility locator device 840 of FIGS. 8A and 8B), the information relating to magnetic signals may be included in the inertial data. For instance, assuming that the utility lines are generally stationary, the associated information relating to magnetic signals may be used to correct for drift in inertial data gathered by various INS sensors. For instance, such INS data may be or include data regarding orientation, pose, movements, and/or other inertial data that may be generated via an accelerometer, an accelerometer and compass, and or an array of sensors and mechanisms including but not limited to gyroscopic sensors, accelerometers, compass sensors, altimeters, LiDAR, ground tracking mechanism, cameras, ground-penetrating radar (GPR), radar, and the like.

Still referring to FIG. 5B, a memory element 570, comprising one or more non-transitory memories, may be included in the multi-antenna positioning device 500 to store spatial relationship data of the array of GNSS antennas 510 and instructions related to executing the methods associated with producing geolocation solutions (e.g., the method 700 of FIG. 7) of the present disclosure as well as the resulting geolocation solutions.

One such method (e.g., the method 700 of FIG. 7) is further illustrated in FIG. 5A. The multi-antenna positioning device 500, having GNSS antennas with known spatial relationships 502*a*, 502*b*, and 502*c*, may generate a geolocation estimate associated with each GNSS antenna (e.g., geolocation estimate 504*a*, 504*b*, or 504*c* in FIG. 5A). The positioning of geolocation estimates 504*a*, 504*b*, and 504*c* may be compared against the known spatial relationships 502*a*, 502*b*, and 502*c* of associated GNSS antennas. The timing correction data parsed from correction data provided by reference element(s) 530 may be adjusted to align geolocation estimates 504*a*, 504*b*, or 504*c* with the known spatial relationships 502*a*, 502*b*, and 502*c* of associated GNSS antennas to the extent possible producing geolocation solutions 506*a*, 506*b*, and 506*c* respectively.

Returning to FIG. 5B, a processing element 580, including one or more processors, may operatively be coupled to the memory element 570 and GNSS receiver elements 550 and may be programmed to execute methods relating to generating geolocation solutions by adjusting time corrections associated with navigation signals to best align the geolocation estimates with the known spatial relationship of the GNSS antennas 510 and/or other methods disclosed herein. In other embodiments, such processing may also or alternatively occur in a separate processing element in one or more external devices (e.g., a computer, tablet, smart phone, remote cloud computer, utility locator device, or the like) in real-time, near real-time, or in post processing. A power element 590 may also be included in the multi-antenna positioning device 500 for supplying of electrical power to the various powered elements of the positioning device.

Figure 6A:
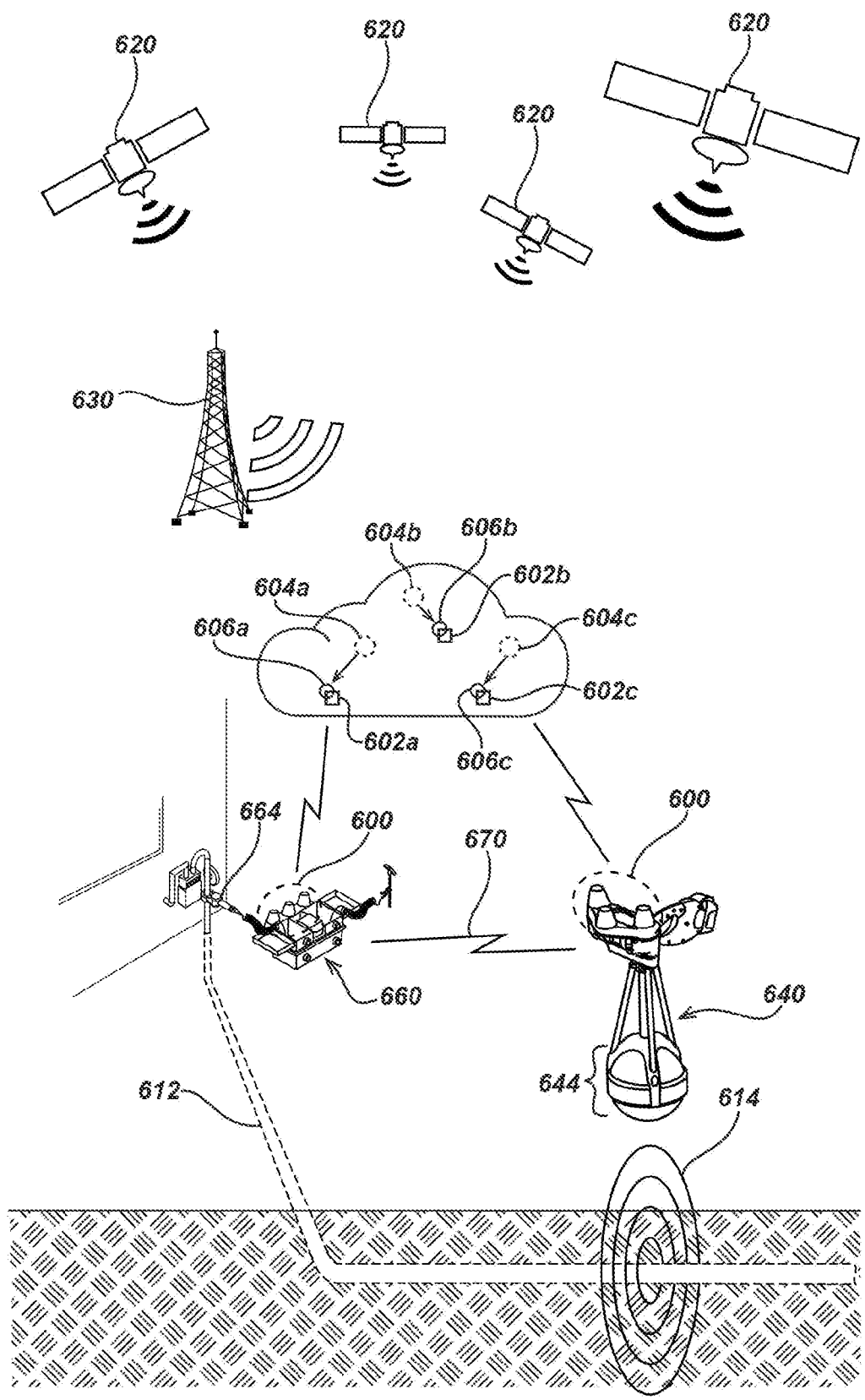
FIG. 6A is a drawing of a multi-antenna positioning device disposed in a utility locator device and utility locating transmitter.
Figure 6B:
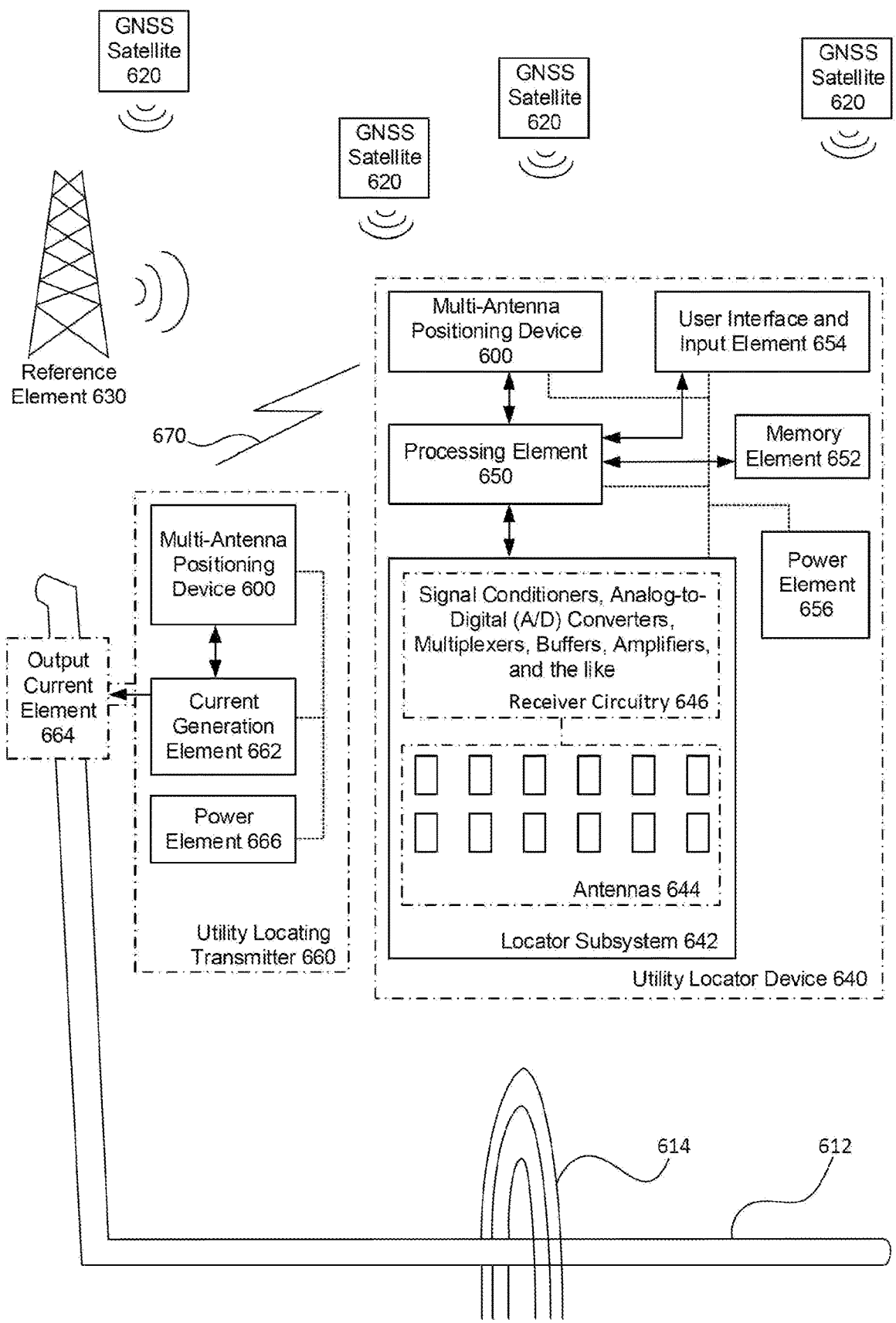
FIG. 6B is a diagram of the multi-antenna positioning device disposed in a utility locator device and utility locating transmitter from FIG. 6A.

The multi-antenna positioning devices of the present disclosure may be employed in various devices used in locating and mapping utility lines which may be buried in the ground. Turning to FIGS. 6A and 6B, a multi-antenna positioning device 600, which may be or share aspects with the multi-antenna positioning device 500 of the present disclosure, may be employed in a utility locator device 640 configured to determine the location of and map utility lines which may be buried underground, such as a utility line 612 from magnetic signals 614 emitted therefrom. The magnetic signals 614 may be coupled to the utility line 612 via a utility locating transmitter 660. In some embodiments, a utility locator device such as the utility locator device 640 may instead be a ground penetrating radar (GPR) or include GPR in the magnetic utility locator device disclosed or referenced herein to determine and/or map utility line positions that may be buried in the ground.

The utility locating transmitter 660 may be or share aspects with the transmitters or like devices for coupling current onto one or more utility lines described in U.S. Pat. No. 10,088,592, issued Oct. 2, 2018, entitled INDUCTIVE CLAMP DEVICES, SYSTEMS, AND METHODS; U.S. Pat. No. 10,7754,053, issued Aug. 25, 2020, entitled UTILITY LOCATOR TRANSMITTER DEVICES, SYSTEMS, AND METHODS WITH DOCKABLE APPARATUS; U.S. patent application Ser. No. 17/013,831, filed Sep. 7, 2020, entitled MULTIFUNCTION BURIED UTILITY LOCATING CLIPS; and U.S. patent application Ser. No. 17/235,507, filed Apr. 20, 2021, entitled UTILITY LOCATING DEVICES EMPLOYING MULTIPLE SPACED APART GNSS or various other incorporated patents and applications. As shown in FIG. 6B, the utility locating transmitter 660 may include a current generation element 662 for generating electromagnetic current at one or more known frequencies for detection by a utility locator device such as the utility locator device 640. The current generation element 662 may, for instance, include one or more processors that may be programmed to execute methods for modulating or otherwise generating current at frequencies for detection by the utility locator device 640 and/or other methods disclosed herein. Likewise, the current generation element 662 may include one or more non-transitory memories for storing information related to programming in generating/modulating current signals. In some embodiments, the processing and storing of information may be shared or instead occur via a processor/memory element disposed in the multi-antenna positioning device 600 and/or other element of the utility locating transmitter 660 and/or other communicatively coupled device.

Still referring to FIG. 6B, the utility locating transmitter 660 may further include a 664 for coupling of the current generated by current generation element 662 onto one or more utility lines such as the utility line 612. The output current element 664 may be or include clips, clamps, or like mechanisms to physically couple to the utility line 612 and/or inductive devices to induce current in the utility line 612. The output current element 664 may be or share aspects with the various clips, clamps, inductive devices, and other apparatus for coupling of current onto utility lines as described in U.S. Pat. No. 10,088,592, issued Oct. 2, 2018, entitled INDUCTIVE CLAMP DEVICES, SYSTEMS, AND METHODS and U.S. patent application Ser. No. 17/013,831, filed Sep. 7, 2020, entitled MULTIFUNCTION BURIED UTILITY LOCATING CLIPS and/or other incorporated patents and applications herein. The utility locating transmitter 660 may further include a power element 666 for provisioning of electrical power. The power element 666 may, for instance, be a battery such as those described in U.S. Pat. No. 10,090,498, issued Oct. 2, 2018, entitled MODULAR BATTERY PACK APPARATUS, SYSTEMS AND METHODS INCLUDING VIRAL DATA AND/OR CODE TRANSFER; U.S. patent application Ser. No. 16/255,524, filed Jan. 23, 2019, entitled RECHARGEABLE BATTERY PACK ONBOARD CHARGE STATE INDICATION METHOD AND APPARATUS of their incorporated patents and applications.

The utility locator device 640 and associated methods for locating and mapping utility lines may be or share aspects with the devices described in U.S. Pat. No. 10,670,766, issued Jun. 20, 2020, entitled UTILITY LOCATING SYSTEMS, DEVICES, AND METHODS USING RADIO BROADCAST SIGNALS; U.S. patent application Ser. No. 16/786,935, filed Feb. 10, 2020, entitled SYSTEMS AND METHODS FOR UTILITY LOCATING IN A MULTI-UTILITY ENVIRONMENT, U.S. Pat. No. 10,564,309, issued Feb. 18, 2020, entitled SYSTEMS AND METHODS FOR UTILITY LOCATING IN A MULTI-UTILITY ENVIRONMENT, U.S. patent application Ser. No. 16/882,719, filed May 25, 2020, entitled UTILITY LOCATING SYSTEMS, DEVICES, AND METHODS USING RADIO BROADCAST SIGNALS, U.S. Pat. No. 10,670,766, issued Jun. 2, 2020, entitled UTILITY LOCATING SYSTEMS, DEVICES, AND METHODS USING RADIO BROADCAST SIGNALS; U.S. patent application Ser. No. 17/235,507, filed Apr. 20, 2021, entitled UTILITY LOCATING DEVICES EMPLOYING MULTIPLE SPACED APART GNSS; and U.S. Pat. No. 11,092,712, issued Aug. 17, 2021, entitled UTILITY LOCATING SYSTEMS, DEVICES, AND METHODS USING RADIO BROADCAST SIGNALS or others described in the incorporated patents and applications. In the utility locator device 640, the precise geolocation solutions generated via the multi-antenna positioning device 600 may be correlated with utility line locating information to produce precise utility line geolocations as well as maps containing the precise utility line geolocations.

Still referring to FIG. 6B, the utility locator device 640, including the multi-antenna positioning device 600 of the present disclosure, may further include a locator subsystem 642 having one or more antennas 644 and associated receiver circuitry 646 to receive magnetic signals 614 emitted by the utility line(s) 612. A processing element 650, including one or more processors, may be operatively coupled to a memory element 652, including one or more non-transitory memories, and the GNSS receiver(s) of the multi-antenna positioning device 600. The processing element 650 may be programmed to execute methods for locating and mapping utility lines from received magnetic signals, execute methods relating to adjusting time corrections associated with navigation signals to best align geolocation estimates with the known spatial relationship of GNSS antennas of the multi-antenna positioning device 600 (e.g., the method 700 of FIG. 7) and further correlating and mapping resulting geolocation solutions with utility line positions and/or other methods disclosed herein. In other embodiments, such processing may also or alternatively occur in a separate processing element in one or more external devices (e.g., a computer, tablet, smart phone, remote cloud computer, utility locator device, or the like) in real-time, near real-time, or in post processing. The utility locator device 640 may further include a memory element 652 having one or more non-transitory memories to store instructions relating to methods of the present disclosure determining geolocation and resulting geolocation solutions as well as for correlating utility locating information and methods.

One such method (e.g., the method 700 of FIG. 7) is further illustrated in FIG. 6A. The multi-antenna positioning device 600 disposed in either the utility locator device 640 and/or utility locating transmitter 660 and having GNSS antennas with known spatial relationships 602a, 602b, and 602c may generate a geolocation estimate associated with each GNSS antenna (e.g., geolocation estimate 604a, 604b, or 604c in FIG. 6A). The positioning of geolocation estimates 604a, 604b, and 604c may be compared against the known spatial relationships 602a, 602b, and 602c of associated GNSS antennas 644. The timing correction data parsed from correction data provided by reference element(s) 630 may be adjusted to align geolocation estimates 604a, 604b, or 604c to the known spatial relationships 602a, 602b, and 602c of associated GNSS antennas 644 to the extent possible producing geolocation solutions 606a, 606b, and 606c.

Figure 7:
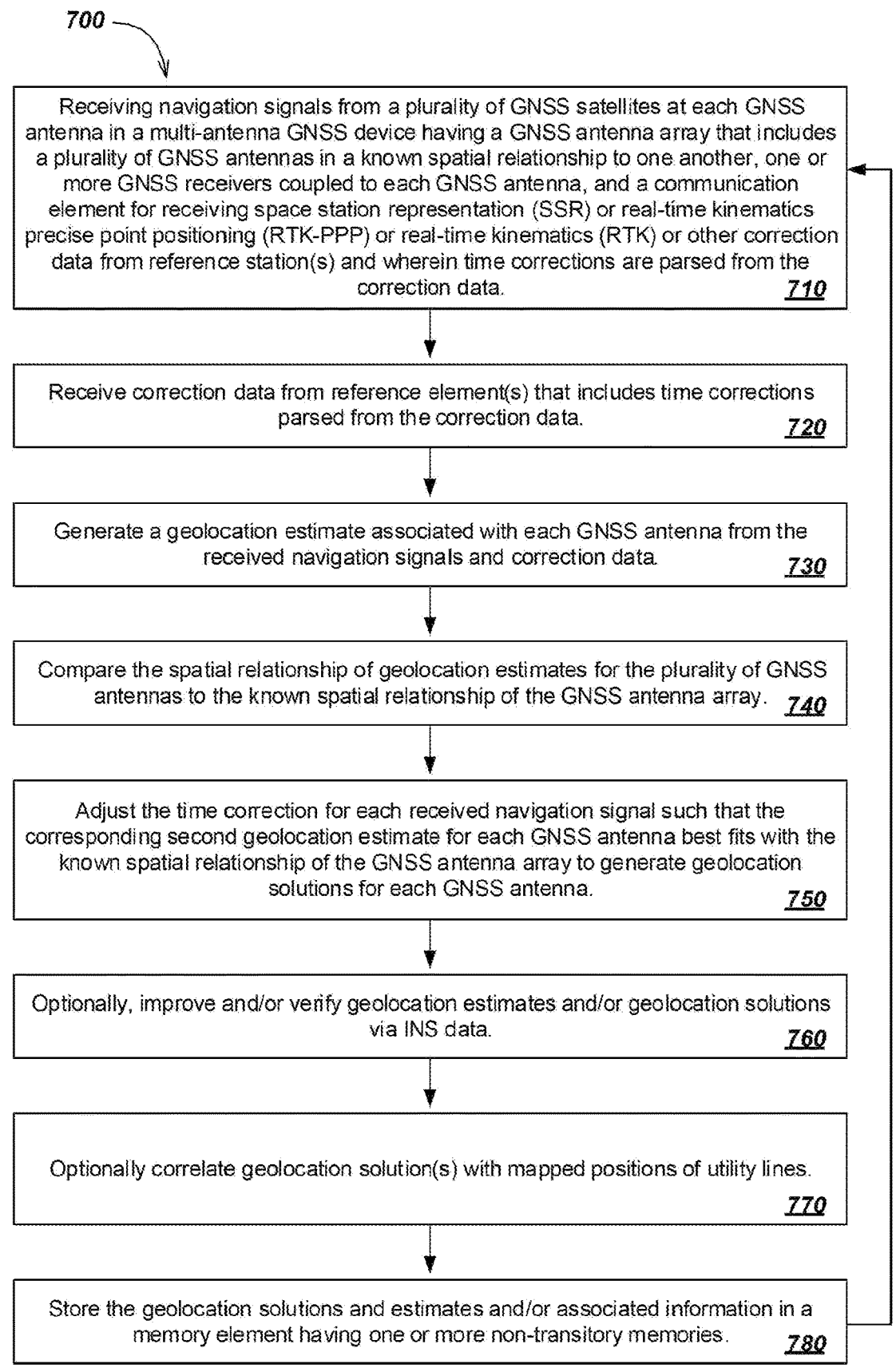
FIG. 7 is a method for determining geolocation solutions via a multi-antenna positioning device of the present disclosure.

Referring to FIG. 6B, the utility locator device 640 may further include a user interface and input element 654 to receive input commands from a user and further communicate data relating to the positions of utility lines, such as utility line 612, geolocation solutions/estimates such as those generated by method 700 of FIG. 7, and/or other mapping information to a user. A power element 656 (e.g., one or more batteries or the like) may be included for portioning of electrical power to the various powered elements.

A communication signal 670 is illustrated wherein the utility locating transmitter 660 and utility locator device 640 may wirelessly communicate information pertaining to geolocations and utility locating. Similarly, such wireless or wired communication may be established between other devices (e.g., GNSS backpacks, base stations, range finding devices, vehicle-based locator devices, smart phones, laptops or tablet computers, and/or the like). In some such embodiments, the communication signal 670 may be or include correction data. For instance, the utility locator transmitter 660 may, in determining geolocation solutions, function as a non-moving base reference station/reference element or configured to act as a VRS and communicate correction data to the utility locator device 640 and/or other enabled GNSS devices and/or other devices via communication signal 670.

It should be noted that a multi-antenna positioning device of the present disclosure may be employed in other utility locating devices than the utility locator device 640 and utility locating transmitter 660 illustrated in FIGS. 6A and 6B. For instance, a multi-antenna positioning device of the present disclosure may be employed in GNSS backpacks, base stations, range finding devices, vehicle-based locator devices, and/or other devices and apparatus described in the incorporated patents and applications.

Turning to FIG. 7, a method 700 for generating geolocation via a multi-antenna positioning device of the present disclosure is described. The method 700 may include a step 710 for receiving navigation signals from a plurality of GNSS satellites at each GNSS antenna in a GNSS antenna array having a plurality of GNSS antennas in a known spatial relationship to one another, one or more GNSS receivers coupled to each GNSS antenna, and a communication element for receiving SSR or PPP-RTK or RTK and/or other correction data from reference element(s) and wherein time corrections may be parsed from the correction data. In some method embodiments, the time adjustments from an individual GNSS receiver may have all the same offsets. Such time corrections may be done separately from all time related data for each GNSS receiver separately. Such a device may be or share aspects with the multi-antenna positioning devices of the present disclosure such as the multi-antenna positioning device 500 of FIGS. 5A and 5B and/or the multi-antenna positioning device 600 of FIGS. 6A and 6B disposed in the utility locator device 640 or utility locating transmitter 660. In a step 720, the method 700 may include receiving correction data from reference element(s) that includes time corrections parsed from the correction data. For instance, the internal clock associated with each GNSS receiver used to receive and process navigation signals may be incrementally changed to make adjustments in improving positioning accuracy. In a step 730, the method 700 may include generating a geolocation estimate associated with each GNSS antenna from the received navigation signals and correction data. In a step 740, the method 700 may include comparing the spatial relationship of geolocation estimates for the plurality of GNSS antennas to the known spatial relationship of the GNSS antenna array. In a step 750, the method 700 may include adjusting the time correction for each received navigation signal such that the corresponding second geolocation estimate for each GNSS antenna best fits with the known spatial relationship of the GNSS antenna array to generate geolocation solutions for each GNSS antenna. For instance, the internal clock associated with each GNSS receiver used to receive and process navigation signals may be incrementally changed to make adjustments in improving positioning accuracy. In an optional step 760, INS data may be generated by the multi-antenna positioning device to improve and/or verify geolocation estimates and/or geolocation solutions. For instance, such INS data may be or include data regarding orientation, pose, movements, and/or other inertial data that may be generated via an accelerometer, an accelerometer and compass, and or an array of sensors and mechanisms including but not limited to gyroscopic sensors, accelerometers, compass sensors, altimeters, LiDAR, ground tracking mechanism, cameras, ground-penetrating radar (GPR), radar, and the like. In another optional step 770, the geolocation solution(s) may be correlated with mapped positions of utility lines determined by a utility locator device. In a step 780 of the method 700, the geolocation solutions and estimates and/or associated information may be stored in a memory element having one or more non-transitory memories. It should be noted that the method 700 of FIG. 7 may optionally repeat.

Figure 8A:
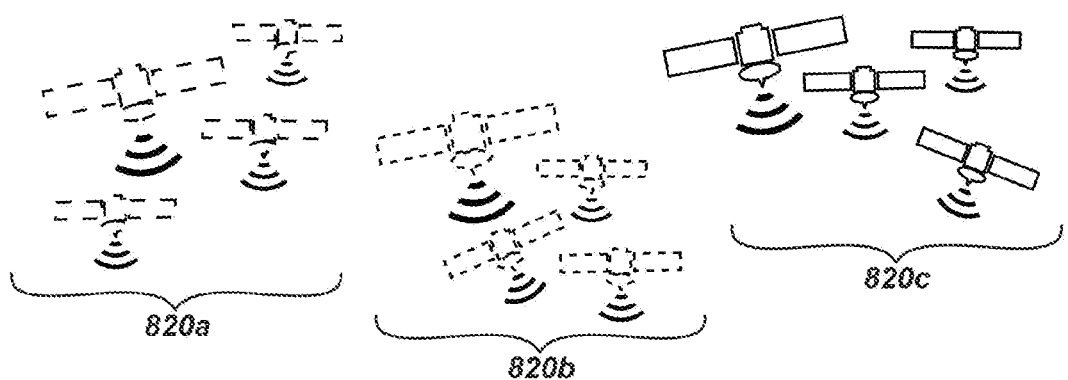
FIG. 8A is a drawing of various GNSS based positioning devices and a plurality of navigation satellite constellations.
Figure 8A:
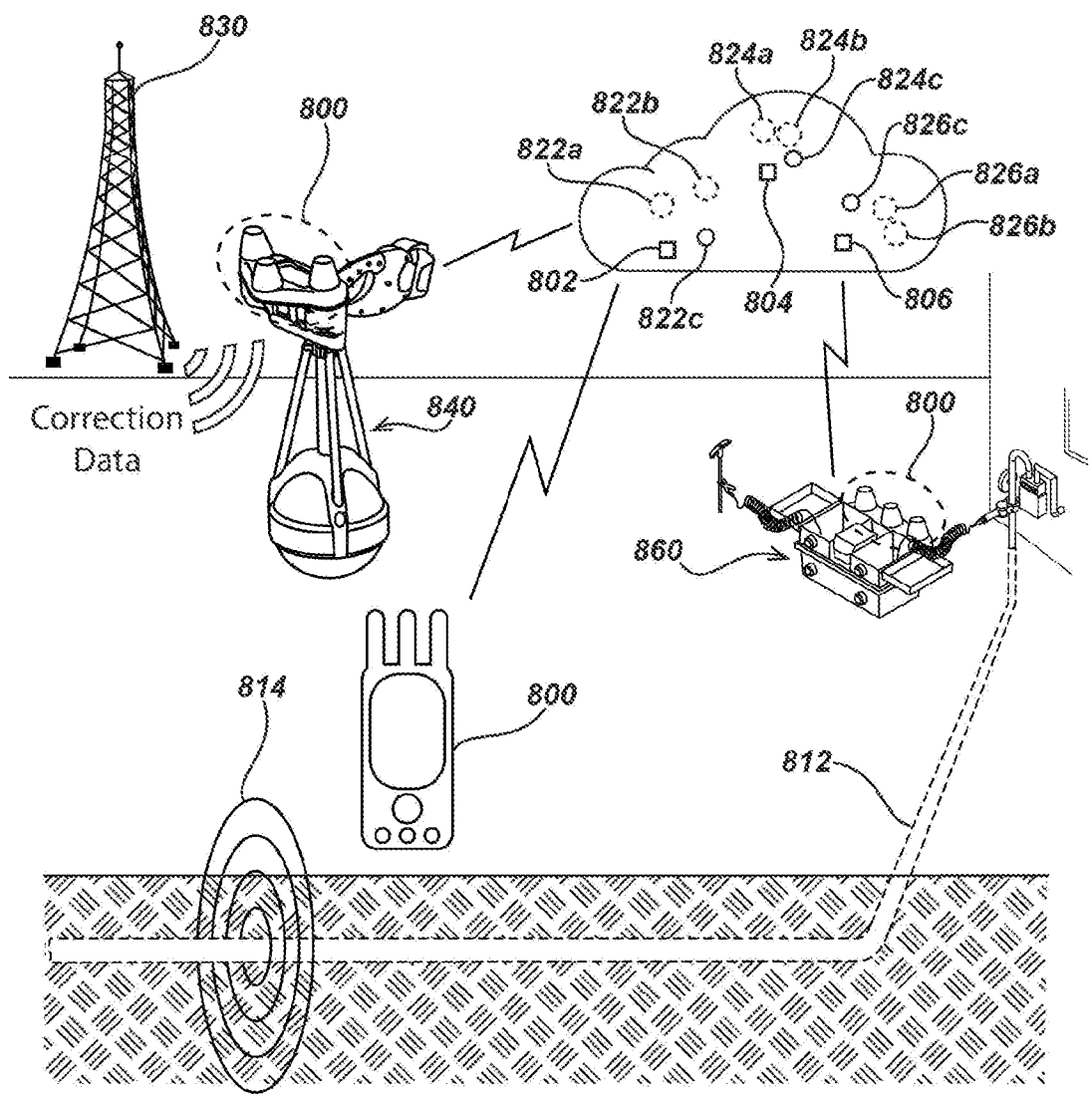
Figure 8B:
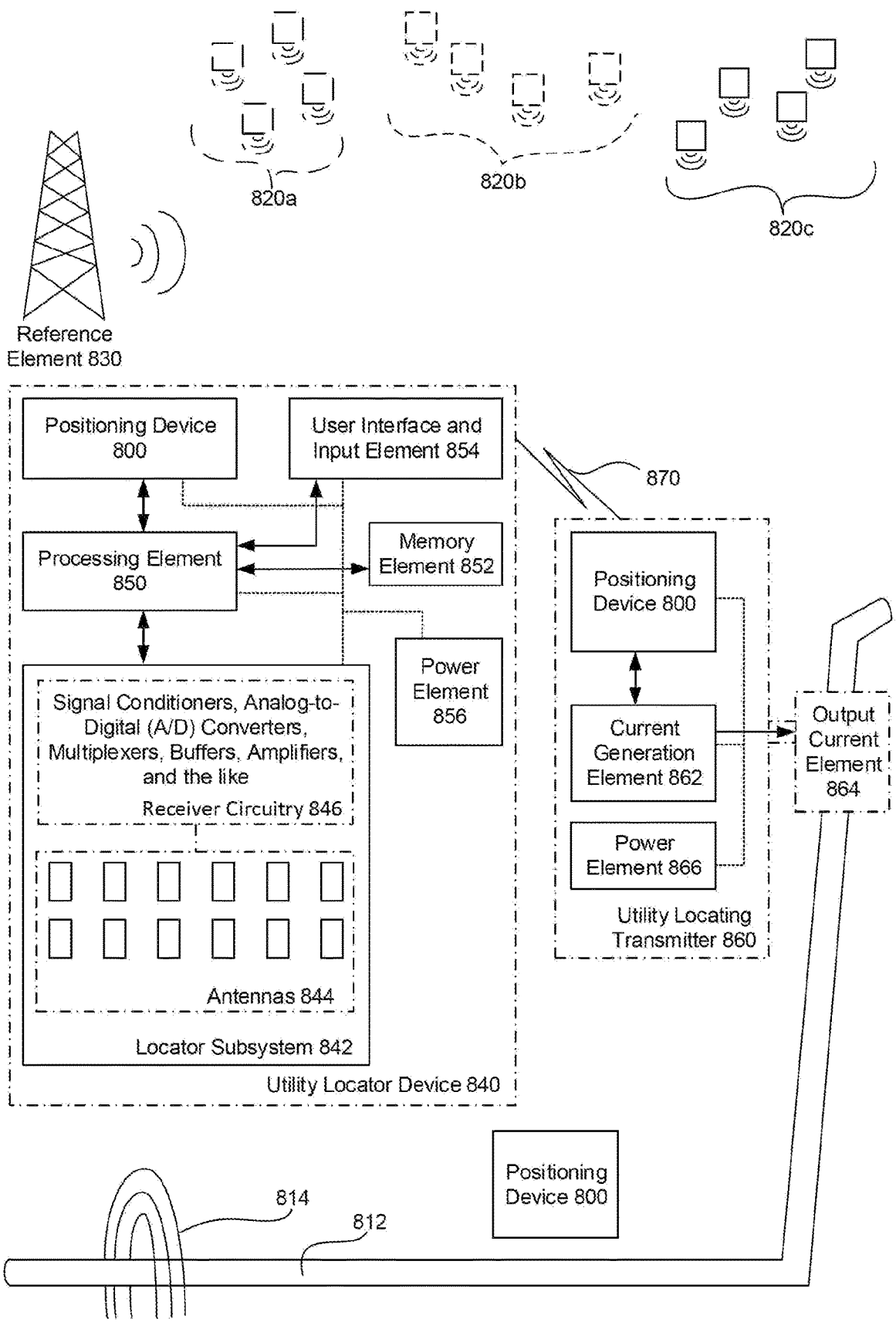
FIG. 8B is a diagram of the various GNSS based positioning devices and plurality of navigation satellite constellations from FIG. 8A.

Turning to FIGS. 8A and 8B, a positioning device 800, which may be or share aspects with the GNSS and INS based positioning device 200 of FIGS. 2A and 2B, the GNSS and INS based positioning device 300 disposed in utility locator device 340 of FIGS. 3A and 3B, multi-antenna positioning device 500 of FIGS. 5A and 5B, the multi-antenna positioning device 600 which may be disposed in the utility locator device 640 or utility locating transmitter 660 of FIGS. 6A and 6B, is illustrated which may receive navigation signals from a plurality of different GNSS satellite constellations such as the GNSS satellite constellations 820a, 820b, and 820c (FIG. 8A). Each of the different GNSS satellite constellations 820a, 820b, and 820c may, for instance, be a different satellite navigation system (e.g., GPS, GLONASS, BDS, QZSS, Galileo, and/or other satellite navigation system). A set of geolocation estimates (e.g., the set of geolocation estimates 822a, 822b, and 822c and/or the set of geolocation estimates 824a, 824b, and 824c and/or the set of geolocation estimates 826a, 826b, and 826c) may be generated at each GNSS antenna (e.g., GNSS antenna position 802, 804, and 806 respectively). One geolocation estimate in each set may be generated from a different constellation of navigation satellites. For instance, at the GNSS antenna corresponding to position 802 the geolocation estimate 822a may be generated from navigation signals of the GNSS satellite constellations 820a, the geolocation estimate 822b may be generated from navigation signals of the GNSS satellite constellations 820b, and the geolocation estimate 822c may be generated from navigation signals of the GNSS satellite constellations 820c. Likewise, at the GNSS antenna corresponding to position 804 the geolocation estimate 824a may be generated from navigation signals of the GNSS satellite constellations 820a, the geolocation estimate 824b may be generated from navigation signals of the GNSS satellite constellations 820b, and the geolocation estimate 824c may be generated from navigation signals of the GNSS satellite constellations 820c. Likewise, at the GNSS antenna corresponding to position 806 the geolocation estimate 826a may be generated from navigation signals of the GNSS satellite constellations 820a, the geolocation estimate 826b may be generated from navigation signals of the GNSS satellite constellations 820b, and the geolocation estimate 826c may be generated from navigation signals of the GNSS satellite constellations 820c. In other embodiments, other numbers of GNSS estimates may be generated for each corresponding GNSS antenna using any number of different constellations of navigation satellites. In further embodiments, different navigation satellites in the same constellation may be used as the reference satellite/element in providing correction data thus generating a plurality of different geolocation estimates for each satellite navigation constellation. Comparisons may be made between geolocation estimates and known spatial relationships of GNSS antennas to generate geolocation solutions (e.g., using the method 1000 of FIG. 10).

Figure 9:
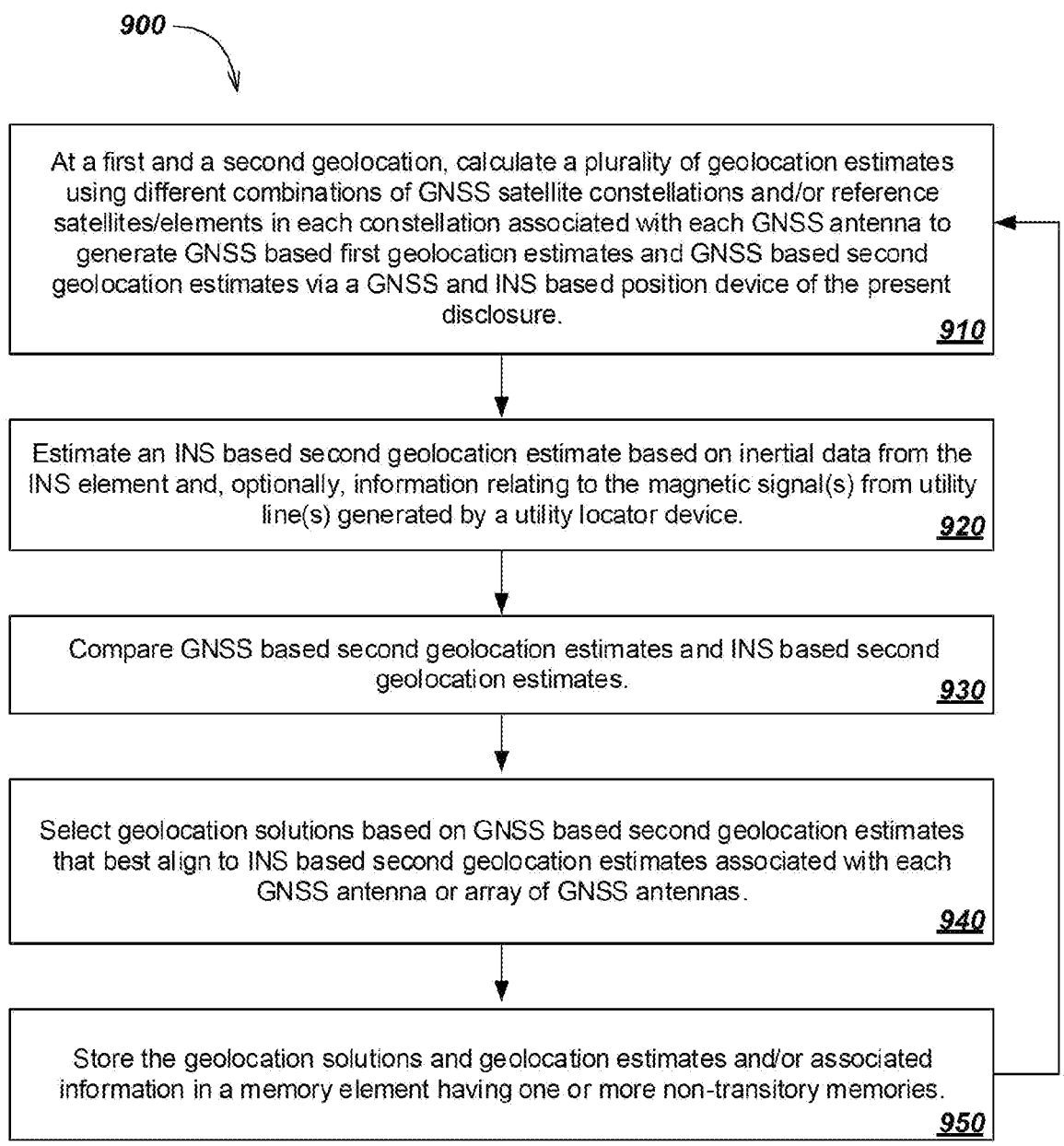
FIG. 9 is a method using different constellations of navigation satellites and/or reference satellites to determine geolocation solutions via a GNSS and INS based positioning device.

In other embodiments, comparison of movements from subsequent geolocation estimates (e.g., movements of geolocation estimates 822a, 822b, 822c, 824a, 824b, 824c, 826a, 826b, and 826c to corresponding ones of subsequent geolocations) may instead be made to INS data in determining geolocation solutions (e.g., using the method 900 of FIG. 9). For instance, movements described by subsequent geolocation estimates that best align with INS data may be used to determine which reference satellite, constellation of navigation satellites, and geolocation solutions may be most accurate. For instance, such INS data may be or include data regarding orientation, pose, movements, and/or other inertial data that may be generated via an accelerometer, an accelerometer and compass, and or an array of sensors and mechanisms including but not limited to gyroscopic sensors, accelerometers, compass sensors, altimeters, LiDAR, ground tracking mechanism, cameras, ground-penetrating radar (GPR), radar, and the like.

The positioning device 800 may be disposed in various other devices including those used in utility locating and mapping operations. As illustrated in FIGS. 8A and 8B, a utility locating transmitter 860 may be or share aspects with the transmitters or like devices for coupling current onto one or more utility lines described in U.S. Pat. No. 10,088,592, issued Oct. 2, 2018, entitled INDUCTIVE CLAMP DEVICES, SYSTEMS, AND METHODS; U.S. Pat. No.

10,7754,053, issued Aug. 25, 2020, entitled UTILITY LOCATOR TRANSMITTER DEVICES, SYSTEMS, AND METHODS WITH DOCKABLE APPARATUS; U.S. patent application Ser. No. 17/013,831, filed Sep. 7, 2020, entitled MULTIFUNCTION BURIED UTILITY LOCATING CLIPS; and U.S. patent application Ser. No. 17/235,507, filed Apr. 20, 2021, entitled UTILITY LOCATING DEVICES EMPLOYING MULTIPLE SPACED APART GNSS or various other incorporated patents and applications.

Further shown in FIG. 8B, the utility locating transmitter 860 may include a current generation element 862 for generating electromagnetic current at one or more known frequencies for detection by a utility locator device such as the utility locator device 840. The current generation element 862 may, for instance, include one or more processors that may be programmed to execute methods for modulating or otherwise generating current at frequencies for detection by the utility locator device 840 and/or other methods disclosed herein. Likewise, the current generation element 862 may include one or more non-transitory memories for storing information related to programming in generating/modulating current signals. In some embodiments, the processing and storing of information may be shared or instead occur via a processor/memory element disposed in the positioning device 800 and/or other element of the utility locating transmitter 860 and/or other communicatively coupled device. In some embodiments, a utility locator device such as the utility locator device 840 may instead be a GPR or include GPR in the magnetic utility locator device disclosed or referenced herein to determine and/or map utility line positions that may be buried in the ground.

Still referring to FIG. 8B, the utility locating transmitter 860 may further include an output current element 864 for coupling of the current generated by current generation element 862 onto one or more utility lines such as the utility line 812. The output current element 864 may be or include clips, clamps, and/or like mechanisms to physically couple to the utility line 812 and/or inductive devices to induce current in the utility line 812. The output current element 864 may be or share aspects with the various clips, clamps, inductive devices, and other apparatus for coupling of current on utility lines as described in U.S. Pat. No. 10,088,592, issued Oct. 2, 2018, entitled INDUCTIVE CLAMP DEVICES, SYSTEMS, AND METHODS; U.S. patent application Ser. No. 17/013,831, filed Sep. 7, 2020, entitled MULTIFUNCTION BURIED UTILITY LOCATING CLIPS and/or other incorporated patents and applications herein. The utility locating transmitter 860 may further include a power element 866 for provisioning of electrical power. The power element 866 may, for instance, be a battery such as those described in MODULAR BATTERY PACK APPARATUS, SYSTEMS AND METHODS INCLUDING VIRAL DATA AND/OR CODE TRANSFER; U.S. patent application Ser. No. 16/255,524, filed Jan. 23, 2019, entitled RECHARGEABLE BATTERY PACK ONBOARD CHARGE STATE INDICATION METHOD AND APPARATUS of the incorporated patents and applications.

FIGS. 8A and 8B further include a utility locator device 840. The utility locator device 840 and associated methods for locating and mapping utility lines may be or share aspects with the devices described in U.S. Pat. No. 10,670,766, issued Jun. 20, 2020, entitled UTILITY LOCATING SYSTEMS, DEVICES, AND METHODS USING RADIO BROADCAST SIGNALS, U.S. patent application Ser. No. 16/786,935, filed Feb. 10, 2020, entitled SYSTEMS AND METHODS FOR UTILITY LOCATING IN A MULTI-UTILITY ENVIRONMENT, U.S. Pat. No. 10,564,309, issued Feb. 18, 2020, entitled SYSTEMS AND METHODS FOR UTILITY LOCATING IN A MULTI-UTILITY ENVIRONMENT, U.S. patent application Ser. No. 16/882,719, filed May 25, 2020, entitled UTILITY LOCATING SYSTEMS, DEVICES, AND METHODS USING RADIO BROADCAST SIGNALS, U.S. Pat. No. 10,670,766, issued Jun. 2, 2020, entitled UTILITY LOCATING SYSTEMS, DEVICES, AND METHODS USING RADIO BROADCAST SIGNALS; U.S. patent application Ser. No. 17/235,507, filed Apr. 20, 2021, entitled UTILITY LOCATING DEVICES EMPLOYING MULTIPLE SPACED APART GNSS; and U.S. Pat. No. 11,092,712, issued Aug. 17, 2021, entitled UTILITY LOCATING SYSTEMS, DEVICES, AND METHODS USING RADIO BROADCAST SIGNALS or others described in the incorporated patents and applications. In the utility locator device 840, the precise geolocation solutions generated via the positioning device 800 may be correlated with utility line locating information to produce precise utility line geolocations as well as maps containing the precise utility line geolocations. In some embodiments, a utility locator device such as the utility locator device 840 may instead be a ground penetrating radar (GPR) or include GPR in the magnetic utility locator device disclosed or referenced herein to determine and/or map utility line positions that may be buried in the ground.

Referring to FIG. 8B, the utility locator device 840, including the positioning device 800 of the present disclosure, may further include a locator subsystem 842 having one or more antennas 844 and associated receiver circuitry 846 to receive magnetic signals 814 emitted by the utility line(s) 812. A processing element 850, including one or more processors, may be operatively coupled to a memory element 852, including one or more non-transitory memories, and the GNSS receiver(s) of the positioning device 800. The processing element 850 may be programmed to execute methods for locating and mapping utility lines from received magnetic signals, execute methods relating to adjusting time corrections associated with navigation signals to best align geolocation estimates with the known spatial relationship of GNSS antennas of the multi-antenna positioning device 800 (e.g., the method 900 of FIG. 9 or the method 1000 of FIG. 10) and further correlating and mapping resulting geolocation solutions with utility line positions and/or other methods disclosed herein. In other embodiments, such processing may also or alternatively occur in a separate processing element in one or more external devices (e.g., a computer, tablet, smart phone, remote cloud computer, utility locator device, or the like) in real-time, near real-time, or in post processing. The utility locator device 840 may further include a memory element 852 having one or more non-transitory memories to store instructions relating to methods of the present disclosure for determining geolocation solution (e.g., the method 900 of FIG. 9 or the method 1000 of FIG. 10) and resulting geolocation solutions as well as for correlated utility locating information and methods.

Figure 10:
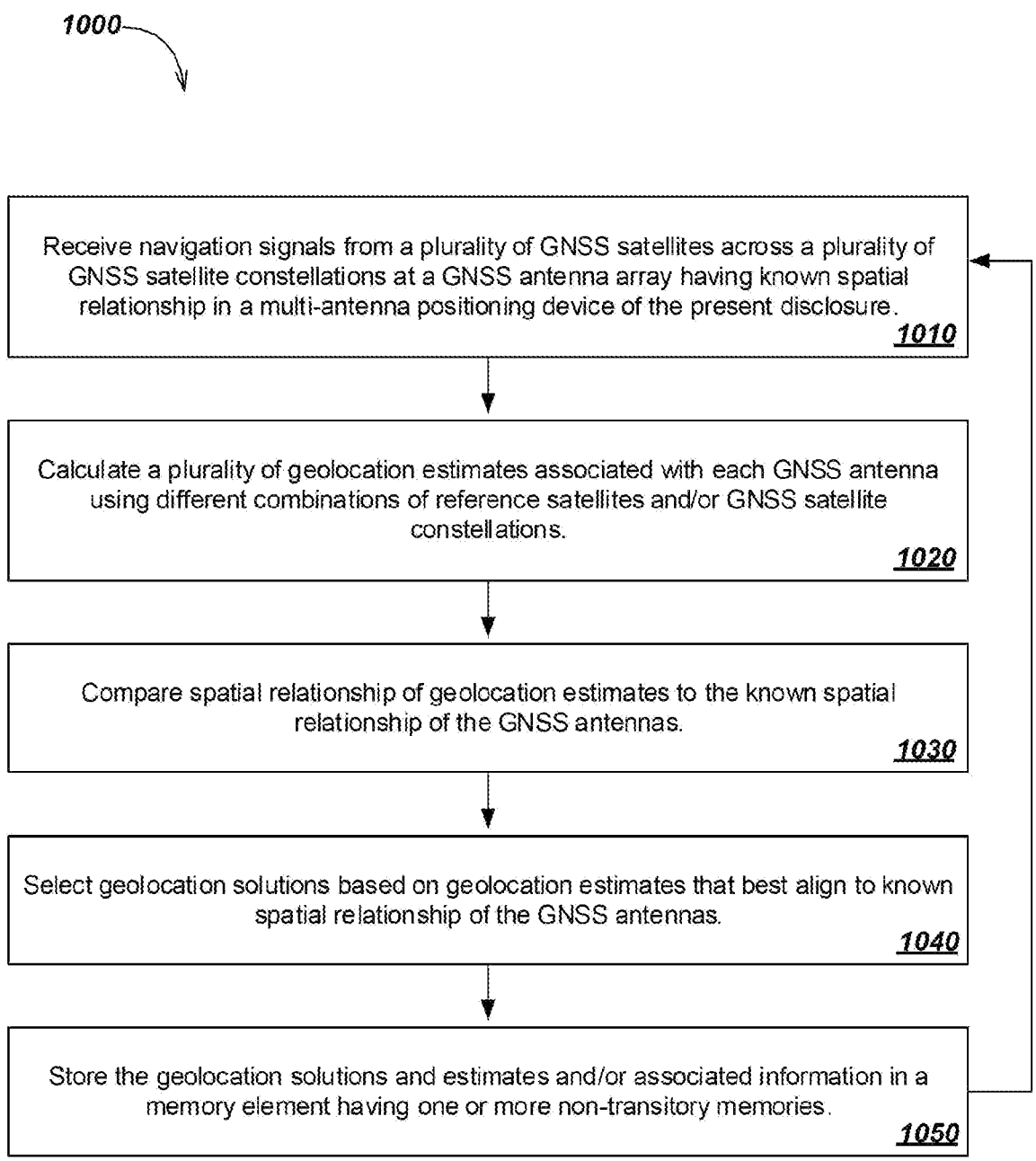
FIG. 10 is a method using different constellations of navigation satellites and/or reference satellites to determine geolocation solutions via a multi-antenna positioning device.

Referring to FIG. 8B, the utility locator device 840 may further include a user interface and input element 854 to receive input commands from a user and further communicate data relating to the positions of utility lines, such as utility line 812, geolocation solutions/estimates such as those generated by the method 900 of FIG. 9 or the method 1000 of FIG. 10, and/or other mapping information to a user. A power element 856 (e.g., one or more batteries or the like) may be included for portioning of electrical power to the various powered elements.

A communication signal 870 is illustrated indicating communication between the utility locating transmitter 860 and utility locator device 840. The communication signal 870 may communicate information pertaining to geolocations and utility locating wirelessly or, in some embodiments, via physical wire(s). Similarly, such a wireless or wired communication may be established between other devices (e.g., GNSS backpacks, base stations, range finding devices, vehicle-based locator devices, smart phones, laptop or tablet computer, and/or the like). In some such embodiments, the communication signal 870 may be or include correction data. For instance, the utility locator transmitter 860 may, in determining geolocation solutions, function as a non-moving base reference station/reference element or configured to act as a VRS and communicate correction data to the utility locator device 840 and/or other enabled GNSS devices and/or other devices via communication signal 870.

It should be noted that a multi-antenna positioning device of the present disclosure may be employed in other utility locating devices than the utility locator device 840 and utility locating transmitter 860 illustrated in FIGS. 8A and 8B. For instance, a multi-antenna positioning device of the present disclosure may be employed in GNSS backpacks, base stations, range finding devices, vehicle-based locator devices, and/or other devices and apparatus described in the incorporated patents and applications.

Turning to FIG. 9, a method 900 for determining geolocation solutions via a GNSS and INS based positioning device of the present disclosure is described. In a step 910, the method 900 may include calculating a plurality of geolocation estimates using different combinations of GNSS satellite constellations and/or reference satellites/elements in each constellation associated with each GNSS antenna to generate GNSS based first geolocation estimates and GNSS based second geolocation estimates via a GNSS and INS based position device of the present disclosure at a first geolocation and at a second geolocation. In a step 920, the method 900 may include estimating an INS based second geolocation estimate relative to each GNSS antenna. In some method embodiments, such as those executed via utility locator device or otherwise including information relating to magnetic signal(s) from one or more utility lines as sensed via a utility locator device (e.g., the utility locator device 340 of FIGS. 3A and 3B, the utility locator device 640 of FIGS. 6A and 6B, and the utility locator device 840 of FIGS. 8A and 8B), such information relating to the magnetic signal(s) may be included in the inertial data. For instance, assuming that the utility lines are generally stationary, the associated information relating to the magnetic signal(s) may be used to correct for drift in inertial data gathered by various INS sensors. For instance, such INS data may be or include data regarding orientation, pose, movements, and/or other inertial data that may be generated via an accelerometer, an accelerometer and compass, and or an array of sensors and mechanisms including but not limited to gyroscopic sensors, accelerometers, compass sensors, altimeters, LiDAR, ground tracking mechanism, cameras, ground-penetrating radar (GPR), radar, and the like. In a step 930, the method 900 may include comparing GNSS based second geolocation estimates and INS based second geolocation estimates. In a step 940, the method 900 may include selecting geolocation solutions based on GNSS based second geolocation estimates that best align with INS based second geolocation estimates associated with each GNSS antenna or array of GNSS antennas. In a step 950, the method 900 may include storing the geolocation solutions and geolocation estimates and/or associated information in a memory element having one or more non-transitory memories. The method 900 of FIG. 9 may optionally repeat such that the subsequent geolocation estimates may be compared to the prior geolocation solution.

Turning to FIG. 10, a method 1000 for determining geolocation solutions via a multi-antenna positioning device of the present disclosure is described. In a step 1010, the method 1000 may include receiving navigation signals from a plurality of GNSS satellites across a plurality of GNSS satellite constellations at a GNSS antenna array having known spatial relationship in a multi-antenna positioning device of the present disclosure. In a step 1020, the method 1000 may include calculating a plurality of geolocation estimates associated with each GNSS antenna using different combinations of reference satellites and/or GNSS satellite constellations. In a step 1030, the method 1000 may include comparing the spatial relationship of geolocation estimates to the known spatial relationship of the GNSS antennas. In a step 1040, the method 1000 may include selecting geolocation solutions based on geolocation estimates that best align with known spatial relationship of the GNSS antennas. In a step 1050, the method 1000 may include storing the geolocation solutions and estimates and/or associated information in a memory element having one or more non-transitory memories. Optionally, the method 1000 of FIG. 10 may be repeated.

Figure 11:
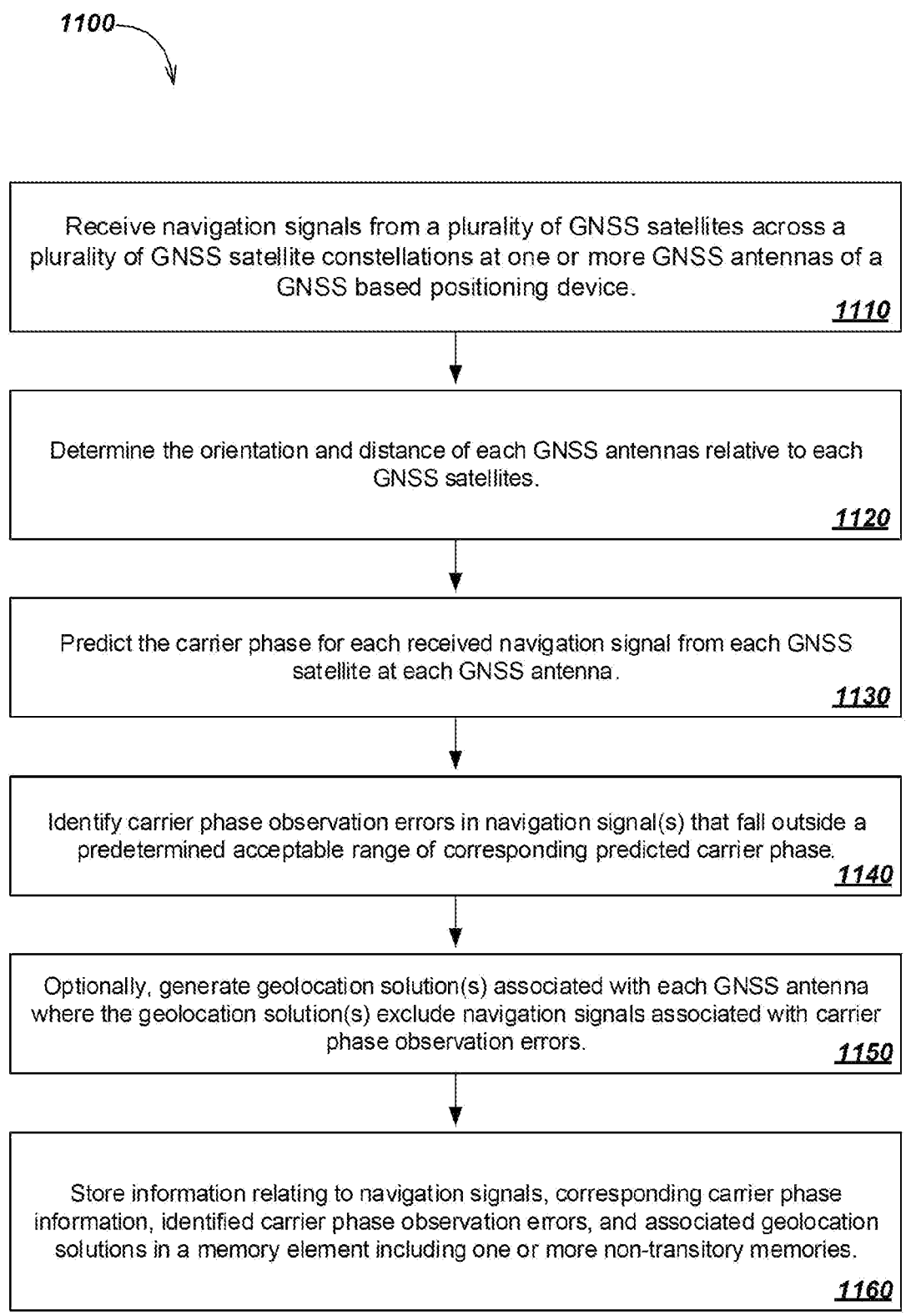
FIG. 11 is a method for identifying carrier phase observation errors in GNSS navigation signals.

Turning to FIG. 11, a method 1100 is described for identifying carrier phase observation errors in GNSS navigation signals which may be used with the GNSS and INS based positioning device and the multi-antenna positioning devices of the present disclosure and/or like GNSS based positioning devices. In a step 1110, the method 1100 may include receiving navigation signals from a plurality of GNSS satellites across a plurality of GNSS satellite constellations at one or more GNSS antennas of a GNSS based positioning device. In a step 1120, the method 1100 may include determining the orientation and distance of each GNSS antennas relative to each GNSS satellites. In a step 1130, the method 1100 may include predicting the carrier phase for each received navigation signal from each GNSS satellite at each GNSS antenna. In a step 1140, the method 1100 may include identifying carrier phase observation errors in navigation signal(s) that fall outside a predetermined acceptable range of corresponding predicted carrier phase. In an optional step 1150, the method 1100 may include excluding navigation signal(s) that fall outside a predetermined acceptable range of corresponding predicted carrier phases in determining geolocation solutions. In a step 1160, the method 1100 may include storing information relating to navigation signals, corresponding carrier phase information, identified carrier phase observation errors, and associated geolocation solutions in a memory element including one or more non-transitory memories.

In some embodiments, the processing of the data associated with the various methods disclosed herein may occur in a positioning device in keeping with the present disclosure. In some such embodiments, the processing of data may occur at the GNSS receiver, a separate processing element, or both. For instance, in some embodiment, SSR data may be processed at the GNSS receiver and other correction data and/or other various GNSS data (e.g., such as that data by which GNSS observables may be determined at the GNSS receivers and/or other processing element or communication element) may further process at a separate processing element in determining geolocation solutions.

Figure 12:
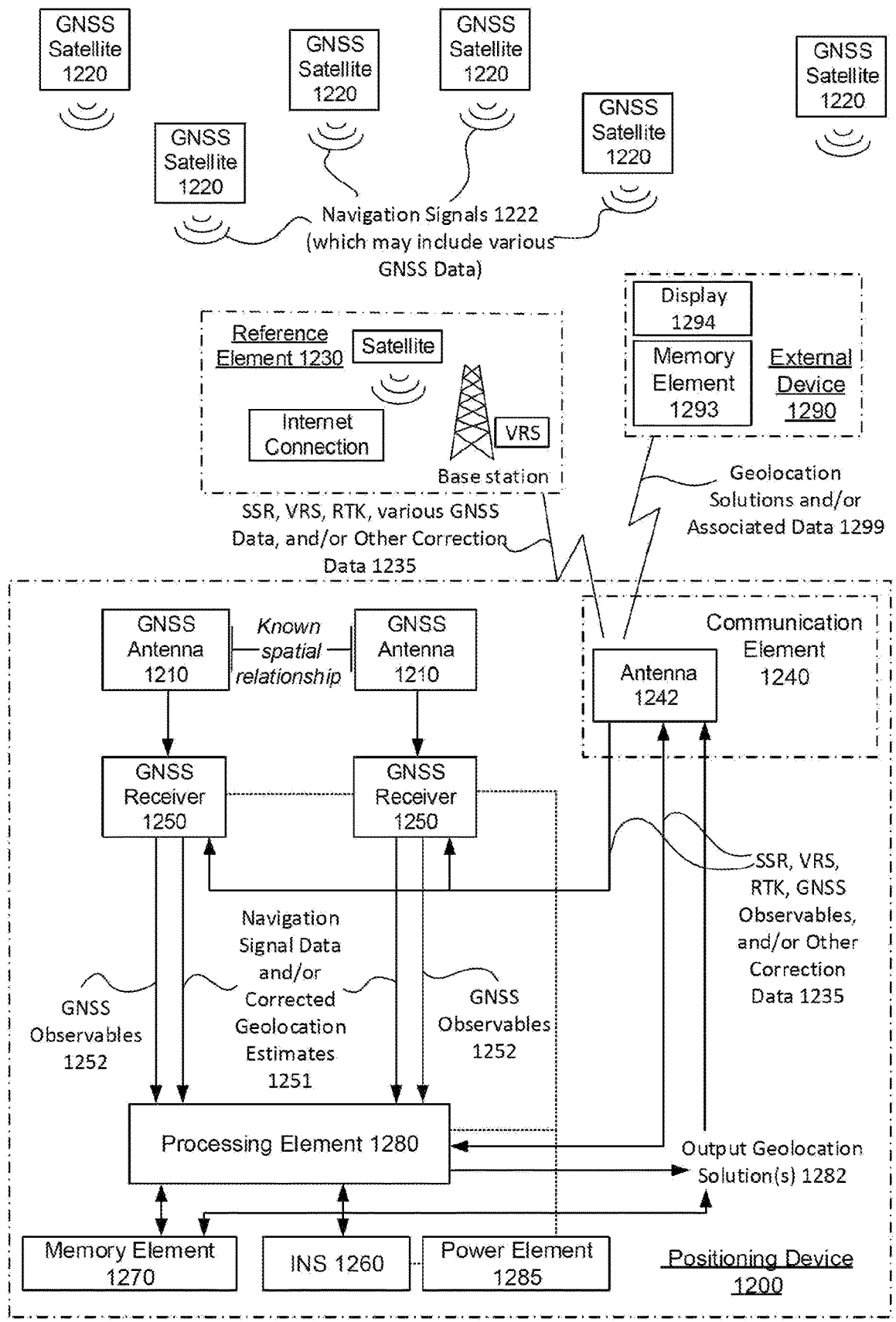
FIG. 12 is a diagram of a positioning device in keeping with the present disclosure.

Turning to FIG. 12, a positioning device 1200 in keeping with the present disclosure is illustrated. The positioning device 1200 may include a plurality of GNSS antennas, such as the GNSS antennas 1210, where the spatial relationship between GNSS antennas 1210 may be known. It should be noted that though the positioning device embodiment 1200 of FIG. 12 shows two GNSS antennas 1210, other embodiments in keeping with the present disclosure may have other quantities of GNSS antennas. Each of the GNSS antennas 1210 may receive navigation signals 1222 (which may include various GNSS data by which GNSS observables may be determined) from a plurality of GNSS satellites 1220. Such GNSS observable data may, for example, include data regarding pseudorange, carrier phase, Doppler shift, or the like.

The positioning device 1200 may include GNSS receiver elements 1250 having at least one GNSS receiver element 1250 coupled at each GNSS antenna 1210. Each GNSS receiver 1250 may receive output navigation signals from the GNSS antennas 1210 and generate GNSS geolocation estimates associated with each GNSS antenna 1210. In some such embodiments, the geolocation estimates may be determined via navigation signals and, optionally, GNSS observable may be determined via various GNSS data also received at each GNSS receiver 1250 via the associated GNSS antennas 1210 (and/or from various GNSS data received at a communication element 1240). In further embodiments, SSR, VRS, RTK, various GNSS data, and/or other correction data 1235 may be received at the communication element 1240 from one or more reference elements 1230 (e.g., reference station, VRS, reference satellite, other internet connection, or the like) and may further be communicated to the one or more GNSS receivers 1250 and be factored in generating position estimates. For instance, GNSS observable may be determined via the SSR, VRS, RTK, various GNSS data, and/or other correction data 1235 received at the communication element 1240 and/or various GNSS data of the navigation signals 1222 received at each GNSS receiver 1250 via the associated GNSS antennas 1210. In yet further embodiments, the navigation signal data and/or geolocation estimates 1251 (which may or may not have been corrected via SSR, VRS, RTK, various GNSS data, and/or other correction data 1235 at the GNSS receivers 1250) and/or GNSS observables 1252 may be communicated from the GNSS receivers 1250 to a processing element 1280 in the positioning device 1200 to determine geolocation solutions via methods disclosed herein (e.g., the method 400 of FIG. 4, the method 700 of FIG. 7, the method 900 of FIG. 9, the method 1000 of FIG. 10, and/or the method 1100 of FIG. 11). It should be noted, the processing of data in generating geolocation solutions in keeping with the present disclosure may occur in real-time, near real-time, or in post processing. Likewise, in some embodiments, initial geolocation solutions may be generated in real-time or near real-time that may later be further corrected in post processing. The processing element 1280, having one or more processors, may be operatively coupled to a memory element 1270 having one or more non-transitory memories storing instructions related to the various methods of the present disclosure (e.g., the method 400 of FIG. 4, the method 700 of FIG. 7, the method 900 of FIG. 9, the method 1000 of FIG. 10, the method 1100 of FIG. 11, the method 13 of FIG. 13, and/or the method 15 of FIG. 15). Such geolocation solutions may factor SSR, VRS, RTK, various GNSS data, and/or other correction data 1235 received via the communication element 1240.

In some embodiments, an INS 1260 that includes one or more inertial sensors (e.g., gyroscopic sensors, accelerometers, compass sensors, altimeters, LiDAR, ground tracking mechanism, cameras, ground-penetrating radar (GPR), radar, and the like) or arrays of sensors may optionally be included in the positioning device 1200 to provide orientation, pose, movements, and/or other inertial data to the processing element 1280 in producing geolocation solutions. For instance, the data from INS 1260 may optionally be used to improve and/or verify geolocation estimates and/or geolocation solutions at the processing element 1280. In some such embodiments the INS 1260 may be one or more accelerometer. In further embodiments, the INS 1260 may be one or more accelerometers and compass sensors. In yet further embodiments, the INS 1260 may be or include an array of different sensors and mechanisms to determine orientation, pose, movements, and/or other inertial data (e.g., gyroscopic sensors, accelerometers, compass sensors, altimeters, LiDAR, ground tracking mechanism, cameras, ground-penetrating radar (GPR), radar, and the like).

A power element 1285 (e.g., one or more batteries, grid power, or the like) may also be included in the positioning device 1200 for supplying of electrical power to the various powered elements of the positioning device.

The processing element 1280 may output geolocation solutions 1282 that may be stored via the memory element 1270. In some embodiments, the output geolocation solutions 1282 may instead or additionally be communicated to the communication element 1240. The geolocation solutions and/or associated data 1299 may be communicated to one or more external devices 1290 (e.g., a computer, tablet, smart phone, remote cloud computer, utility locator device, or the like) such that the geolocation solutions and/or associated data 1299 may optionally be stored on a memory element 1293 having one or more non-transitory memories and/or viewed via a display 1294 in the external device(s) 1290. For instance, the geolocation solutions and/or associated data 1299 may include the SSR, VRS, RTK, other GNSS data, and/or other correction data 1235, GNSS observables 1252, navigation signal data and/or corrected geolocation estimates 1251, data from the INS 1260 and/or other associated data may be communicated with the external device 1290. In further embodiments, such as with the positioning device 1400 of FIG. 14, the processing of data in generating geolocation solutions may instead solely or partially be performed on an external device.

Figure 13:
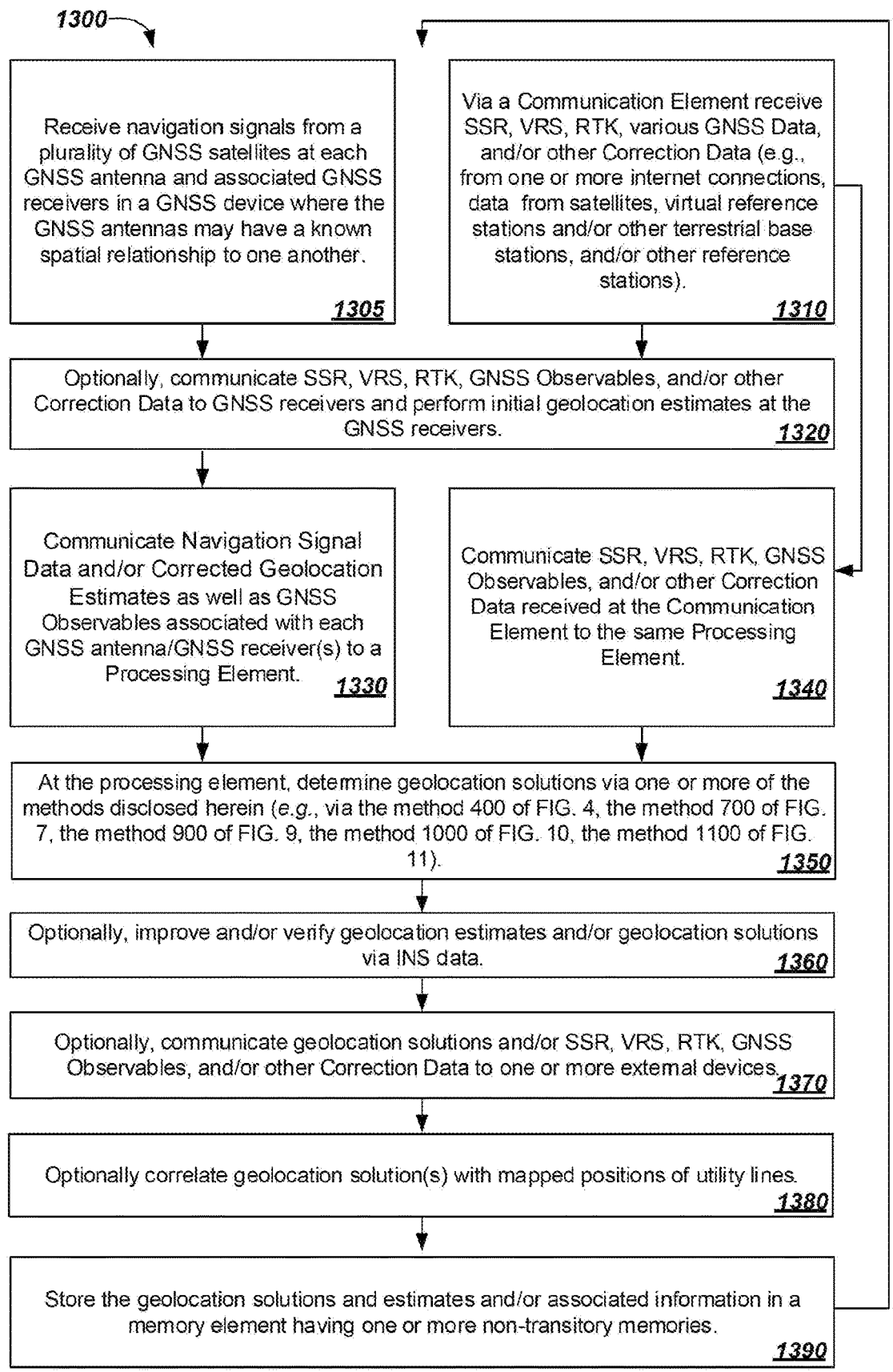
FIG. 13 is a method for processing data in relation to the various other methods disclosed herein on a positioning device in keeping with the disclosure.

Turning to FIG. 13, a method 1300 is described which may be employed by a positioning device in keeping with the present disclosure such as the positioning device 1200 of FIG. 12. In step 1305, navigation signals may be received from a plurality of GNSS satellites at each GNSS antenna and associated GNSS receivers in a GNSS device where the GNSS antennas may have a known spatial relationship to one another. It should be noted that the navigation signals of step 1305 may include various GNSS data by which GNSS observables may be determined (e.g., data regarding pseudorange, carrier phase, Dopler shift, or the like). In a simultaneous step 1310 occurring concurrently with step 1305 the method 1300 may include receiving, via a communication element, SSR, VRS, RTK, various GNSS data, and/or other correction data (e.g., from one or more internet connections, data from satellites, virtual reference stations and/or other terrestrial base stations, and/or other reference stations). It should be noted that the GNSS observables may be determined via the navigation signals received at GNSS receivers and/or SSR, VRS, RTK, various GNSS data, and/or other correction data received at the communication element. In step 1320 following from steps 1305 and 1310, optionally geolocation estimates may be determined at each GNSS receiver. For instance, such GNSS observables may be determined at the GNSS receivers or, alternatively or additionally, at the communication element or via a processing element. The geolocation estimates of step 1320 may be partially or fully corrected via the SSR, VRS, RTK, various GNSS data, and/or other correction data. In a step 1330, the navigation signal data and/or geolocation estimates and/or GNSS observables from each GNSS receiver may be communicated to a processing element in the positioning device. In step 1340 following from step 1310, SSR, VRS, RTK, various GNSS data (which may include determined GNSS observable data), and/or other correction data may also be communicated to the same processing element as step 1330. In step 1350 following steps 1330 and 1340, geolocation solutions may be determined at the processing element via one or more of the various methods disclosed herein (e.g., the method 400 of FIG. 4, the method 700 of FIG. 7, the method 900 of FIG. 9, the method 1000 of FIG. 10, and/or the method 1100 of FIG. 11). It should be noted, the processing of data in generating geolocation solutions in keeping with the present disclosure may occur in real-time, near real-time, or in post processing. Likewise, in some embodiments, initial geolocation solutions may be generated in real-time or near real-time that may later be further corrected in post processing. In step 1360, geolocation solutions and/or estimates may be verified and/or improved via INS data (e.g., orientation, pose, movements, and/or other inertial data that may be generated via an accelerometer, an accelerometer and compass, and or an array of sensors and mechanisms including but not limited to gyroscopic sensors, accelerometers, compass sensors, altimeters, LiDAR, ground tracking mechanism, cameras, ground-penetrating radar (GPR), radar, and the like). In step 1370, geolocation solutions and/or SSR, VRS, RTK, various GNSS data (which may include determined GNSS observable data), and/or other correction data may be communicated to one or more external devices (e.g., computers, tablets, smart phones, remote cloud computers, utility locator devices, or the like). An external device may, for instance, display maps that utilize position data determined via the positioning device. Turning to step 1380, the one or more geolocation solutions may optionally be correlated with the mapped positions of utility lines. For instance, where the positioning device is present in or otherwise communicating with a utility locator device, the mapped utility lines as well as other associated data (e.g., the depths of utility lines, types of utilities present, or the like) may be displayed on the exemplary map from step 1370. In step 1390, the geolocation solutions, geolocation estimates and/or associated information in a memory element having one or more non-transitory memories. For instance, such a memory element may be present in the positioning device and/or the one or more external devices. Optionally, the method 1300 may repeat back at steps 1305 and 1310.

In some embodiments, the processing of the data associated with the various methods disclosed herein may occur solely or partially be performed on an external device (e.g., a computer, tablet, smart phone, remote cloud computer, utility locator device, or the like) communicatively coupled with a positioning device in keeping with the present disclosure to determine.

Figure 14:
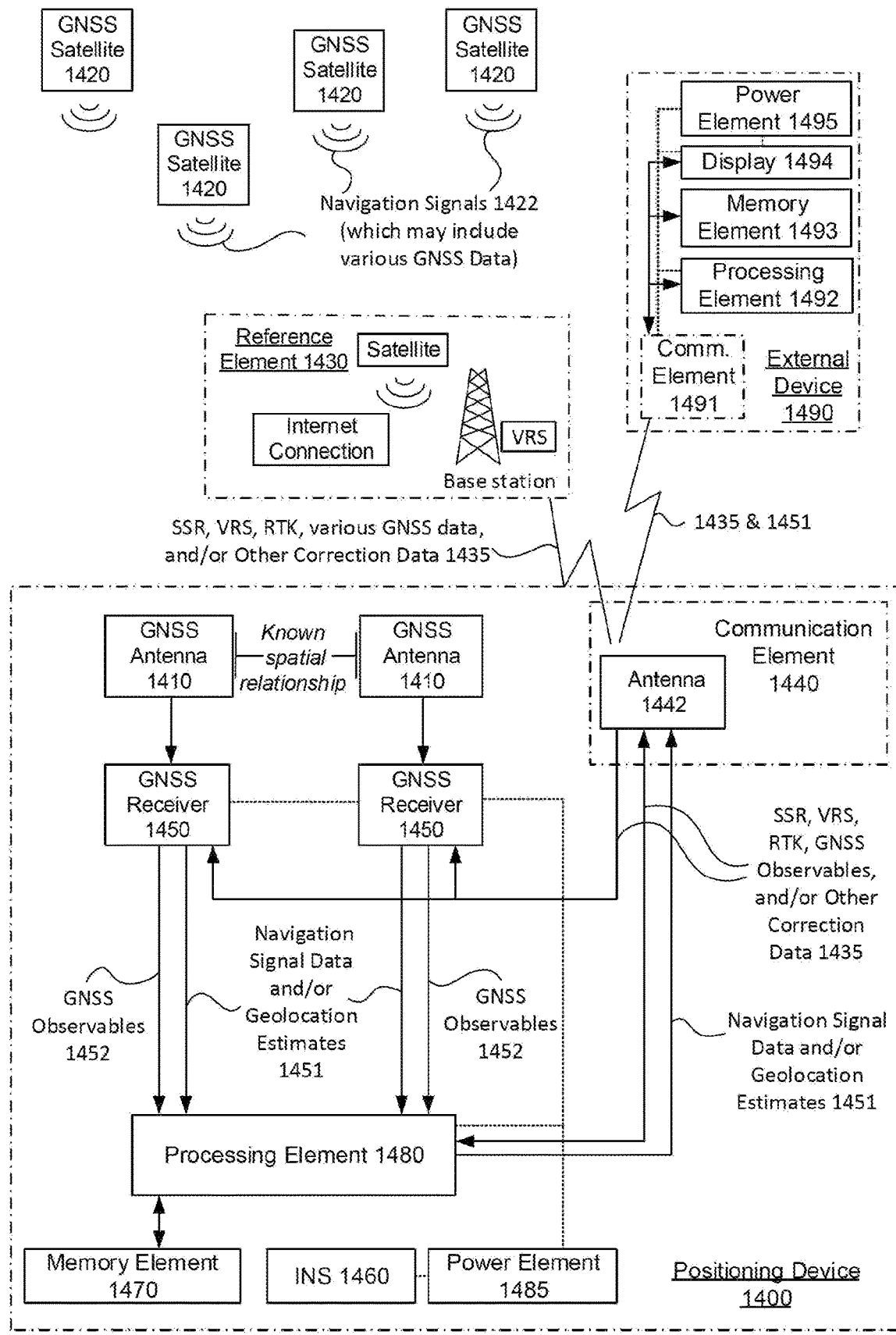
FIG. 14 is a diagram of another positioning device in keeping with the present disclosure.

Turning to FIG. 14, a positioning device 1400 in keeping with the present disclosure is illustrated. The positioning device 1400 may include a plurality of GNSS antennas, such as the GNSS antennas 1410, where the spatial relationship between GNSS antennas 1410 may be known. It should be noted that though the positioning device embodiment 1400 of FIG. 14 shows two GNSS antennas 1410, other embodiments in keeping with the present disclosure may have other quantities of GNSS antennas. Each of the GNSS antennas 1410 may receive navigation signals 1422 (which may include various GNSS data that may further be used to determine GNSS observable data) from a plurality of GNSS satellites 1420. The GNSS observable data may, for example, include data regarding pseudorange, carrier phase, Dopler shift, or the like.

The positioning device 1400 may include a number of GNSS receiver elements 1450 having at least one GNSS receiver element 1450 coupled at each GNSS antenna 1410. Each GNSS receiver 1450 may receive output navigation signals from the GNSS antennas 1410 and generate GNSS geolocation estimates associated with each GNSS antenna 1410. In some such embodiments, the geolocation estimates may be determined via navigation signals and, optionally, various GNSS data that may be used to determine GNSS observables received at each GNSS receiver 1450 via the associated GNSS antennas 1410 (and/or may be determined via SSR, VRS, RTK, various GNSS data, and/or other correction data 1435 received at a communication element 1440). In further embodiments, SSR, VRS, RTK, various GNSS data, and/or other correction data 1435 may be received at a communication element 1440 from one or more reference elements 1430 (e.g., reference station, VRS, reference satellite, other internet connection, or the like) and may further be communicated to the one or more GNSS receivers 1450 and be factored in generating position estimates. In yet further embodiments, the navigation signal data and/or geolocation estimates 1451 (which may or may not have been corrected via SSR, VRS, RTK, various GNSS data, and/or other correction data 1435 at the GNSS receivers 1450) and/or GNSS observables 1452 may be communicated from the GNSS receivers 1450 to a processing element 1480 having one or more processors operatively coupled to a memory element 1270 having one or more non-transitory memories for storing information relating to the positions and associated data of the positioning device 1400.

Optionally, an INS 1460 that includes one or more inertial sensors (e.g., gyroscopic sensors, accelerometers, compass sensors, altimeters, LiDAR, ground tracking mechanism, cameras, ground-penetrating radar (GPR), radar, and the like) or arrays of sensors may optionally be included in the positioning device 1400 to provide orientation, pose, movements, and/or other inertial data to the processing element 1480 that may be correlated with the navigation signal data and/or geolocation estimates 1451. For instance, the data from INS 1460 may optionally be used to improve and/or verify geolocation estimates and/or geolocation solutions at a processing 1492 in a communicatively coupled external device 1490. In some embodiments, the INS 1460 may be one or more accelerometers. In further embodiments, the INS 1460 may be one or more accelerometers and compass sensors. In yet further embodiments, the INS 1460 may be or include an array of different sensors and mechanisms to determine orientation, pose, movements, and/or other inertial data (e.g., gyroscopic sensors, accelerometers, compass sensors, altimeters, LiDAR, ground tracking mechanism, cameras, ground-penetrating radar (GPR), radar, and the like). A power element 1485 (e.g., one or more batteries, grid power, or the like) may also be included for supplying of electrical power to the various powered elements of the positioning device 1400.

The navigation signal data and/or geolocation estimates 1451 (optionally correlated with INS data) as well as the SSR, VRS, RTK, various GNSS data, and/or other correction data 1435 may be communicated with the communication element 1440 to further be communicated with the external device 1490 for processing via the various methods of the present disclosure (e.g., the method 400 of FIG. 4, the method 700 of FIG. 7, the method 900 of FIG. 9, the method 1000 of FIG. 10, the method 1100 of FIG. 11, the method 13 of FIG. 13, and/or the method 1500 of FIG. 15) in generating geolocation solutions. For instance, the external device 1490 may receive the navigation signal data and/or geolocation estimates 1451 and the SSR, VRS, RTK, various GNSS data, and/or other correction data 1435 at a communication element 1491 (e.g., Bluetooth, Wi-Fi, wired connection, or the like) and, via a processing element 1492 having one or more processors operatively coupled to a memory element 1493 having one or more non-transitory memories, process the data via the various methods of the present disclosure (e.g., the method 400 of FIG. 4, the method 700 of FIG. 7, the method 900 of FIG. 9, the method 1000 of FIG. 10, the method 1100 of FIG. 11, the method 13 of FIG. 13, and/or the method 15 of FIG. 15) in generating geolocation solutions.). It should be noted, the processing of data in generating geolocation solutions in keeping with the present disclosure may occur in real-time, near real-time, or in post processing. Likewise, in some embodiments, initial geolocation solutions may be generated in real-time or near real-time that may later be further corrected in post processing. The geolocation solutions may optionally be stored on the memory element 1493 and/or viewed via a display 1494. The external device may be powered by a power element 1495 (e.g., battery, grid power, or the like).

Figure 15:
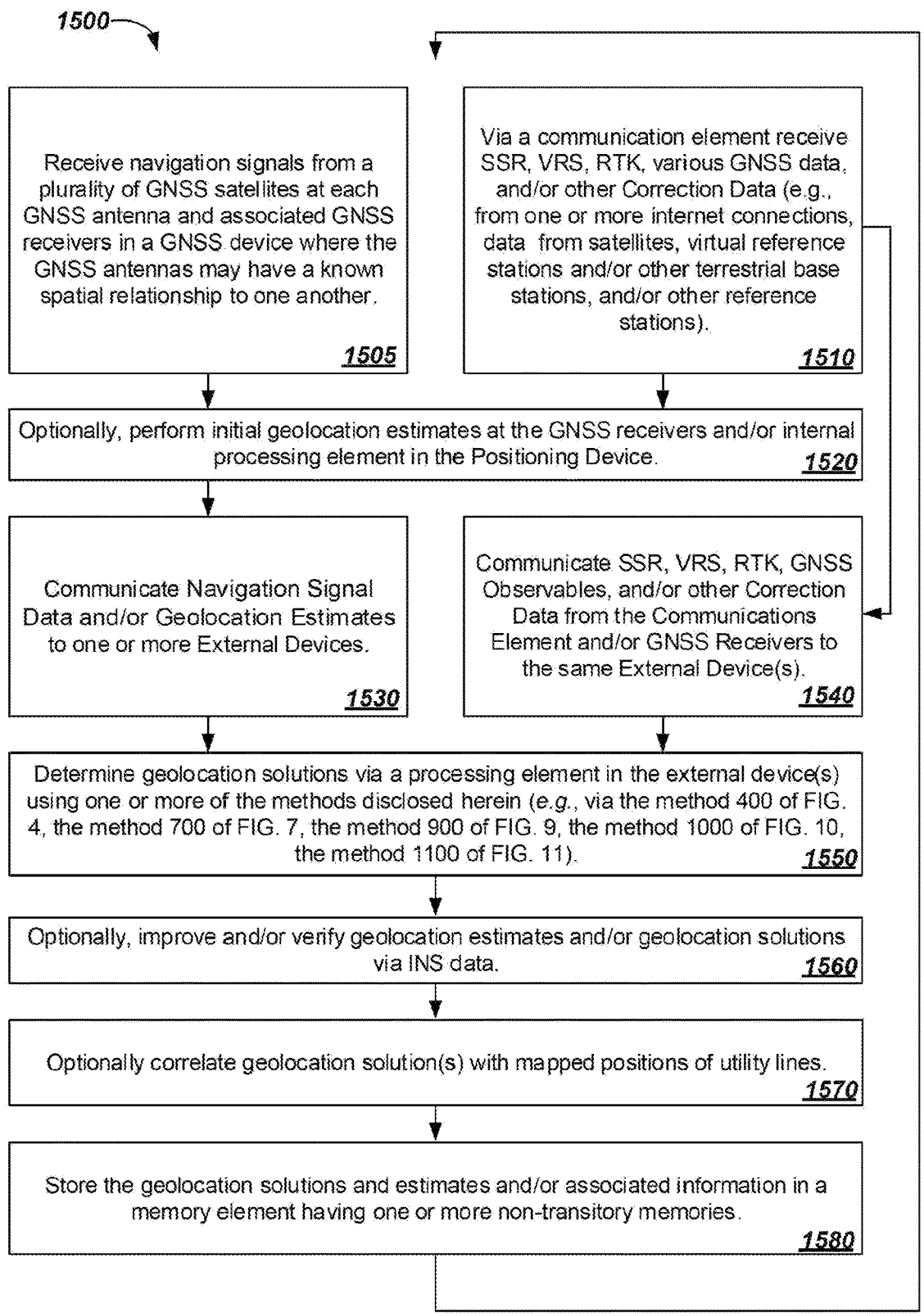
FIG. 15 is a method for processing data in relation to the various other methods disclosed herein on an external device in keeping with the disclosure.

Turning to FIG. 15, a method 1500 is described which may be employed by a positioning device in keeping with the present disclosure such as the positioning device 1400 of FIG. 14. In step 1505, navigation signals may be received from a plurality of GNSS satellites at each GNSS antenna and associated GNSS receivers in a GNSS device where the GNSS antennas may have a known spatial relationship to one another. It should be noted that the navigation signals of step 1505 may include various GNSS data by which GNSS observable data may be determined (e.g., data regarding pseudorange, carrier phase, Dopler shift, or the like). In a simultaneous step 1510 occurring concurrently as step 1505 the method 1500 may include receiving, via a communication element, SSR, VRS, RTK, various GNSS data, and/or other correction data (e.g., from one or more internet connections, data from satellites, virtual reference stations and/or other terrestrial base stations, and/or other reference stations). It should be noted that GNSS observables may be determined via the navigation signals received at GNSS receivers and/or SSR, VRS, RTK, various GNSS data, and/or other correction data received at the communication element. In step 1520 following from steps 1505 and 1510, optionally geolocation estimates may be determined at each GNSS receiver and/or at a processing element internal to the positioning device. The geolocation estimates of step 1520 may be partially or fully corrected via the SSR, VRS, RTK, various GNSS data, and/or other correction data. In a step 1530, the navigation signal data and/or geolocation estimates may be communicated to one or more external devices (e.g., computers, tablets, smart phones, remote cloud computers, utility locator devices, or the like). In step 1540 following from step 1510, SSR, VRS, RTK, various GNSS data, and/or other correction data from the communication element and/or GNSS receivers may also be communicated to the external device(s) as step 1530. In step 1550 following steps 1530 and 1540, geolocation solutions may be determined at a processing element in the external device(s) via one or more of the various methods disclosed herein (e.g., the method 400 of FIG. 4, the method 700 of FIG. 7, the method 900 of FIG. 9, the method 1000 of FIG. 10, and/or the method 1100 of FIG. 11). It should be noted, the processing of data in generating geolocation solutions in keeping with the present disclosure may occur in real-time, near real-time, or in post processing. Likewise, in some embodiments, initial geolocation solutions may be generated in real-time or near real-time that may later be further corrected in post processing. In step 1560, geolocation solutions and/or estimates may be verified and/or improved via INS data (e.g., orientation, pose, movements, and/or other inertial data that may be generated via an accelerometer, an accelerometer and compass, and or an array of sensors and mechanisms including but not limited to gyroscopic sensors, accelerometers, compass sensors, altimeters, LiDAR, ground tracking mechanism, cameras, ground-penetrating radar (GPR), radar, and the like) that may be communicated to the one or more external devices. Turning to step 1570, the one or more geolocation solutions may optionally be correlated with the mapped positions of utility lines. For instance, where the positioning device is present in or otherwise communicating with a utility locator device, the mapped utility lines as well as other associated data (e.g., the depths of utility lines, types of utilities present, or the like) may be displayed on a map that may further be displayed on the external device. In step 1580, the geolocation solutions, geolocation estimates and/or associated information in a memory element having one or more non-transitory memories. For instance, such a memory element may be present in the positioning device and/or the one or more external devices. Optionally, the method 1500 may repeat back at steps 1505 and 1510.

In one or more exemplary embodiments, the electronic features and functions described herein and associated with the positioning devices, systems, and methods may be implemented in hardware, software, firmware, or any combination thereof. If implemented in software, the functions may be stored on or encoded as one or more instructions or code on a computer-readable medium. Computer-readable medium includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, solid state drives (SSD), USB flash drives or other similar portable devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable medium. As used herein, computer program products comprising computer-readable media include all forms of computer-readable media except to the extent that such media is deemed to be non-statutory, transitory propagating signals.

Those of skill in the art would understand that information and signals, such input/output signals or data, and/or other signals/other data may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Skilled artisans may implement the described functionality in varying ways for each particular application, but such implementation decisions should not be interpreted as causing a departure from the scope of the present disclosure.

The various illustrative functions and circuits described in connection with the embodiments disclosed herein may be implemented or performed in a processing element with a general purpose processor, a digital signal processor (DSP), an application specific integrated circuit (ASIC), a field programmable gate array (FPGA) or other programmable logic device, discrete gate or transistor logic, discrete hardware components, memory devices, and/or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The features described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known or developed in the art. An exemplary storage medium is coupled to the processor such that the processor can read information from, and write information to, the storage medium. In the alternative, the storage medium may be integral to the processor.

The scope of the present invention is not intended to be limited to the aspects shown herein, but is to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use embodiments of the presently claimed invention. Various modifications to these aspects will be readily apparent to those skilled in the art, and the generic principles defined herein may be applied to other aspects without departing from the spirit or scope of the disclosures herein. Thus, the invention is not intended to be limited to the aspects shown herein but is to be accorded the widest scope consistent with the following claims and their equivalents.

I claim:

1. A method, comprising:
    moving a GNSS and INS based positioning device from a first known geolocation to a second geolocation, wherein the GNSS and INS based positioning device includes one or more GNSS receivers, one or more associated GNSS antennas, a communication element for receiving state space representation (SSR) correction data or precise point positioning real-time kinematics (PPP-RTK) or real-time kinematics (RTK) correction data or an alternate set of correction data from a reference element(s) and wherein time corrections are parsed from the correction data, and an inertial navigation system (INS) to generate inertial data associated with movement between the geolocations;
    determining one or more GNSS based first and second geolocation estimates based on GNSS navigation signals and corrections data corresponding to each GNSS antenna;
    determining an inertial based second geolocation estimate associated with each GNSS antenna in a world frame based on inertial data which are generated by the INS;
    determining an aligned estimate of the respective GNSS based second geolocation estimate based on adjusting the time correction for each received navigation signal such that the corresponding GNSS based second geolocation(s) best align with the INS based second geolocation estimate for each GNSS antenna; and
    storing the geolocation estimates and the aligned estimates in a non-transitory memory.

2. The method of claim 1, wherein the geolocation solution(s) are correlated with mapped positions of utility lines determined by a utility locator device.

3. The method of claim 1, wherein a plurality of geolocation estimates are generated each associated with a GNSS antenna in an array of GNSS antennas having a known spatial relationship to one another.

4. A GNSS and INS based positioning device, comprising:
    one or more GNSS antennas, wherein each of the one or more GNSS antennas receives navigation signals from a GNSS satellite system and outputs associated navigation signals;
    a communication element comprising one or more radio transceivers to receive state space representation (SSR) correction data, precise point positioning real-time kinematics (PPP-RTK) correction data, real-time kinematics (RTK) correction data and/or an alternate set of correction data, wherein time corrections are parsed from the correction data;
    one or more GNSS receiver elements coupled at each GNSS antenna to each receive output navigation signals from the GNSS antennas and correction data from the communication element and further generate GNSS geolocation estimates associated with each GNSS antenna;
    an inertial navigation system (INS) including one or more inertial sensors or arrays of sensors to generate estimates of movements and orientation associated with each GNSS antenna from a first geolocation position to a second geolocation position;
    one or more non-transitory memories;
    a processing element operatively coupled to the memory, GNSS receiver(s), and INS programmed to execute instructions for generating geolocation solutions by adjusting the time corrections associated with navigation signals to align the GNSS geolocation estimates with corresponding INS geolocation estimates; and
    an electrical power element for providing electrical power to the GNSS and INS positioning devices.

5. The device of claim 4, further employed in a utility locator device comprising:
    the GNSS and INS based positioning device;
    a locator subsystem having one or more antennas and associated receiver circuitry to receive AC magnetic field signals emitted by utility lines and/or RFID type markers buried in the ground and provide magnetic field output signals corresponding to the received AC magnetic field signals;

a user interface and input element to receive input commands from a user and communicate data relating to utility line positions, geolocation solutions/estimates, and/or other mapping information to a user;

a locator subsystem processing element operatively coupled to the memory element, GNSS receiver(s), and INS programmed to locate and map utility lines from the magnetic field output signals and correlate and map resulting geolocation solutions with utility line positions;

a non-transitive memory; and an electrical power element for providing electrical power to the utility locator.

6. The device of claim 4, further employed in a utility locating transmitter comprising:

the GNSS and INS based positioning device;

a current generation element for generating electromagnetic current signals at one or more known frequencies; and an output current element operatively coupled to the current generation element for coupling the electromagnetic signal(s) to one or more utility lines.

7. The device of claim 6, wherein the utility locating transmitter includes a communication element for communicating geolocation solution data to utility locator device and/or to other GNSS based position device(s).

8. The device of claim 6, wherein the GNSS and INS based positioning device is a non-moving base reference station/reference element or configured to act as a virtual reference station (VRS) providing correction data to utility locator device(s) and/or other GNSS based position device(s).

9. A method for generating geolocation via a multi-antenna positioning device, comprising:

receiving navigation signals from a plurality of GNSS satellites at each GNSS antenna in a GNSS antenna array from a multi-antenna positioning device having a plurality of GNSS antennas in a known spatial relationship to one another, one or more GNSS receivers coupled to each GNSS antenna, and a communication element for receiving correction data including state space representation (SSR) or precise point positioning real-time kinematics (PPP-RTK) or real-time kinematics (RTK) or other correction data from reference element(s) and wherein time corrections are parsed from the correction data;

receiving the correction data from the reference element(s) via the communication element that includes the time corrections parsed from the correction data;

generating a geolocation estimate associated with each GNSS antenna from the received navigation signals and correction data;

comparing the spatial relationship of geolocation estimates for the plurality of GNSS antennas to the known spatial relationship of the GNSS antenna array;

adjusting the time correction for each received navigation signal such that the corresponding geolocation estimate for each GNSS antenna best fits with the known spatial relationship of the GNSS antenna array to generate geolocation solutions for each GNSS antenna; and storing the geolocation solutions and estimates and/or associated information in a non-transitory memory.

10. The method of claim 9, wherein the geolocation solutions are correlated with mapped positions of utility lines determined by a utility locator device.

11. A multi-antenna positioning device, comprising:

a plurality of GNSS antennas having a known spatial relationship to each other, wherein each GNSS antenna receives navigation signals from one or more GNSS satellites and reference element(s), and outputs associated navigation signals;

a communication element comprising one or more radio transceivers to receive state space representation (SSR), precise point positioning real-time kinematics (PPP-RTK), real-time kinematics (RTK) or correction data wherein time corrections are parsed from the correction data;

one or more GNSS receiver elements coupled at each of the one or more GNSS antennas to each receive output navigation signals from the GNSS antennas and correction data from the communication element and further generate GNSS geolocation estimates associated with each GNSS antenna;

a non-transitory memory;

a processing element operatively coupled to the memory, GNSS receiver(s), and INS that is programmed to generate geolocation solutions by adjusting the time corrections associated with navigation signals to align the GNSS geolocation estimates with the known spatial relationship of the plurality of GNSS antennas; and a power element for supplying electrical power to the various powered elements of the positioning device.

12. The device of claim 11, further comprising an inertial navigation system (INS) including one or more inertial sensors or arrays of sensors to estimate movements and orientation associated with each GNSS antenna from a first geolocation to a second geolocation.

13. The device of claim 11, further employed in a utility locator device, the utility locator device comprising:

a locator subsystem having one or more antennas and associated receiver circuitry to receive AC magnetic field signals emitted by utility lines and/or RFID type markers buried in the ground;

a user interface and input element configured to receive input commands from a user and communicate data relating to utility line positions, geolocation solutions/estimates, and/or other mapping information to a user; and a processing element operatively coupled to the memory and GNSS receiver(s) that is configured to locate and map utility lines from the received AC magnetic field signals, adjusting the time corrections associated with navigation signals to align spatial relationships of GNSS antenna geolocation estimates with the known spatial relationship of GNSS antennas, and correlating and mapping resulting geolocation solutions with utility line positions and store the resulting geolocation solutions in the non-transitory memory.

14. The device of claim 11, further employed in a utility locating transmitter comprising:

a current generation element for generating electromagnetic current at one or more known frequencies for detection by a utility locator device; and an output current element for coupling the electromagnetic current to one or more utility lines.

15. The device of claim 14, wherein the utility locating transmitter communicates geolocation solutions and/or other geolocation information to one or more utility locator devices(s) and/or other GNSS based position device(s).

16. The device of claim 15, wherein the multi-antenna based positioning device is a non-moving base reference station/reference element or configured to act as a virtual reference station (VRS) providing correction data to utility locator device(s) and/or other GNSS based positioning device(s).

\* \* \* \* \*